(12) United States Patent
Tripathi et al.

(10) Patent No.: US 9,742,697 B2
(45) Date of Patent: Aug. 22, 2017

(54) INTEGRATED SERVER WITH SWITCHING CAPABILITIES AND NETWORK OPERATING SYSTEM

(71) Applicant: Pluribus Networks, Inc., Palo Alto, CA (US)

(72) Inventors: Sunay Tripathi, Los Altos, CA (US); Robert James Drost, Los Altos, CA (US); Chih-Kong Ken Yang, Los Altos, CA (US)

(73) Assignee: Pluribus Networks Inc., Palo Alto, CA (US)

( * ) Notice: Subject to any disclaimer, the term of this patent is extended or adjusted under 35 U.S.C. 154(b) by 0 days.

(21) Appl. No.: 15/088,376

(22) Filed: Apr. 1, 2016

(65) Prior Publication Data

US 2016/0241491 A1    Aug. 18, 2016

Related U.S. Application Data

(63) Continuation of application No. 13/842,929, filed on Mar. 15, 2013, now Pat. No. 9,304,782, which is a
(Continued)

(51) Int. Cl.
*H04L 12/931* (2013.01)
*H04L 12/933* (2013.01)
(Continued)

(52) U.S. Cl.
CPC .......... *H04L 49/15* (2013.01); *H04L 12/4641* (2013.01); *H04L 45/56* (2013.01);
(Continued)

(58) Field of Classification Search
CPC . H04L 12/4633; H04L 41/0681; H04L 29/06; H04L 67/2819; H04L 67/306; H04L 45/56; H04L 45/66
See application file for complete search history.

(56) References Cited

U.S. PATENT DOCUMENTS 9,025,465 B2 *   5/2015   Cheng ................. H04L 12/4633
                                                        370/241
9,304,782 B2 *   4/2016   Tripathi ................ G06F 9/4416
(Continued)

*Primary Examiner* — Raj Jain
(74) *Attorney, Agent, or Firm* — Martine Penilla Group, LLP

(57) ABSTRACT

Methods, systems, and computer programs are presented for a switching server. One switching server includes a server, a switch module coupled to the server, and a switch controller coupled to the server and to the switch module. The server includes a processor executing an operating system that includes a network driver, and the network driver includes a first network device operating system (ndOS) program. Further, the switch module includes a switch fabric and input/output ports. The switch controller includes a processor and non-volatile storage, where the processor is configured to execute a second ndOS program. The first and second ndOS programs implement a global networking policy for a plurality of devices executing ndOS programs, the global networking policy including a definition for switching incoming packets through the plurality of devices executing the ndOS programs.

20 Claims, 33 Drawing Sheets

Related U.S. Application Data continuation-in-part of application No. 13/313,837, filed on Dec. 7, 2011, now Pat. No. 9,319,335, said application No. 13/842,929 is a continuation-in-part of application No. 13/478,179, filed on May 23, 2012, now Pat. No. 8,891,543, said application No. 13/842,929 is a continuation-in-part of application No. 13/100,125, filed on May 3, 2011, now Pat. No. 8,811,153, said application No. 13/842,929 is a continuation-in-part of application No. 13/099,918, filed on May 3, 2011, now Pat. No. 8,767,752.

(60) Provisional application No. 61/420,526, filed on Dec. 7, 2010, provisional application No. 61/489,085, filed on May 23, 2011, provisional application No. 61/330,758, filed on May 3, 2010, provisional application No. 61/346,138, filed on May 19, 2010, provisional application No. 61/346,147, filed on May 19, 2010, provisional application No. 61/346,411, filed on May 19, 2010.

(51) Int. Cl.
  *H04L 12/771* (2013.01)
  *H04L 12/46* (2006.01)
  *H04L 12/911* (2013.01)
  *H04L 12/803* (2013.01)
  *H04L 12/927* (2013.01)

(52) U.S. Cl.
  CPC ............ *H04L 47/122* (2013.01); *H04L 47/70* (2013.01); *H04L 49/1523* (2013.01); *H04L 49/50* (2013.01); *H04L 49/70* (2013.01); *H04L 47/803* (2013.01); *H04L 49/65* (2013.01)

(56) References Cited

U.S. PATENT DOCUMENTS

| | | | |
|---|---|---|---|
| 9,319,335 B1* | 4/2016 | Tripathi | H04L 12/4641 |
| 2002/0120697 A1* | 8/2002 | Generous | H04L 29/06 709/206 |
| 2006/0101159 A1* | 5/2006 | Yeh | H04L 45/00 709/246 |
| 2009/0135839 A1* | 5/2009 | Khasnabish | H04L 63/164 370/401 |
| 2013/0235870 A1* | 9/2013 | Tripathi | H04L 45/56 370/390 |

* cited by examiner

Control Processor MAC Table

| MAC address |
| --- |
| VLAN ID |
| VXLAN |
| Type (Dynamic, Static) |
| Egress Port ID |
| Age |
| Time entry created |
| Frequency of Use |
| Last Used |
| In TCAM |
| In fabric MAC table |
| In NPU1 |
| In NPU2 |
| ... |

Fig. 14

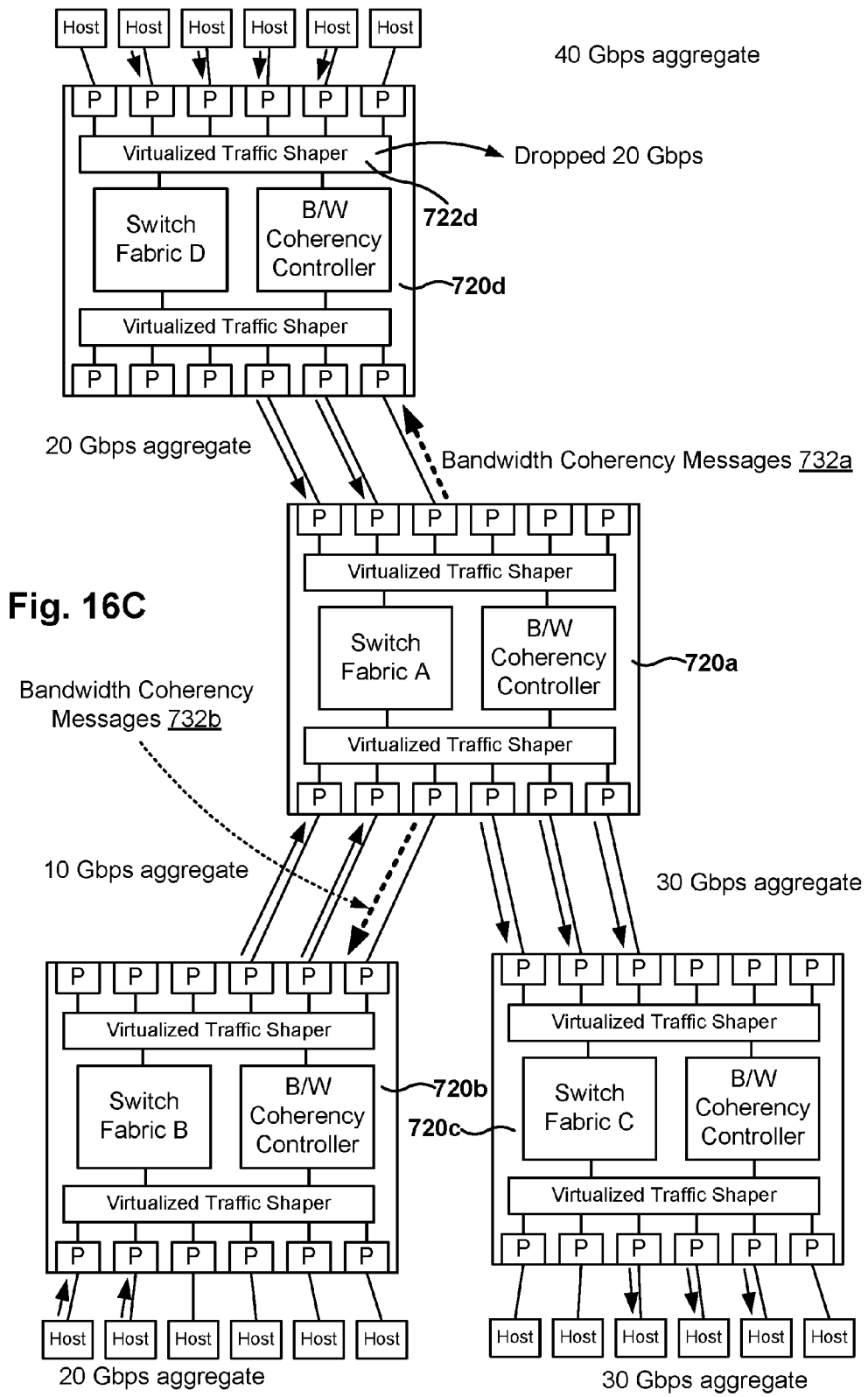

```
┌─────────────────────────────────────────┐
│ receiving a packet at a switch module,  │──── 832
│ the switch module having one or more    │
│ ports with a communications interface   │
│ of a first type (CI1) and one or more   │
│ ports with a communications interface   │
│ of a second type (CI2), wherein a       │
│ server is in communication with the     │
│ switch module via a first CI2 coupling, │
│ wherein a switch controller is in       │
│ communication with the switch module    │
│ via a second CI2 coupling, the server   │
│ including a virtual CI1 driver that     │
│ provides a CI1 interface to             │
│ applications in the server, the virtual │
│ CI1 driver defined to exchange CI1      │
│ packets with the switch module via the  │
│ first CI2 coupling, the virtual CI1     │
│ driver further including a first        │
│ network device operating system         │
│ (ndOS) program, the switch controller   │
│ including a second ndOS program that,   │
│ when executed by a processor,           │
│ controls packet switching policy in the │
│ switch module, the packet switching     │
│ policy including a definition for       │
│ switching incoming packets through the  │
│ switch module or through the switch     │
│ controller, wherein the first ndOS      │
│ program and the second ndOS program,    │
│ when executed by respective             │
│ processors, exchange control messages   │
│ to maintain a network policy for a      │
│ layer 2 switch fabric                   │
└─────────────────────────────────────────┘
                    │
                    ▼
┌─────────────────────────────────────────┐
│ determining by a classifier in the      │
│ switch module to switch the packet      │──── 834
│ through the switch module or through    │
│ the switch controller based on the      │
│ packet switching policy                 │
└─────────────────────────────────────────┘
                    │
                    ▼
┌─────────────────────────────────────────┐
│ switching the packet based on the       │──── 836
│ determining                             │
└─────────────────────────────────────────┘
```

Fig. 17A

INTEGRATED SERVER WITH SWITCHING CAPABILITIES AND NETWORK OPERATING SYSTEM

CLAIM OF PRIORITY

This application is a Continuation Application under 35 USC §120 of U.S. patent application Ser. No. 13/842,929, entitled "Network Switch, Systems, and Servers Implementing Boot Image Delivery," filed Mar. 15, 2013, which is herein incorporated by reference.

U.S. patent application Ser. No. 13/842,929 is a Continuation In-Part Application and claims priority from U.S. application Ser. No. 13/313,837, entitled "Distributed Operating System for a Layer 2 Fabric," and filed on Dec. 7, 2011, which claims benefit under 35 U.S.C. §119(e) to U.S. Provisional Application Ser. No. 61/420,526, entitled "Distributed Operating System for a Layer 2 Fabric," filed on Dec. 7, 2010.

U.S. patent application Ser. No. 13/842,929 is a Continuation In-Part Application and claims priority from U.S. application Ser. No. 13/478,179, entitled "Method and System For Processing Packets in a Network Device," and filed on May 23, 2012, which claims benefit under 35 U.S.C. §119(e) to U.S. Provisional Application Ser. No. 61/489,085 entitled "Low Latency Network Fabric," filed on May 23, 2011.

U.S. patent application Ser. No. 13/842,929 is a Continuation In-Part Application and claims priority from U.S. application Ser. No. 13/100,125, entitled "Switch Fabric for Network Devices," and filed on May 3, 2011, which claims benefit under 35 U.S.C. §119(e) to U.S. Provisional Application Ser. No. 61/330,758, entitled "Virtual Networks," filed on May 3, 2010, and U.S. Provisional Application Ser. No. 61/346,138 entitled "Network Switch," filed on May 19, 2010.

U.S. patent application Ser. No. 13/842,929 is a Continuation In-Part Application and claims priority from U.S. application Ser. No. 13/099,918, entitled "Method and System for Resource Coherency and Analysis in a Network," and filed on May 3, 2011, which claims benefit under 35 U.S.C. §119(e) to U.S. Provisional Application Ser. No. 61/330,758, entitled "Virtual Networks," filed on May 3, 2010, and to U.S. Provisional Application Ser. No. 61/346,147 entitled "Virtual Networks," filed on May 19, 2010, and to U.S. Provisional Application Ser. No. 61/346,411, entitled "Virtual Networks," filed on May 19, 2010, all of which are incorporated herein by reference.

CROSS REFERENCE TO RELATED APPLICATIONS

This application is related by subject matter to U.S. patent application Ser. No. 13/842,619, filed Mar. 15, 2013, and entitled "Servers, Switches, and Systems with Switching Module Implementing a Distributed Network Operating System;" U.S. patent application Ser. No. 13/842,668, filed Mar. 15, 2013, and entitled "Servers, Switches, and Systems with Virtual Interface to External Network Connecting Hardware and Integrated Networking Driver;" U.S. patent application Ser. No. 13/842,867, filed Mar. 15, 2013, and entitled "Methods and Systems for Managing Distributed Media Access Control Address Tables;" and U.S. patent application Ser. No. 13/842,806, filed Mar. 15, 2013, and entitled "Methods, Systems, and Fabrics implementing a Distributed Network Operating System," all of which are incorporated herein by reference.

BACKGROUND

1. Field of the Invention

The present embodiments relate to systems, methods, and computer programs for managing network traffic, and more particularly, systems, methods, and computer programs for implementing a distributed switch layer fabric.

2. Description of the Related Art

The proliferation of network devices has resulted in complex networking strategies to distribute packets in a network efficiently. In some solutions, multitier switching devices are used to build the network, but these complex multitier solutions do not provide an efficient distribution of packets at the level 2, and the management of these multitier switches is difficult and inflexible.

In addition, with the exponential growth of virtual machines on the network, the number of devices continues to grow exponentially. The addition of virtual networks, that include virtual machines and other network devices, requires an efficient separation of traffic between the different virtual networks, which is difficult to implement in the multitier switching architecture.

It is in this context that embodiments arise.

SUMMARY

Systems, devices, methods, and computer programs are presented for implementing a distributed switch layer fabric. It should be appreciated that the present embodiments can be implemented in numerous ways, such as a method, an apparatus, a system, a device, or a computer program on a computer readable medium. Several embodiments are described below.

In one embodiment, a networking device system is provided. The networking device system includes a switch module, a server, and a switch controller. The switch module has one or more ports with a communications interface of a first type (CI1) and one or more ports with a communications interface of a second type (CI2). The server is in communication with the switch module via a first CI2 coupling, and includes a virtual CI1 driver that provides a CI1 interface to applications in the server, the virtual CI1 driver defined to exchange CI1 packets with the switch module via the first CI2 coupling. The virtual CI1 driver includes a first network device operating system (ndOS) program. The switch controller is in communication with the switch module via a second CI2 coupling, and includes a second ndOS program that, when executed by a processor, controls packet switching policy in the switch module, the packet switching policy including definition for switching incoming packets through the switch module or through the switch controller. The first ndOS program and the second ndOS program, when executed by respective processors, exchange control messages to maintain a network policy for a switch layer fabric.

In another embodiment, a networking device system includes a switch module, a plurality of servers, and a switch controller. The switch module has one or more ports with a communications interface of a first type (CI1) and one or more ports with a communications interface of a second type (CI2). Further, the plurality of servers is in communication with the switch module via a first CI2 couplings, the servers including a respective virtual CI1 driver that provides a CI1 interface to applications in the respective server, each virtual CI1 driver defined to exchange CI1 packets with the switch module via the first CI2 coupling, and each virtual CI1 driver further including a first network device operating system (ndOS) program. The switch controller is in communication with the switch module via a second CI2 coupling, and the switch controller includes a second ndOS program that, when executed by a processor, controls packet switching policy in the switch module. The packet switching policy includes a definition for switching incoming packets through the switch module or through the switch controller, where the first ndOS program and the second ndOS program, when executed by respective processors, exchange control messages to maintain a network policy for a switch layer fabric.

In yet another embodiment, a method for processing packets includes an operation for receiving a packet at a switch module, the switch module having one or more ports with a communications interface of a first type (CI1) and one or more ports with a communications interface of a second type (CI2). Further, a server is in communication with the switch module via a first CI2 coupling, and a switch controller is in communication with the switch module via a second CI2 coupling. The server includes a virtual CI1 driver that provides a CI1 interface to applications in the server, the virtual CI1 driver defined to exchange CI1 packets with the switch module via the first CI2 coupling. The virtual CI1 driver further includes a first network device operating system (ndOS) program, and the switch controller including a second ndOS program that, when executed by a processor, controls a packet switching policy in the switch module, the packet switching policy including a definition for switching incoming packets through the switch module or through the switch controller. The first ndOS program and the second ndOS program, when executed by respective processors, exchange control messages to maintain a network policy for a switch layer fabric. Further, the method includes an operation for determining by a classifier in the switch module to switch the packet through the switch module or through the switch controller based on the packet switching policy. The method includes another operation for switching the packet based on the determining.

In one embodiment, a method for networking communications is provided. The method includes an operation for receiving a packet in a first format by a virtual driver providing a communications interface of a first type (CI1), the first format being for CI1. In addition, the method includes an operation for encapsulating the packet in a second format by a processor, the second format being for a communications interface of a second type (CI2) different from CI1. Further, the method includes an operation for sending the encapsulated packet in the second format to a switch module. The switch module includes a switch fabric, one or more CI1 ports and one or more CI2 ports, where the switch module transforms the packet back to the first format to send the packet in the first format to a CI1 network via one of the CI1 ports in the switch module. In one embodiment, the operations of the method are executed by a processor.

In another embodiment, a networking device system includes a switch module and a server. The switch module has one or more ports with a communications interface of a first type (CI1), one or more ports with a communications interface of a second type (CI2), and a switch fabric. The server is in communication with the switch module via a first CI2 coupling, and the server includes a virtual CI1 driver that provides a CI1 interface to applications in the server. The CI1 packets sent from applications in the server to the virtual CI1 driver are encapsulated in CI2 format before being transmitted to the switch module, where the switch module transforms the encapsulated packets into CI1 format before sending the packets to a CI1 network through one of the CI1 ports.

In yet another embodiment, a computer program embedded in a non-transitory computer-readable storage medium, when executed by one or more processors, for networking communications, includes program instructions for receiving a packet in a first format by a virtual driver providing a communications interface of a first type (CI1), the first format being for CI1. In addition, the computer program includes program instructions for encapsulating the packet in a second format, the second format being for a communications interface of a second type (CI2) different from CI1. Further, the computer program includes program instructions for sending the encapsulated packet in the second format to a switch module. The switch module includes a switch fabric, one or more CI1 ports and one or more CI2 ports, and the switch module transforms the packet back to the first format to send the packet in the first format to a CI1 network via a CI1 port in the switch module.

In one embodiment, a method for providing a program to a server is provided. The method includes an operation for receiving a request by a switching device from a first server, the request being for a boot image for booting the first server. Additionally, the method includes operations for determining if the boot image is available from non-volatile storage in the switching device, and for forwarding the request to a second server when the boot image is absent from the non-volatile storage. Further, the method includes an operation for sending the boot image to the first server from the switching device when the boot image is available from the non-volatile storage. In one embodiment, the operations of the method are executed by a processor.

In another embodiment, a switching device includes a non-volatile memory having one or more boot images, a volatile memory having a computer program, a switch fabric, and the processor. The processor is coupled to the non-volatile memory, the volatile memory, and the switch fabric. The computer program, when executed by the processor, performs a method having an operation for receiving a request by the switch fabric from a first server, the request being addressed to a second server, and the request being for a first boot image for the first server. Additionally, the method includes operations for determining if the first boot image is available in non-volatile memory, and for forwarding the request to the second server when the boot image is absent from the non-volatile memory. Further yet, the method includes an operation for sending the first boot image to the first server when the first boot image is available from the non-volatile memory.

In one embodiment, a network device operating system (ndOS) program embedded in a non-transitory computer-readable storage medium, when executed by one or more processors, for managing a switching layer fabric, is provided. The ndOS program includes program instructions for exchanging switching policy regarding a switching of network packets in a plurality of ndOS switching devices having respective ndOS programs executing therein, where the first ndOS program is executed in a first ndOS switching device, and the switching policy is exchanged with other ndOS programs via multicast messages. The ndOS program further includes program instructions for exchanging resource control messages with the other ndOS switching devices to implement service level agreements in the switching layer fabric, where the ndOS switching devices cooperate to enforce the service level agreements. In addition, the ndOS program further includes program instructions for receiving changes to the switching policy, and program instructions for propagating the received changes to the switching policy via message exchange between the ndOS programs. The ndOS switching devices are managed as a single logical switch that spans the plurality of ndOS switching devices.

In another embodiment, a method for managing a switching layer fabric is provided. The method includes an operation for exchanging, by a first ndOS program executing in a first ndOS switching device, a switching policy regarding a switching of network packets in a plurality of ndOS switching devices. Each ndOS switching device has a respective ndOS program executing therein, where the switching policy is exchanged with other ndOS programs via multicast messages. In addition, the method includes an operation for exchanging resource control messages with the other ndOS switching devices to implement service level agreements in the switching layer fabric, where the ndOS switching devices cooperate to enforce the service level agreements. Further, the method includes operations for receiving changes to the switching policy, and for propagating the received changes to the switching policy via message exchange between the ndOS programs, where the ndOS switching devices are managed as a single logical switch that spans the plurality of ndOS switching devices.

In yet another embodiment, a network device operating system (ndOS) switching device includes a processor, a switch fabric connected to the processor, and the memory. The memory has a first ndOS program that, when executed by the processor, performs a method, the method including an operation for exchanging a switching policy regarding a switching of network packets in a plurality of ndOS switching devices, each ndOS switching device having a respective ndOS program executing therein, where the switching policy is exchanged with other ndOS programs via multicast messages. In addition, the method includes an operation for exchanging resource control messages with the other ndOS programs to implement service level agreements in the switching layer fabric, where the ndOS switching devices cooperate to enforce the service level agreements. Further, the method includes operations for receiving changes to the switching policy, and for propagating the received changes to the switching policy via message exchange between the ndOS programs, where the ndOS switching devices are managed as a single logical switch that spans the plurality of ndOS switching devices.

Other aspects will become apparent from the following detailed description, taken in conjunction with the accompanying drawings.

BRIEF DESCRIPTION OF THE DRAWINGS

The embodiments may best be understood by reference to the following description taken in conjunction with the accompanying drawings.

FIG. 14 is a data structure for a MAC table, according to one or more embodiments.

FIGS. 16A-16D illustrate exemplary embodiments of a distributed ndOS, according to one or more embodiments.

FIG. 17A shows a flowchart illustrating an algorithm for processing network packets, in accordance with one embodiment.

DETAILED DESCRIPTION

The following embodiments describe systems, devices, methods, and computer programs for a distributed network device operating system (ndOS). It will be apparent, that the present embodiments may be practiced without some or all of these specific details. In other instances, well known process operations have not been described in detail in order not to unnecessarily obscure the present embodiments.

Figure 1A:
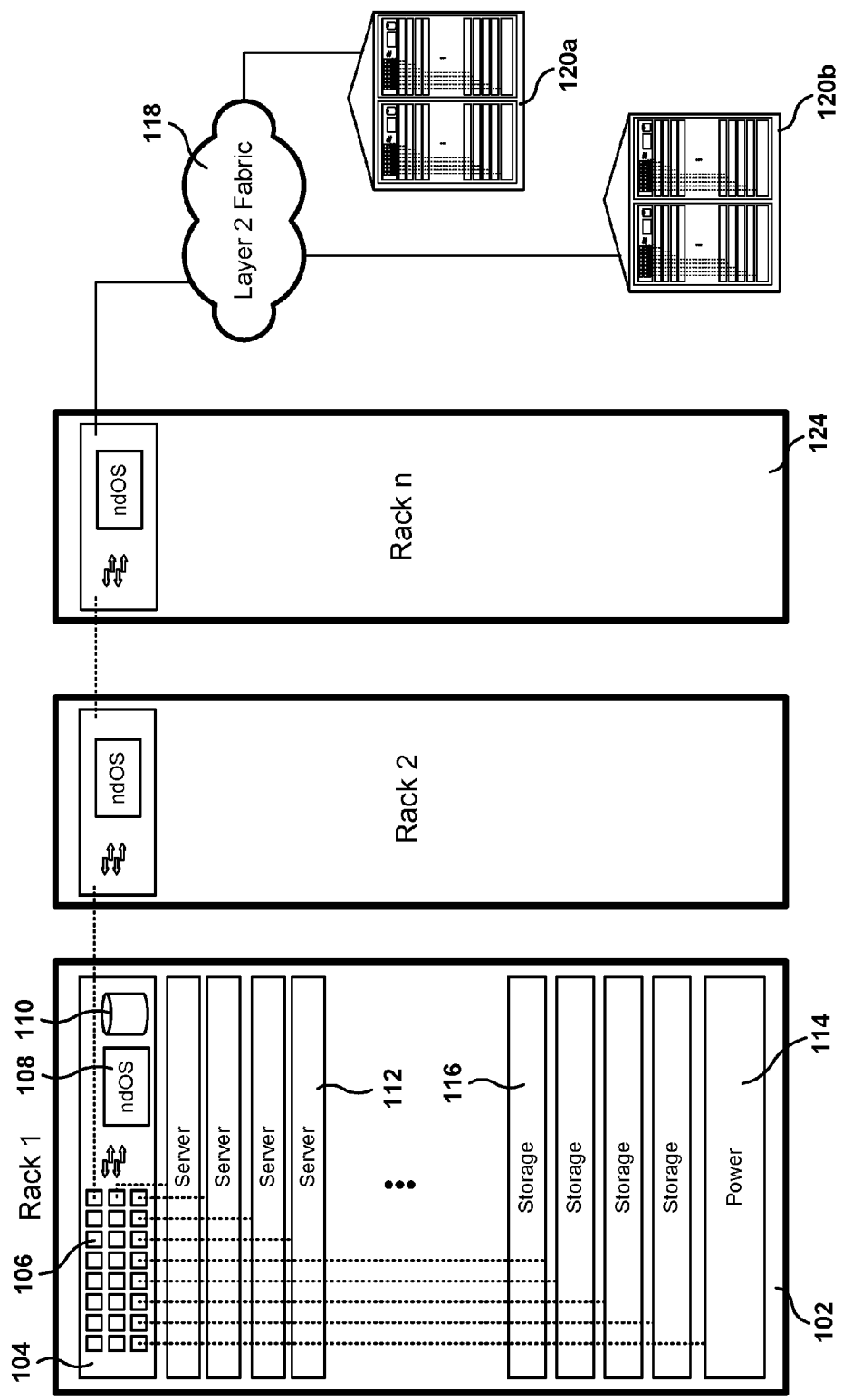
FIGS. 1A-1B illustrate the architecture of a distributed network device operating system (ndOS), according to one embodiment.
Figure 1B:
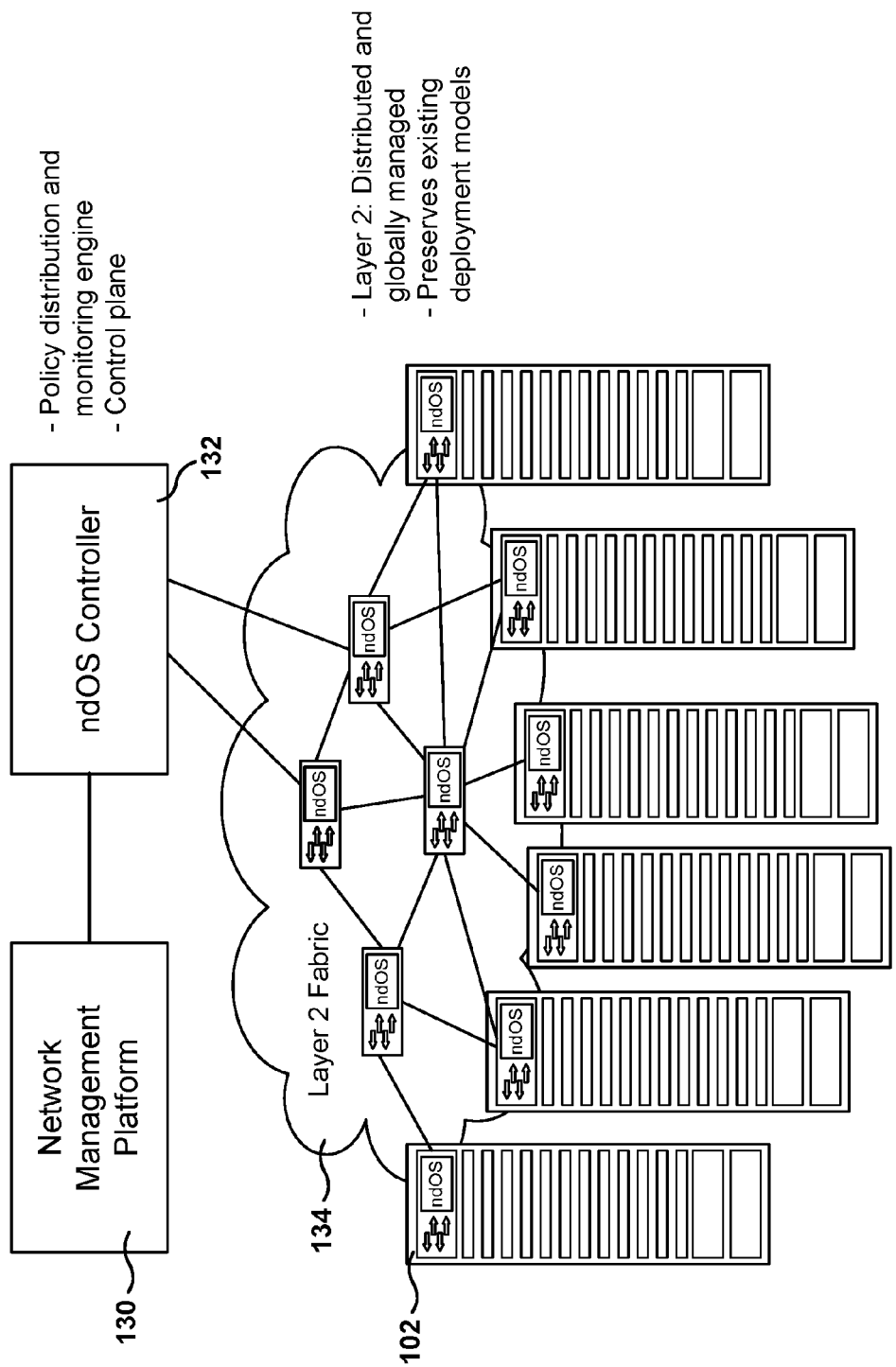

FIGS. 1A-1B illustrate the architecture of a distributed Network Device Operating System (ndOS), according to one embodiment. The network environment of FIG. 1A includes a rack 102 with a plurality of servers 112, storage devices 116, power supplies 114, etc. In addition, rack 102 includes a switch 104.

Switch 104 includes an instance of the ndOS, permanent storage 110, and a plurality of Ethernet ports 106 (more details regarding the components of switch 104 are given below with reference to FIGS. 5-7, 9A-9H, and others). The ndOS is a distributed network device operating system that spans a plurality of layer-2 devices (e.g., switches) across the network. The ndOS is also referred to herein as network operating system, networking operating system, layer-2 operating system, or distributed switching operating system. The interconnected switches with ndOS provide what appears to be a single logical switch that spans a plurality of switches, even switches located in geographically separated data centers 120a and 120b. The switches with ndOS build a layer-2 fabric that expands beyond a single switch and a single data center. As used herein, switching devices with ndOS are also referred to herein as ndOS switches or server-switches.

As used herein, layer 2, named the data link layer, refers to the second layer of the OSI network model. In addition, it is noted that although the switches are described with reference to a layer 2 implementation, other layers in the OSI model may also be utilized to interconnect switches (e.g., remote switches may be connected via tunneling using an Internet protocol (IP) network), and some of the operations performed by the switches may expand into other layers of the OSI model. The layer 2 fabric is also referred to herein as the switch layer fabric or the layer 2 switch fabric.

The conceptual use of a single layer 2 fabric allows the creation of application specific flows and virtual networks with hardware-based isolation and hardware-based Service Level Agreements (SLAs). The scope of virtual networks and application flows can be restricted to individual switches (or ports within a switch) or can be extended to switch clusters and entire layer 2 fabrics. As a result, end-to-end resource management and guaranteed SLAs are provided.

In one embodiment, the ndOS manages the physical network boxes and the fabric (the collection of ndOS instances) of ndOS switches like a hypervisor manages an individual server. The ndOS can spawn isolated networks with guaranteed performance levels that are virtually indistinguishable from an application point of view, from a physical network. This functionality is similar to how a hypervisor spawns virtual machines that look and act as physical machines.

Switch management tools allow network administrators to manage the complete layer-2 fabric—such as viewing, debugging, configuring, changing, setting service levels, etc.—including all the devices in the layer-2 fabric. For example, individual switches may come online and automatically join the existing fabric. Once in the fabric, devices can be allocated into local, cluster, or fabric-wide pools. In a given pool of switches, resource groups (physical and virtual servers and virtual network appliances) are managed with defined policies that include definitions for bandwidth, latency, burst guarantees, priorities, drop policies, etc.

The ndOS, and the ndOS switches, may create application flows and virtual networks on the fabric. SLAs (e.g., access control lists (ACL), VLAN tags, guaranteed bandwidth, limits on bandwidth, guaranteed latency, priority on shared resources, performance of network services such as firewalls and load balances and others, etc.) become attributes of each application flow or virtual network. These attributes are managed by the network operating system, and virtual machines are free to communicate within the scope of their virtual networks.

In one embodiment, as described in more detail below, the ndOS switches include a switch fabric, a processor, permanent storage, and network packet processors, which enable massive classification and packet copying at line rates with no latency impact. The network operating system may dynamically insert probes with no hardware or physical reconfiguration at any point in the fabric and copy full or filtered packet streams to the ndOS itself with meta-information such as nanosecond level timestamps, ingress port, egress port, etc. As a result, fabric-wide snooping and analytics are both flexible and with no impact on performance.

In one embodiment, the ndOS captures streams (e.g., 40 Gbps per ndOS switch) and stores them on non-volatile storage (e.g., 1 terabyte). Rolling logs permit post-processing and re-creation of entire application flows across the fabric. The ndOS is also able to track link-level latency of each application and virtual network along with additional comprehensive statistics. In one embodiment, the statistics include which machine pairs are communicating, connection life-cycles between any machines, packet drops, queuing delays, etc. The network operating system tracks fine-grained statistics and stores them in permanent storage to permit inspection of history at a point in time or over a period of time. Further, the probe points may implement counters or copy the packets without adding any latency to the original stream, or the probes may increment double-buffered counters which can be direct memory mapped into the network operating system and allow user applications running on the switch to make real time decisions.

In one embodiment, the ndOS is also a hypervisor and thus can run standard network services like load balancers, firewalls, etc. Further, the ndOS allows switches to discover other switches. In one embodiment, all ndOS instances know about each other using a multicast-based messaging system. In one embodiment, ndOS switches periodically send multicast messages on a well-known address, the multicast messages including the senders' own IP address and a unique switch identifier (ID). In one embodiment, this multicast message is also utilized as a keep-alive message.

In addition, ndOS switches may create direct connections with each other to reliably exchange any information. Each ndOS instance keeps track of the local configuration information but also keeps track of global information (e.g., MAC address tables). An administrator is able to connect to any ndOS instance (using ndOS provided application programming interfaces (API) and other interfaces) and configure any particular switch, or change the global configuration or resource policies, which are reliably communicated to other ndOS instances in the fabric using a two-phase commit, or some other procedure. In phase 1 of the two-phase commit, resources are reserved and in phase 2 resources are committed. From the management perspective, the administrator has a global view of the entire layer-2 fabric and is able to apply local or global configuration and policies to any ndOS instance.

In one embodiment, the ndOS also enables administrators to configure notification of events related to changes in the fabric (e.g., switches being added or deleted), changes in link status, creation of virtual machines (VMs), creation, deletion, or modification of a network-hosted physical or virtual storage pool, etc. The clients can interact with an ndOS instance on a local switch, or on any switch in the fabric. The fabric itself reliably ensures that one or more switches get configured appropriately as needed.

FIG. 1B illustrates the integrated layer-2 fabric architecture, according to one embodiment. A plurality of machines in physical racks can map onto a set of virtual networks that carve out portions of a single massive logical switch constructed out of the network fabric.

Each instance of the ndOS also communicates with other ndOS switches to keep a global state of flows, services, and virtual networks in the fabric. Resource and congestion management policies on individual switches and line cards ensure that each application flow, service, or virtual network benefit across the fabric and not just within individual switches.

In one embodiment, individual ndOS instances have line cards, data structures, and counters which enable having real time information to make real-time decisions as to application flows, services, and virtual networks (more details are provided below with reference to FIGS. 5 and 6). The deep packet buffers and processing capability allow the network operating system to shape individual application flows (for example a burst of packets for an application flow may be buffered and forwarded over a longer time period at a constant bandwidth or a critical application flow can be bypass a queue of less important packets to achieve lower latency, etc.), and virtual networks based on configured SLA and match network resources across the fabric to their needs.

The ndOS layer-2 fabric 134 appears as one huge logical switch that can be managed in whole (e.g., using ndOS controller 132). The ndOS controller 132, or the network management platform 130 which communicates with the ndOS controller 132, can create virtual networks that span the entire fabric, clusters, etc. Each cluster gets its own cluster manager in the form of a virtual machine that has privileges to perform cluster related operations. For instance, cluster managers can create virtual networks whose scope is local to a switch within the cluster. Alternatively, the scope may be across all members of the clusters. The cluster manager can also control the resources within the cluster (as specified by the ndOS controller 132). In one embodiment, each virtual network gets its own virtual network manager in the form of virtual machines that are hosted on one of the ndOS switches.

In one embodiment, the ndOS switches are programmable using C, Java, and html APIs (or other programs and protocols) that allow user applications to run on hosts or on the ndOS switch and gain access to low-level details, probe insertion and packet capture, configuring events, etc. The network operating system also uses emerging standards like OpenFlow, OpenStack, VMware, etc. to access a subset of this information in other ways.

In one embodiment, the ndOS is managed via a graphical user interface, or a text driven interface, or computer generated API calls, etc. For example, an administrator may request from the network management platform 130 a certain number of IP addresses, a certain network configuration with switches and routers, non-redundant IP address, etc.

It is noted that the embodiments illustrated in FIGS. 1A and 1B are exemplary. Other embodiments may utilize different topologies, configuration, have a mixture of devices with ndOS and without ndOS, etc. The embodiments illustrated in FIGS. 1A and 1B should therefore not be interpreted to be exclusive or limiting, but rather exemplary or illustrative.

Figure 2:
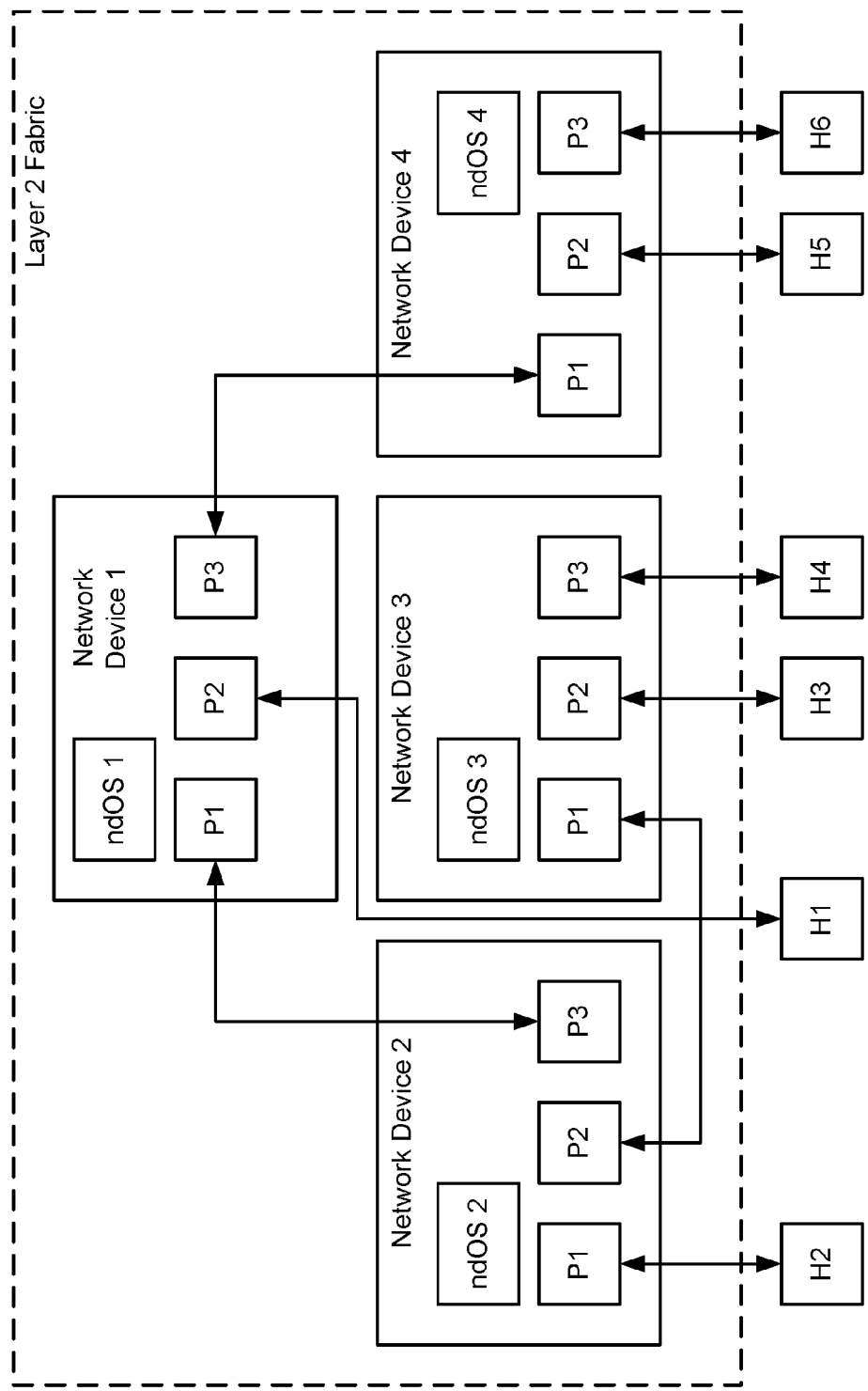
FIG. 2 shows a layer 2 fabric in accordance with one or more embodiments.

FIG. 2 shows a layer 2 fabric in accordance with one or more embodiments. In one embodiment, the layer 2 fabric includes four network devices (network devices 1-4), and each network device includes an ndOS that is defined to determine the layer 2 topology of the layer 2 fabric.

In the example shown in FIG. 2, network device 1 is directly connected to network device 2 and network device 4, and is indirectly connected to network device 3. Network device 2 is directly connected to network device 1 and network device 3, and is indirectly connected to network device 4. Network device 3 is directly connected to network device 2 and is indirectly connected to network device 1 and network device 4. Finally, network device 4 is directly connected to network device 1 and is indirectly connected to network devices 2 and 3. A given network device may communicate directly with any directly connected network device and may use other network devices in the layer 2 fabric to facilitate indirect communication with indirectly connected network devices. Not shown, but also within the scope of this invention are the use of any network of non-ndOS network device between any pair of network devices 1 to 4. In this case the non-ndOS network devices will forward packets using conventional Ethernet protocols, but the Network Devices 1 to 4 will in-effect be tunneling through the non-Layer 2 Fabric to join non-directly connected Layer 2 Fabrics into what in-effect acts like a directly connected Layer 2 Fabric.

In one embodiment, each ndOS is configured to monitor the network device on which it is executing to determine if (or when) there is a change in the local configuration information. If there is a change in the local configuration information, the ndOS is configured to communicate all (or a subset of) the updated local configuration information directly or indirectly to all of the other ndOS instantiations in the layer 2 fabric.

In one embodiment, a client executing on any host connected to any network device in the layer 2 fabric may initiate a request (described above) to the layer 2 fabric. In such cases, the request may be initially received by the closest ndOS to the host. For example, if host H5 issued a request to the layer 2 fabric, the request may be initially received by ndOS 4. Based on the nature of the request, ndOS 4 may send the request to one or more of the ndOS instances in the layer 2 fabric to process the request. In one embodiment, the client making the request has full visibility of the layer 2 fabric and, as such, can issue requests to any network entity in or connected to the layer 2 fabric.

In one embodiment, the request may include, but is not limited to, (i) a request to migrate a virtual machine (VM) from one host to another host, where both hosts are connected to the layer 2 fabric; (ii) a request to change an ACL for a given network entity, where the network entity is connected to the layer 2 fabric via a network device that is part of the layer 2 fabric; (iii) a request to perform analytics on a flow that is passing through at least one network device in the layer 2 fabric; (iv) a request to create a VM on a particular network device in the layer 2 fabric; (v) a request to create a VM on a host connected to a network device in the layer 2 fabric; (vi) a request to change a configuration parameter on a particular network device in the layer 2 fabric; (vii) a request to change a configuration parameter on two or more network devices in the layer 2 fabric; and (viii) a request to create a notification when there is a change in the layer 2 fabric (e.g., network device added, network device removed, change in link status of a link between network devices in the layer 2 fabric, creation of a VM on a network device in the layer 2 fabric, etc.), automatically detected VM migrations that were not directly notified to the fabric (for example based on noting a new physical port P1, P2, or P3 in this diagram that is carrying packets that can be recognized to originate from a given VM) and applying certain policy such as automatically move resource policies, notifying some other program, etc. The requests may include other actions to be performed not specified above without departing from the embodiments.

In one embodiment the request may be for performing analytics. The request to perform analytics may include a request to obtain all packets for a given flow (or set of flows), where the flow is passing through one network device on the layer 2 fabric. Because the layer 2 fabric includes a network distributed operating system (ndOS), a request to obtain all packets for a given flow may be received by any ndOS in the layer 2 fabric. The ndOS that receives the request will forward the request to the appropriate network device. In another embodiment, the request is to obtain all packets for a given flow (or set of flows), and the request is forwarded to a network device (referred to as monitoring network device) through which the flow passes. The monitoring network device may program its switch fabric classifier to identify all packets for the flow and to send all identified packets to the control processor (or to the network processing unit (NPU)). Upon receipt the control processor (or NPU) may make a copy of the packet. The monitoring network device may accumulate the copies of the packets and then subsequently transmit (via the network devices in the layer 2 fabric) the copies of the packets to the ndOS that initially received the request. Upon receipt, the ndOS may forward the copies of the packets to the host from which the request was received. Alternatively, the monitoring network device may store the accumulated copies on local storage, or transmit them to one more network device in the Layer 2 Fabric and device outside the Layer 2 Fabric for combination of storage or analysis.

Figure 3:
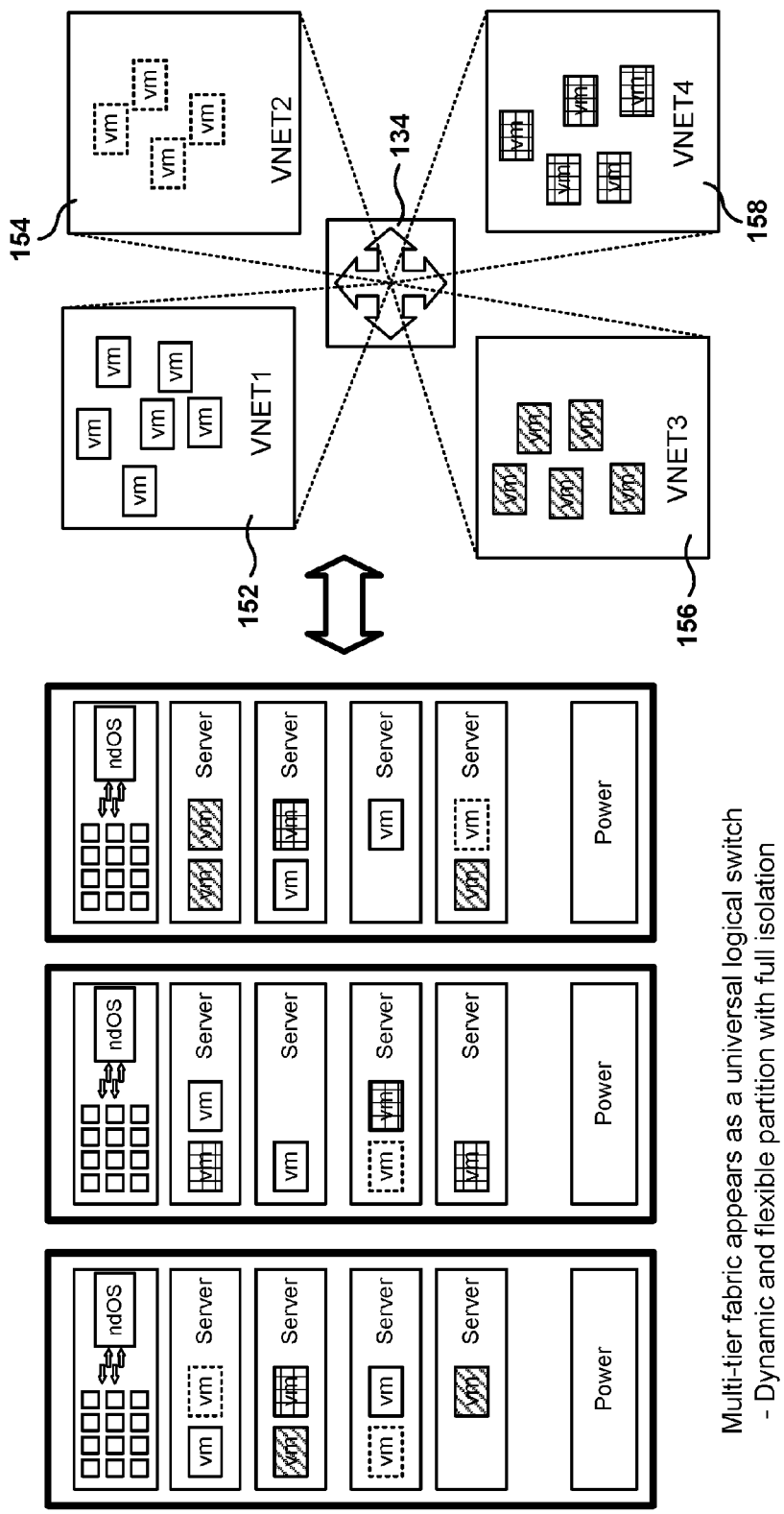
FIG. 3 illustrates a multitier fabric architecture, according to one embodiment.

FIG. 3 illustrates a multitier fabric architecture, according to one embodiment. The ndOS provides for the creation of different types of Virtual Networks 152, 154, 156, 158 (VNs, or vNets) and the assignment of resources and policies to the virtual networks, in one embodiment. In some sense, a vNet is not the same as an IEEE 802.1q VLAN, but instead, the 802.1q VLAN tag is just one of the possible attributes of the ndOS virtual network. The vNet is a collection of Virtual Machines, identified, for example, by their one or more MAC addresses, IP addresses, physical ports, etc., and has network attributes like VLAN tag, QoS labels, etc., associated therewith. In addition, the vNet also defines network resources like bandwidth guarantees, limits, latency ranges, queues, isolation semantics (in the form of virtual output queues, ingress and egress queues, etc.), number and performance and resource of virtual network services, etc. The scope of a vNet can be restricted to an individual switch (referred to as a local vNet) in the fabric, or to a cluster of switches (referred to as a cluster vNet) in the fabric, or to the entire fabric (global vNet).

In case where the host management is done by separate management software, ndOS provides APIs for external clients and agents to query the vNet information and its scope. Further, when the external agent or host management software wants to migrate a VM, the agent or host can query any ndOS instance to get a list of physical hosts which are allowed to host the virtual machine based on the scope of the vNet.

The ndOS extends the reach of the programmable layer 2 fabric when the hosts have virtualization-enabled network interface controller (NICs). Many modern NICs have some kind of virtualization support, for example built in the form of SR-IOV (Single root I/O Virtualization), an IEEE standard. This allows individual VMs to obtain part of the NIC resources, and the NIC itself appears directly mapped into the virtual machine. In one embodiment, the VM is directly able to communicate on the wire without its packets going through the hypervisor. This is good for performance but causes issues related to the informant of ACLs and bandwidth allotments. Even if a network interface card (NIC) provides a mechanism for ACL and bandwidth enforcements, the host administrator has to manually configure this parameters for the VM on the host.

Often times, a collection of VMs on different hosts belong to the same virtual network and need similar configuration. If the administrator has to configure each VM manually on each host, this configuration process is prone to human error. In addition, the VM cannot migrate dynamically because the administrator has to manually configure the same policy on the target host before allowing the VM to migrate. As shown in FIG. 3, by allowing the ndOS on the switch to control the NIC on the host (either via a dedicated control port, hypervisor APIs or an ndOS agent running on the hypervisor), ndOS can automatically configure the ACL and any bandwidth limits/guarantees on the NIC on the target host based on the overall policies specified for the vNet. This allows the VMs to dynamically migrate without any violation of SLA or security policies.

In addition to managing ACL and bandwidth guarantees and limits on a per-VM basis on individual hosts, ndOS can automatically configure priority based flow control (IEEE 802.1 Qbb); Enhanced Transmission Selection (IEEE 802.1 Qaz); Edge Virtual Bridging (802.1 Qbg); Layer 2 Congestion Notification (802.1 Qau), etc., for individual VMs based on the overall policies specified for the vNet or by the vNet administrator. For instance, the fabric or cluster administrator may specify that all VM-to-VM communication needs to be accounted on the switch, which would result in ndOS configuring each host NIC to disable VM switching, and instead forward all packets to the first hop switch. In another instance, ndOS would configure any ACL specified for the vNet on all hosts that have a member VM for that particular vNet. The vNet administrator may be given privileges to ask ndOS to assign Emergency Telecommunications Service (ETS) labels to different traffic types for its member VMs in which case ndOS will configure the NICs on all hosts that support a VM belonging to the particular vNet. As the VMs migrate, the VNIC (and any VLAN) configuration is automatically instantiated on the target host and NIC by ndOS.

NdOS supports management of VMs on the hosts and can directly control the VM migration, including moving the necessary attributes like ACL, bandwidth guarantees/limits, etc. on the target system before migrating the VM. NdOS also supports a split management model where a host management system triggers the migration of VMs to a target system. When the VM sends out an ARP packet on the receiving host, ndOS automatically recognizes the MAC address and the fact that the host has not seen the MAC address on that particular switch port. NdOS then figures out the old host for the moving VM, which can be connected on another port or to another switch, and then moves the attributes corresponding to the VM from the NIC on the original host to the NIC on the target host. Since ndOS is a distributed operating system and all instances share all necessary information, ndOS can support VM migration across any switch in the L2 fabric as long as the VM is allowed, based on the policy given to the ndOS, to migrate to the target host based on the scope of the vNet.

In one embodiment, the ndOS switch also supports virtual network machine (VNM) appliances such as load balancers, firewalls, or customer specific appliances, as well as deep analytic appliances for compliance, Distributed Denial of Service (DDoS) monitoring, etc.

In summary, the multi-tier fabric 134 appears as a universal logical switch, which means dynamic and flexible partition with full isolation, and instantiation of virtual appliances and virtual machines in the virtual networks created in the layer-2 fabric.

Figure 4:
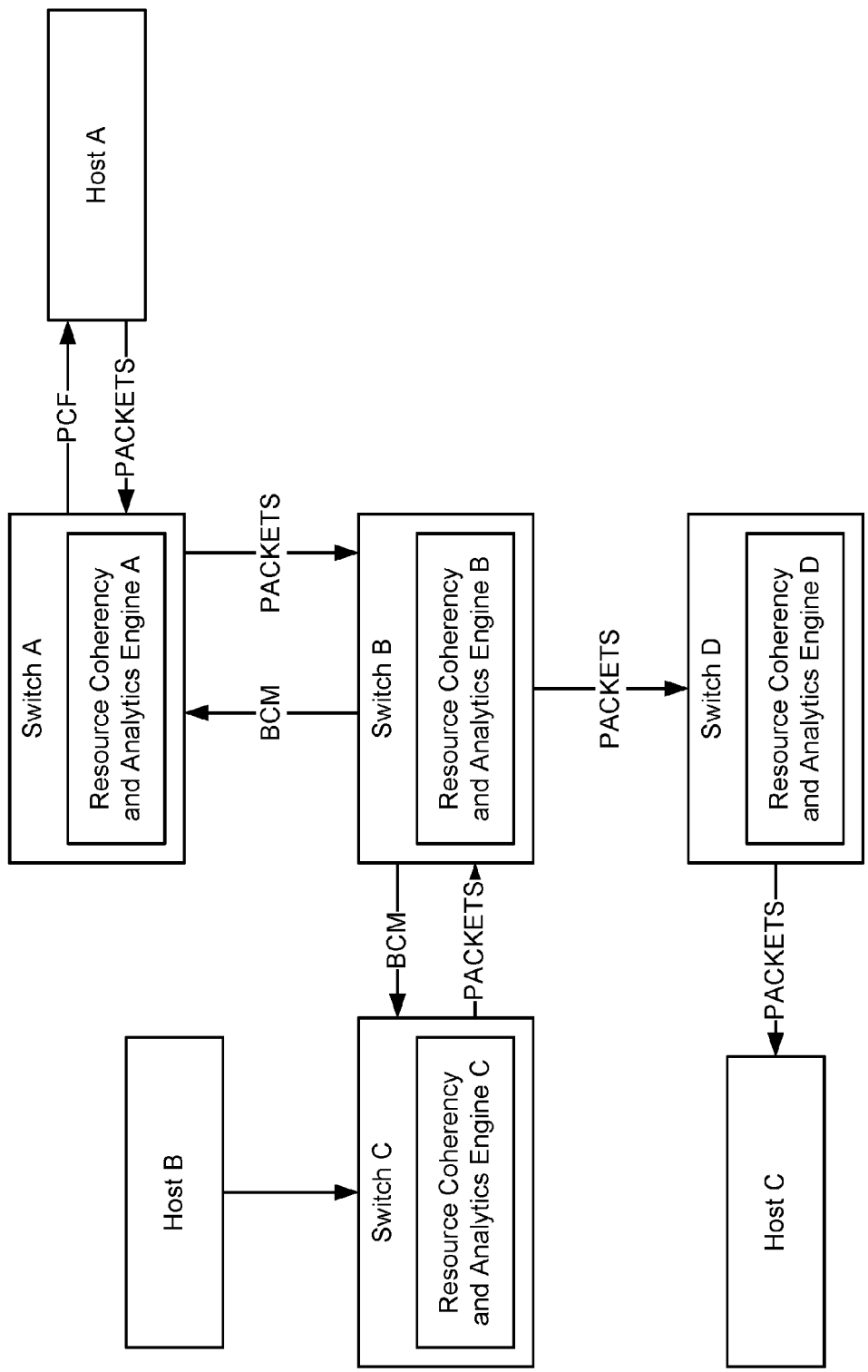
FIG. 4 shows an example of resource coherency and analytics control engine interacting to manage packet traffic across multiple switches, according to one embodiment.

FIG. 4 shows an example of resource coherency and analytics control engines interacting to manage packet traffic across multiple switches, according to one embodiment. For purposes of this example, it is assumed that hosts A, B, and C belong to the same virtual resource group (VRG) and, as such, are allowed to communicate with each other. Further, it is also assumed that hosts A and B are both sending packets to host C via switch D, and that the egress physical port (EPP) on switch B, that is connected to Switch D, is close to reaching its limited bandwidth (as defined by the virtualizable resource control list (VRCL) associated with the VRG).

Using Resource Coherency and Analytics engine (RCAE) statistics for RCAE B and a bandwidth notification threshold (i.e., a threshold above which the RCAE issues bandwidth control messages), RCAE B determines that the bandwidth notification threshold has been exceeded. The bandwidth notification threshold may be based on the depth of one or more of the virtual output queues (VOQ) associated. Alternatively, the bandwidth notification threshold may be deemed to be exceeded when RCAE B instructs the VTS to stop scheduling the packets in the VOQ for transmission or instructs the VTS to decrease a rate at which the VTS schedules the packets in the VOQ for transmission. Alternatively, the bandwidth notification threshold may be deemed to be exceeded if RCAE B determines that the average number of bytes or packets has exceeded some threshold over one or more timespans with some uniform or non-uniform moving average. Those skilled in the art will appreciate that the bandwidth notification threshold may be based on other metrics without departing from the embodiments.

In response to this determination, RCAE B reduces the drain rate for the EPP connected to switch D to prevent the EPP from reaching the limited bandwidth as specified in the VRCL. In addition, the above determination triggers the RCAE B to issue bandwidth control messages (BCM) to switch C and switch A. In one embodiment, the BCM to switch A includes, but is not limited to, information to identify the VRG associated with the VOQ on RCAE B that triggered the issuance of the BCM, information to identify the EPP on RCAE B (i.e., the EPP on switch C connected to switch D), information about the current depth of the VOQ in RCAE B of the VTS that processes packets received from switch A, and a recommended drain rate for the EPP in RCAE A that is connected to switch B.

Similarly, the BCM to switch C includes, but is not limited to, information to identify the VRG associated with the VOQ on RCAE B that triggered the issuance of the BCM, information to identify the EPP on RCAE B (i.e., the EPP on switch C connected to switch D), information about the current depth of the VOQ in RCAE B of the VTS that processes packets received from switch C, and a recommended drain rate for the EPP in RCAE C that is connected to switch B.

In one embodiment, the BCMs are transmitted to the appropriate switches using an out-of-band communication channel, i.e., a communication channel or connection that is different than the communication channel used to communicate packets between the switches.

In response to receiving the BCM from switch B, RCAE A in switch A may update one or more operating parameters in RCAE A. For example, the operating parameters for the VTS in RCAE A that is receiving packets from host A may be updated to decrease its drain rate for the EPP connected to switch B. In another embodiment, the vCoherence Controller (VCC) in RCAE A receives the BCM and updates the drain rate for the VOQs draining to the EPP on RCAE that is transmitted packets to Switch B. In one embodiment, the drain rate calculated for a VOQ using both RCAE statistics from RCAE A and the BCM from switch B is less than the drain rate calculated using on the RCAE statistics. Said another way, the VCC may use the BCM to further decrease the drain rate for a given VOQ, even though the RCAE statistic would allow for a higher drain rate. In another embodiment, RCAE A may requested by the BCM from switch B to drop a certain number of packets picked randomly or by deterministic order or by some flow classification, and may also request that certain flows are not dropped and have changes in their latency policies to meet some Layer 2 Fabric latency SLA, for example, etc. Other types of BCM messages may be used depending on how switch B determines to best control the bandwidth.

Further, switch A may issue a pause-control-frame (PCF) as defined by IEEE 802.3x or any other standard to host A. The PCF may request host A to decrease the rate at which host A sends packets to switch A.

In response to receiving the BCM from switch B, RCAE C in switch C may update one or more operating parameters in RCAE C. For example, the operating parameters for the VTS in RCAE C that is receiving packets from host C may be updated to decrease its drain rate for the EPP connected to switch B.

Each Resource Coherency and Analytics engine (RCAE) is configured to collect RCAE statistics. The RCAE statistics may be used to determine a round-trip delay of packets transmitted through a switch that includes an RCAE. In one or more embodiments, the RCAE uses the clock on the switch to calculate round-trip delays. The round-trip delay may be determined for both connection and connection-less protocols. More details regarding the implementation of RCAE are provided below with reference to FIGS. 15 and 16A-16D.

Figure 5:
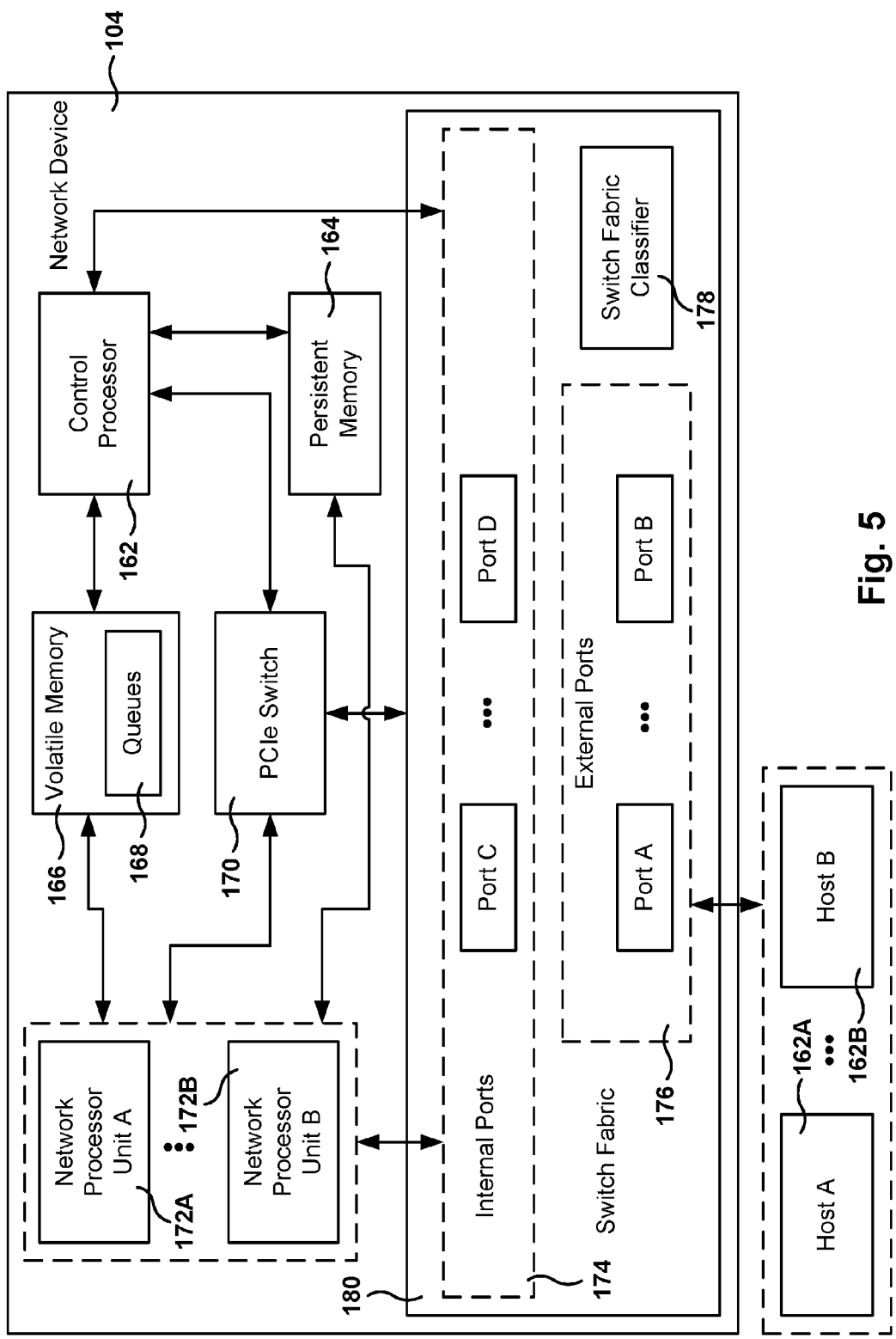
FIG. 5 shows a network device in accordance with one or more embodiments.

FIG. 5 shows a network device in accordance with one or more embodiments. In one or more embodiments, the network device 104 includes external ports 176, internal ports 174, a switch fabric classifier 178, one or more network processing units (NPUs) 172A-172B, also referred to herein as packet processors, a control processor 162, persistent memory 164, a Peripheral Component Interconnect Express (PCIe) switch 170, switch fabric 180 and volatile memory 166.

In one embodiment, the network device 104 is any physical device in a network that includes functionality to receive packets from one network entity and send packets to another network entity. Examples of network devices include, but are not limited to, single-layer switches, multi-layer switches, and routers. Network entities correspond to any virtual or physical device on a network that is configured to receive packets and send packets. Examples of network entities include, but are not limited to, network devices (defined above), virtual machines, host operating systems natively executing on a physical device (also referred to as hosts, see, e.g., 102A, 102B), virtual network appliances (e.g., virtual switch, virtual router), and physical network appliances (e.g., firewall appliance).

The network device 104 (or components therein) may be implemented using any combination of hardware, firmware, and/or software. With respect to the hardware, the network device may be implemented using any combination of general purpose hardware and/or special purpose hardware (e.g., Field Programmable Gate Arrays (FPGAs), Application Specific Integrated Circuits (ASICs), etc.) and any type of storage and/or memory including, but not limited to, random access memory (RAM), dynamic random access memory (DRAM), static random access memory (SRAM), NAND-type flash memory, NOR-type flash memory, any other type of memory, any other type of storage, or any combination thereof.

In one embodiment, the switch fabric 180 includes one or more internal ports 174, one or more external ports 176, and the switch fabric classifier 178. In one embodiment, the switch fabric classifier 178 may be implemented using an on-chip or off-chip Ternary Content Addressable Memory (TCAM) or other similar components. In one embodiment, the internal and external ports correspond to virtual or physical connection points. In one embodiment, the switch fabric may be implemented using packet switching, circuit switching, another type of switching, or any combination thereof. The external ports 176 are configured to receive packets from one or more hosts 162A-162B and to send packets to one or more hosts 162A-162B. While FIG. 5 shows the external ports connected only to hosts 162A-162B, the external ports 176 may be used to send and receive packets from any network entity.

In one embodiment, the internal ports 174 are configured to receive packets from the switch fabric 174 and to send the packets to the control processor 162 (or more specifically, the ndOS executing on the control processor) and/or to an NPU (172A, 172B). Further, the internal ports are configured to receive packets from the control processor 162 (or more specifically, the ndOS executing on the control processor) and the NPUs (172A, 172B).

In one embodiment, the control processor 162 is any processor configured to execute the binary for the ndOS. In one embodiment, the NPU is a specialized processor that includes functionality to processes packets. In one embodiment, the NPU may be implemented as any combination of general purpose hardware and/or special purpose hardware (e.g., Field Programmable Gate Arrays (FPGAs), Application Specific Integrated Circuits (ASICs), etc.) and any type of storage and/or memory including, but not limited to, random access memory (RAM), dynamic random access memory (DRAM), static random access memory (SRAM), NAND-type flash memory, NOR-type flash memory, any other type of memory, any other type of storage, or any combination thereof. In one embodiment, the network device (100) may also include Field Programmable Gate Arrays (FPGAs) and/or Application Specific Integrated Circuits (ASICs) that are specifically programmed to process packets. In one embodiment, the network device may include FPGAs and/or ASICs instead of NPUs. In one embodiment, processing packets includes: (i) processing the packets in accordance with layer 2, layer 3 and/or layer 4 protocols (where all layers are defined in accordance with the OSI model), (ii) making a copy of the packet, (iii) analyzing (including decrypting and/or encrypting) the content of the header and/or payload in the packet, and/or (iv) modifying (including adding or removing) at least a portion of the header and/or payload in the packet.

In one embodiment, the switch fabric 180 is configured to: (i) send packets received from the internal ports 174 to the appropriate external ports 176 and (ii) send packets received from the external ports 176 to the appropriate internal ports 174.

In one embodiment, the switch fabric classifier 178 is configured to apply a classification rule to each packet received by the switch fabric to determine: (i) whether to send the received packet to an external port, (ii) whether to send the received packet to an internal port, and/or (iii) whether to send the received packet to the PCIe switch 170.

In one embodiment, the classification rule includes a classification criteria and an action. In one embodiment, the classification criteria specifies a media access control (MAC) address, an Internet Protocol (IP) address, a Transmission Control Protocol (TCP), user datagram protocol (UDP), an OSI layer 4 information related to a TCP ports, an IPSec security association (SA), a virtual local area network (VLAN) tag, a 802.1Q VLAN tag, or a 802.1Q-in-Q VLAN tag, or any combination thereof. In one embodiment, the action corresponds to an action to be performed when a packet satisfying the classification rule is identified. Examples of actions include, but are not limited to, (i) forward packet to the control processor (via a specific internal port or the PCIe switch), (ii) forward packet to an NPU (via a specific internal port or the PCIe switch), and (iii) send a copy of the packet to a specific external port, count the packet into one byte and packet counter or into a plurality of such counters based on further criteria such as packet size, latency, metadata such as physical ports for ingress or egress, etc., add meta data to any copied or forward packet such as timestamps, latency, physical ingress or egress path, etc.

In one embodiment, the switch fabric 180 is configured to communicate with the control processor 162 and/or the NPUs 172A-172B using a Peripheral Component Interconnect Express (PCIe). Those skilled in the art will appreciate the other hardware based switching frameworks/mechanisms may be used in place of (or in addition to) PCIe.

In one embodiment, the persistent memory 164 is configured to store the binary for the ndOS. The persistent memory 164 may be implemented using any non-transitory storage mechanism, e.g., magnetic storage, optical storage, solid state memory, etc.

In one embodiment, the volatile memory 166 is configured to temporarily store packets in one or more queues 168. The volatile memory may be implemented using any non-persistent memory, e.g., RAM, DRAM, etc. In one embodiment, each of the queues is configured to only store packets for a specific flow. In one embodiment, a flow corresponds to a group of packets that all satisfy a given classification rule.

It is noted that the embodiments illustrated in FIG. 5 are exemplary. Other embodiments may utilize different communication interfaces (Ethernet, PCIe, PCI, etc.), network devices with less components or additional components, arrange the components in a different configuration, include additional interconnects or have fewer interconnects, etc. The embodiments illustrated in FIG. 5 should therefore not be interpreted to be exclusive or limiting, but rather exemplary or illustrative.

Figure 6:
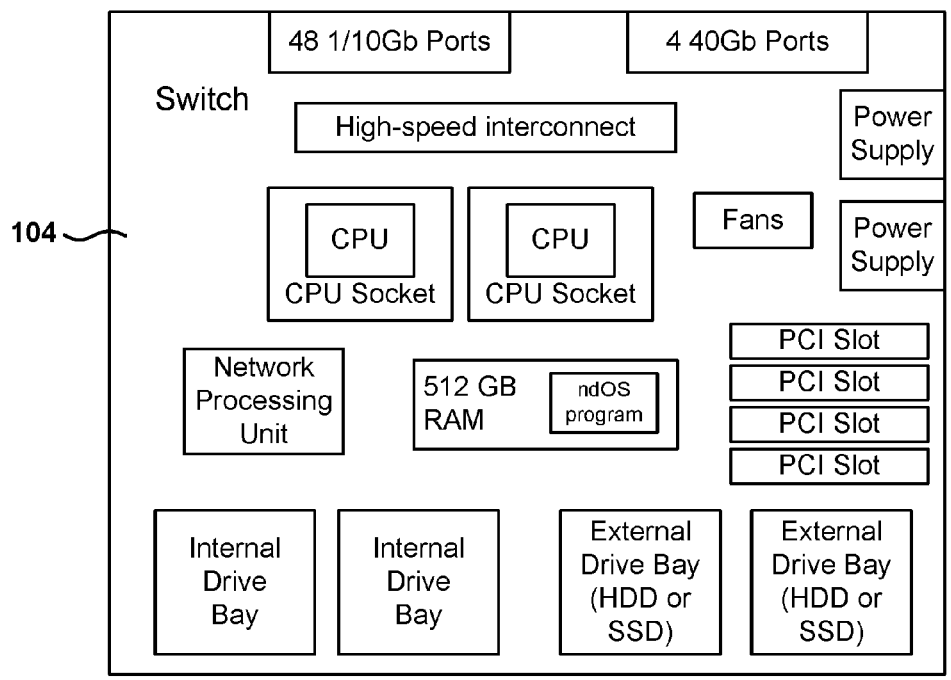
FIG. 6 illustrates an exemplary embodiment of a network device.

FIG. 6 illustrates an exemplary embodiment of a network device or switch. The exemplary ndOS switch 104 includes a plurality of Ethernet ports (e.g., 48 $\frac{1}{10}$ Gb ports and 4 40 Gb ports), a high-speed interconnect that connects the internal modules within the switch (e.g., PCIe, Ethernet), and 2 CPU sockets for hosting 2 respective CPUs.

The ndOS switch 104 further includes a networking processing unit and RAM (e.g., 512 Gb), which may host the ndOS program while being executed by the one or more CPUs. The switch 104 further includes 2 drive bays for internal non-volatile storage, and 2 external drive bays for external storage (e.g., hard disk drive (HDD) or solid state drive (SSD)). Additionally, the ndOS switch 104 includes one or more power supplies, PCI slots (e.g., 4 PCI slots), and fans.

It is noted that the embodiment illustrated in FIG. 6 is exemplary. Other embodiments may utilize different components, have more or less amount of any of the components, include additional components, or omit one or more components. The embodiment illustrated in FIG. 6 should therefore not be interpreted to be exclusive or limiting, but rather exemplary or illustrative.

Figure 7:
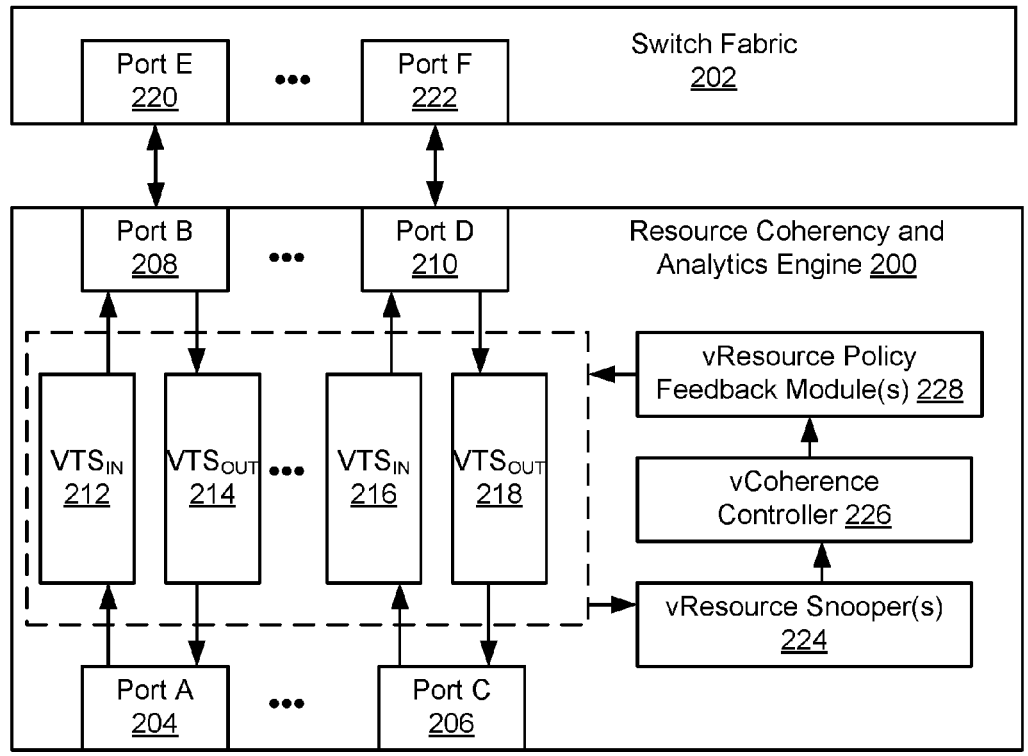
FIG. 7 illustrates resource coherency and analytics engines in accordance with one or more embodiments.

FIG. 7 illustrates resource coherency and analytics engines in accordance with one or more embodiments. The Resource Coherency and Analytics engine (RCAE) 200 interacts with a switch fabric 202 in accordance with one or more embodiments. The RCAE 200 includes ports (e.g., 204, 206, 208, 210) configured to receive packets from a network (e.g., a wide area network (WAN), a local area network (LAN), the Internet) or the switch fabric 202 and to provide the packets to the appropriate virtual traffic shaper (VTS) (e.g., 212, 214, 216, 218). The ports in the RCAE may also be used to transmit packets to a network or to the switch fabric. The switch fabric 202 is configured to receive packets from and send packets to the RCAE via ports (e.g., 220, 222) in the switch fabric.

Each VTS is configured to process the packets received from the aforementioned ports and, if appropriate, send the packets to another port in the RCAE. The VTS processes the packets based on operating parameters set by the vCoherence Controller (VCC) 226. In one embodiment, the operating parameters may be determined based on one or more of the VRCLs.

The operating parameters may include, but are not limited to, virtual output queue (VOQ) length, drain rate of VOQ (referred to as "drain rate"), cut-through policies, and VOQ scheduling policies. In one embodiment, the VOQ length corresponds to a maximum number of packets that may be queued in the VOQ at any one time. In one embodiment, the drain rate corresponds to the rate at which packets queued in a given VOQ are removed from the VOQ and scheduled for transmission. The drain rate may be measured as data units/unit time, e.g., megabits/second. In one embodiment, cut-through policies correspond to policies used to determine whether a given packet should be temporarily stored in a VOQ or if the packet should be sent directly to a VOQ drainer. In one embodiment, VOQ scheduling policies correspond to policies used to determine the order in which VOQs in a given VTS are processed.

The VCC 226 obtains RCAE statistics from the vResource Snooper (VRS) 224 and uses the RCAE statistics to update and/or modify, as necessary, the operating parameters for one or more VTSs in the RCAE. In one embodiment, the VCC 226 may obtain RCAE statistics directly from the individual VTSs. Those skilled in the art will appreciate that other mechanisms may be used to obtain the RCAE statistics from the VTS by the VCC without departing from the embodiments.

In some embodiments, the VCC 226 includes functionality to obtain RCAE statistics from all VRSs 224 in the RCAE and then to change the drain rates (described below) for one or more VOQ drainers based on the RCAE statistics obtained from all (or a portion) of the VTSs. The VCC 226 may also provide particular RCAE statistics to the VTS or components within the VTS, e.g., the VRCL enqueuer and VOQ Drainer, in order for the VTS (or components therein) to perform their functions.

The RVS 224 is configured to obtain RCAE statistics from the individual VTSs. The RCAE statistics may include, but are not limited to, (i) packets received by VTS, (ii) packets dropped by VRG classifier, (iii) packets dropped by the VRCL enqueuer, (iv) packets queued by each VOQ in the VTS, (v) number of cut-through packets, (vi) queue length of each VOQ in the VTS, (vi) number of packets scheduled for transmission by VOQ drainer, and (vii) latency of VTS. The RCAE statistics may be sent to the VRS 224 as they are obtained or may be sent to the VRS 224 at various intervals. Further, the RCAE statistics may be aggregated and/or compressed within the VTS prior to being sent to the VRS 224.

In one embodiment, updates or modifications to the operating parameters of the one or more VTSs are sent to the vResource Policy Feedback Module (RPFM) 228. The RPFM 228 communicates the updates and/or modifications of the operating parameters to the appropriate VTSs. Upon receipt, the VTSs implement the updated and/or modified operating parameters. In another embodiment, any updates or modifications to the operating parameters of the one or more VTSs are sent directly to the VTSs from the VCC.

Figure 8:
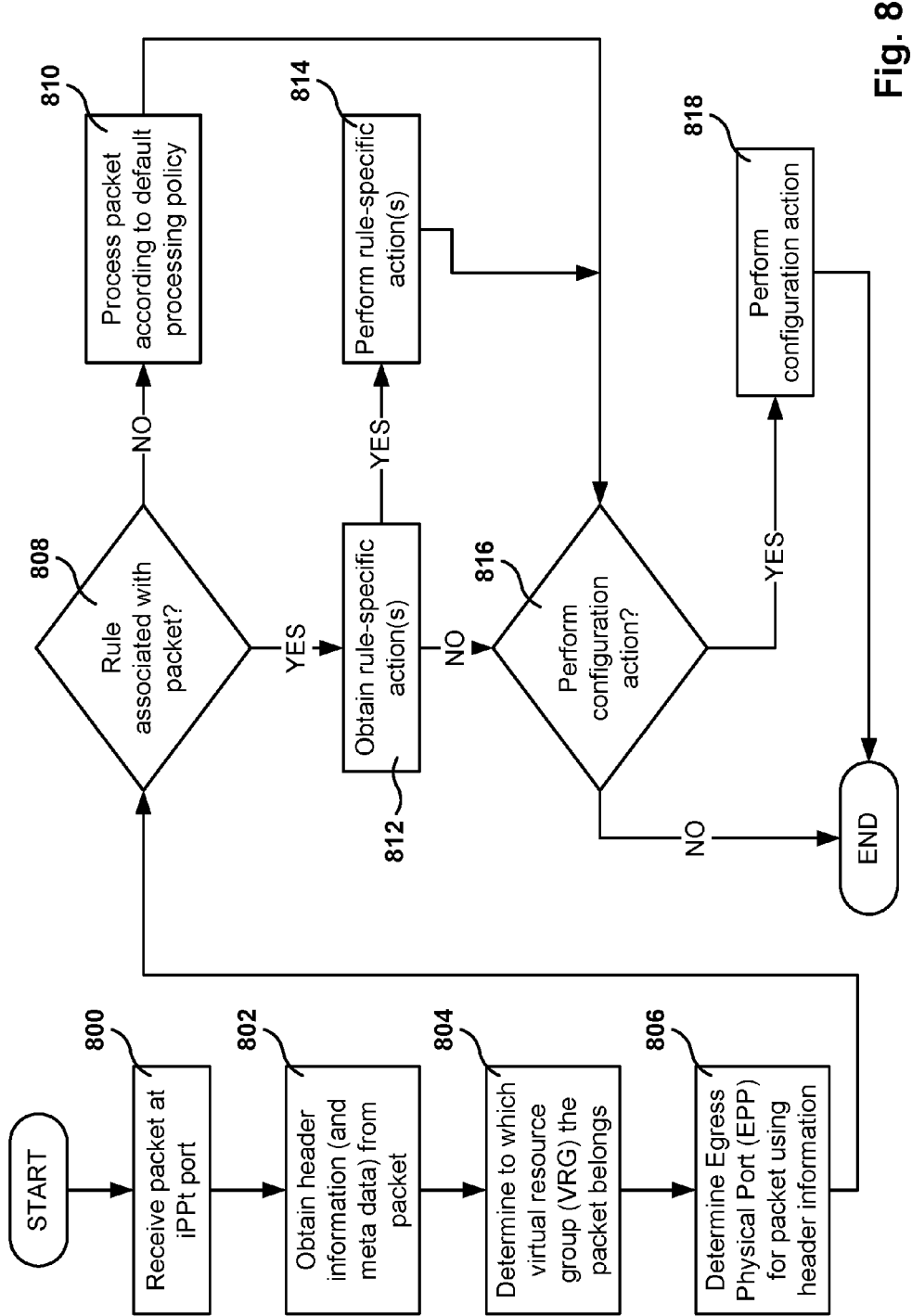
FIG. 8 is a flowchart of an algorithm for processing packets received by a virtual traffic shaper (VTS) in accordance with one or more embodiments.

FIG. 8 is a flowchart of an algorithm for processing packets received by a VTS in accordance with one or more embodiments. While the various operations in this flowchart are presented and described sequentially, one of ordinary skill will appreciate that some or all of the operations may be executed in a different order, be combined or omitted, or be executed in parallel.

In operation 800, a packet is received at an input port for the network device. The packet is then forwarded to the appropriate packet processor (PP) VTS. In operation 802, the header information and/or meta-packet data is obtained from the packet. In one embodiment, operation 802 is performed by a VRG classifier.

In operation 804, the VRG associated with the packet is determined using the header information obtained in operation 802. In one embodiment, operation 802 is performed by a VRG classifier. In operation 806, the egress physical port (EPP) is determined using the header information. In one embodiment, operation 806 is performed by a VRG classifier.

In operation 808, a determination is made about whether the packet is associated with a rule. In one embodiment, a look-up is performed using the VRG-EPP information obtained in the prior operations. If there is a hit for the VRG-EPP pair—namely, a corresponding entry in data structure, then the process proceeds to operation 812. Alternatively, if there is no hit then the process proceeds to operation 810.

In operation 810, a default action is performed. The process then proceeds to operation 816. In operation 812, the rule-specific action(s) associated with the rule are obtained. In operation 814, the rule specific actions are performed. The process then proceeds to operation 816. In operation 816, a determination is made about whether a trigger condition exists. If a trigger condition exists, then the process proceeds to operation 818; otherwise the process ends. In operation 818, an appropriate configuration action is performed. In one embodiment, the configuration performed in operation 818 corresponds to a micro-level policy.

FIGS. 9A-9H illustrate sample embodiments of a switch module coupled to one or more servers and a switch controller. As previously described with reference to FIG. 1A, a data center rack often includes servers and a top-of-the rack (TOR) switch to connect the rack devices to a network. Of course, although TOR switches are used for description purposes, the principles presented herein may be applied to switches situated in any position on the rack.

Embodiments provide for devices that combine server functions with switching capabilities. This way, one device in the rack can act as a dual purpose device providing server functionality and network capabilities. However, these multi-function devices may also be installed in racks with a separate ndOS switch (e.g., see FIG. 9B).

For description purposes, a device with multiple servers and switching capabilities is referred to herein as a "multi-server with switching" device. Additionally, when the functionality of a single server is combined with switching functionality, the resultant device is referred to as a "single-server with switching" device. Further, a "switching server" or a "networking device system" is used for description purposes to describe the functionality of either a multi-server with switching or a single-server with switching.

Some embodiments include ndOS inside the switching server, which means that the functionality of ndOS may be expanded to components inside the switching server, which allows further control of the layer 2 fabric by implementing networking policy on packets even before the packets leave the switching server.

Figure 9A:
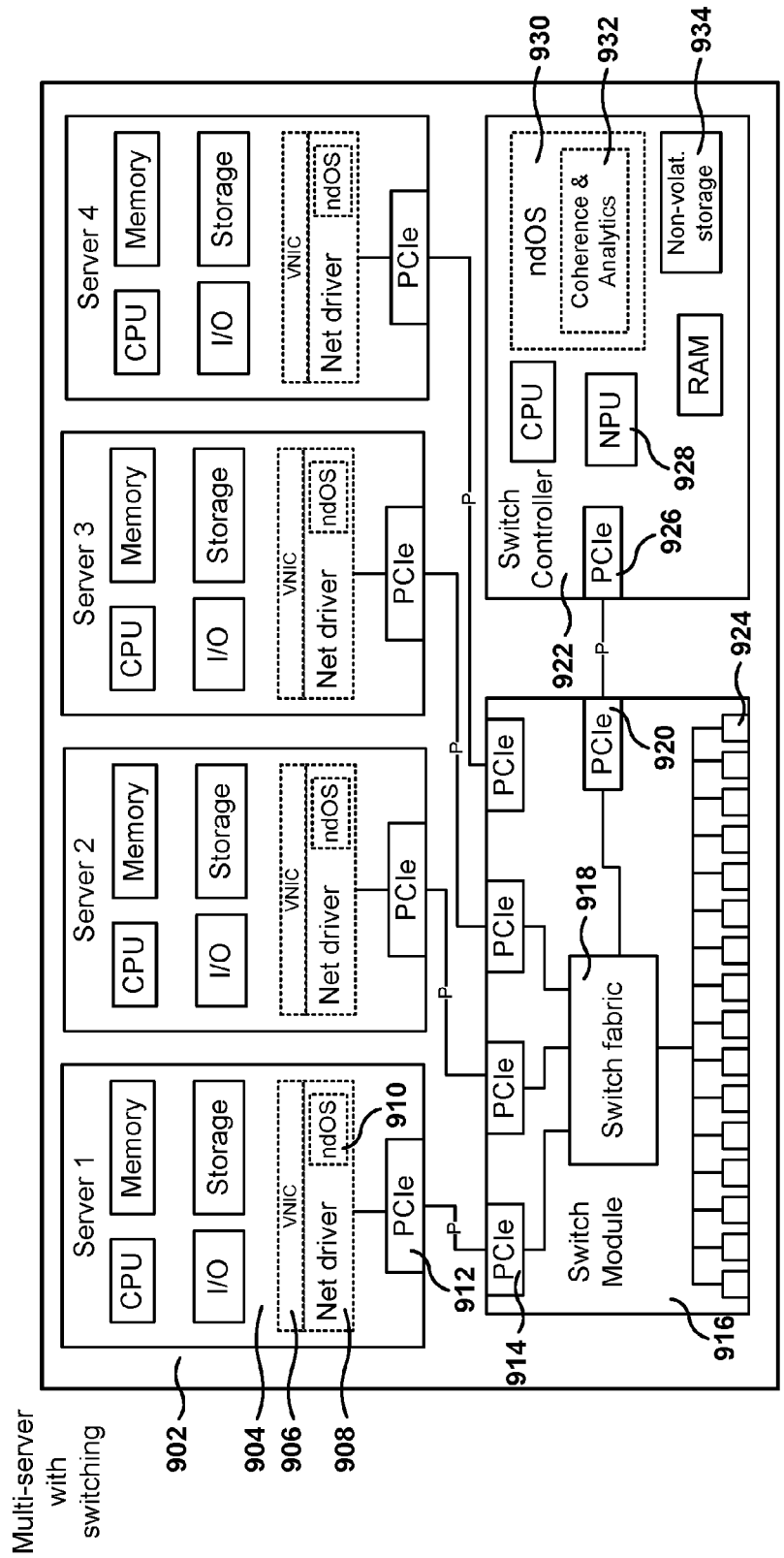
FIGS. 9A-9H illustrate sample embodiments of a switch module coupled to one or more servers and a switch controller.

FIG. 9A is a multi-server with switching ndOS device 902 that includes 4 servers 904, a switch module 916 (e.g., an integrated circuit), and a switch controller 922 (e.g., a switch controller card coupled to a PCIe port), according to one embodiment.

Switch module 916 includes switch fabric 918, a plurality of PCIe ports 914 and 920, and a plurality of Ethernet ports 924. Each of the servers includes a PCIe port 912 and the servers are coupled to the switch fabric 916 via the PCIe connections. In addition, a switch controller 922 is also coupled to the switch module 916 via PCIe port 926. In one embodiment, switch module 916 is an integrated circuit, and in other embodiments, switch module 916 may include a plurality of components that interact to provide the functionality described herein.

In one embodiment, switch module 916 provides networking capabilities for the servers. However, the servers do not include a network interface card (NIC), but the servers communicate via PCIe connections to the switch module that provides networking capabilities for the servers. Therefore, the switch module 916 acts as a NIC for the four servers. In one embodiment, the four servers share other resources, such as a power supply.

To provide networking capability at the servers (e.g., Ethernet networking), a network driver 908 is installed in the operating system executing at each of the servers. The network driver 908 provides a virtual network interface card (VNIC) for the applications executing on the servers. Therefore, applications running in the servers will access the VNIC 906 to access the network. In other words, although server 1 904 does not include an Ethernet VNIC, server 1 904 provides the Ethernet NIC capabilities via software driver 908. Ethernet packets are transferred through the PCIe connection (e.g., PCIe 912 to PCIe 914) and out to the network via Ethernet ports 924.

In one embodiment, the network driver 908 includes ndOS capabilities. Because ndOS is a distributed network operating system, all or some of the features mentioned above for ndOS may be implemented at the network driver 908 inside the server. For example, a network administrator may configure the ndOS 910 to not switch any packets at the network driver 908, not even those packets that originate at server 1 and are addressed for server 1, and send those packets to the switch module 916 so analytics may be performed on these packages (e.g., monitor the flow of packets through the layer 2 fabric).

Because the servers are separate from the networking functions provided by the switch module 916, users can upgrade the servers (e.g., add new processors, or replace the server card altogether) without having to upgrade the networking devices.

Managing the networking for the multi-server unit is a difficult task since the four servers are sharing networking. However, because of the flexibility of ndOS and its ability to automatically configure the layer 2 fabric, it is possible to manage the networking features for the multi-server unit easily.

The switch controller 922 includes, besides the PCIe port 926 mentioned above, a CPU, a network processing unit 928, RAM, and non-volatile storage 934. Switch controller 922 includes a program that implements the ndOS 930, including the coherence and analytics modules 932 associated with the ndOS, when executed by the processor.

In one embodiment, switch module 916, together with switch controller 922, provide similar functionality to the ndOS switch described hereinabove (e.g., FIGS. 5-7). But the combination also provides the PCIe interface used to provide networking services to the servers inside the multi-server with switching device 902.

In one embodiment, a networking device system 902 includes a switch module 916, a plurality of servers 904, and switch controller 922. The switch module includes one or more ports with a communications interface of a first type (CI1) (e.g., PCIe, although other communication interfaces are also possible) and one or more ports with a communications interface of a second type (CI2) (e.g., Ethernet, although other communication interfaces are also possible).

The plurality of servers is in communication with the switch module via first CI2 couplings, the servers including a respective virtual CI1 driver that provides a CI1 interface to applications in the respective server. Each virtual CI1 driver is defined to exchange CI1 packets with the switch module via the first CI2 coupling, and each virtual CI1 driver also includes a first network device operating system (ndOS) program.

The switch controller is in communication with the switch module via a second CI2 coupling, the switch controller including a second ndOS program that, when executed by a processor, controls packet switching policy in the switch module. The packet switching policy, also referred to herein as the networking policy or global switching policy, includes a definition for switching incoming packets through the switch module or through the switch controller. The first ndOS programs and the second ndOS program, when executed by respective processors, exchange control messages to maintain the network policy for the layer 2 switch fabric.

In another embodiment, the switch module further includes a classifier, the classifier implementing the packet switching policy for incoming packets. The second ndOS is defined to configure the classifier to implement the packet switching policy.

In just another embodiment, the first ndOS and the second ndOS are defined to interact with other ndOS programs in layer 2 switch fabric. Further, packets switched by the switch controller are sent from the switch module to the memory in the switch controller.

In yet another embodiment, the switch controller further includes a packet processor. In addition, the switch module further includes a switch fabric defined to switch packets between ports.

It is noted that the embodiments illustrated in FIG. 9A are exemplary. Other embodiments may utilize different number of servers, different switch modules, different switch controller's, etc. The embodiments illustrated in FIG. 9A should therefore not be interpreted to be exclusive or limiting, but rather exemplary or illustrative.

Figure 9B:
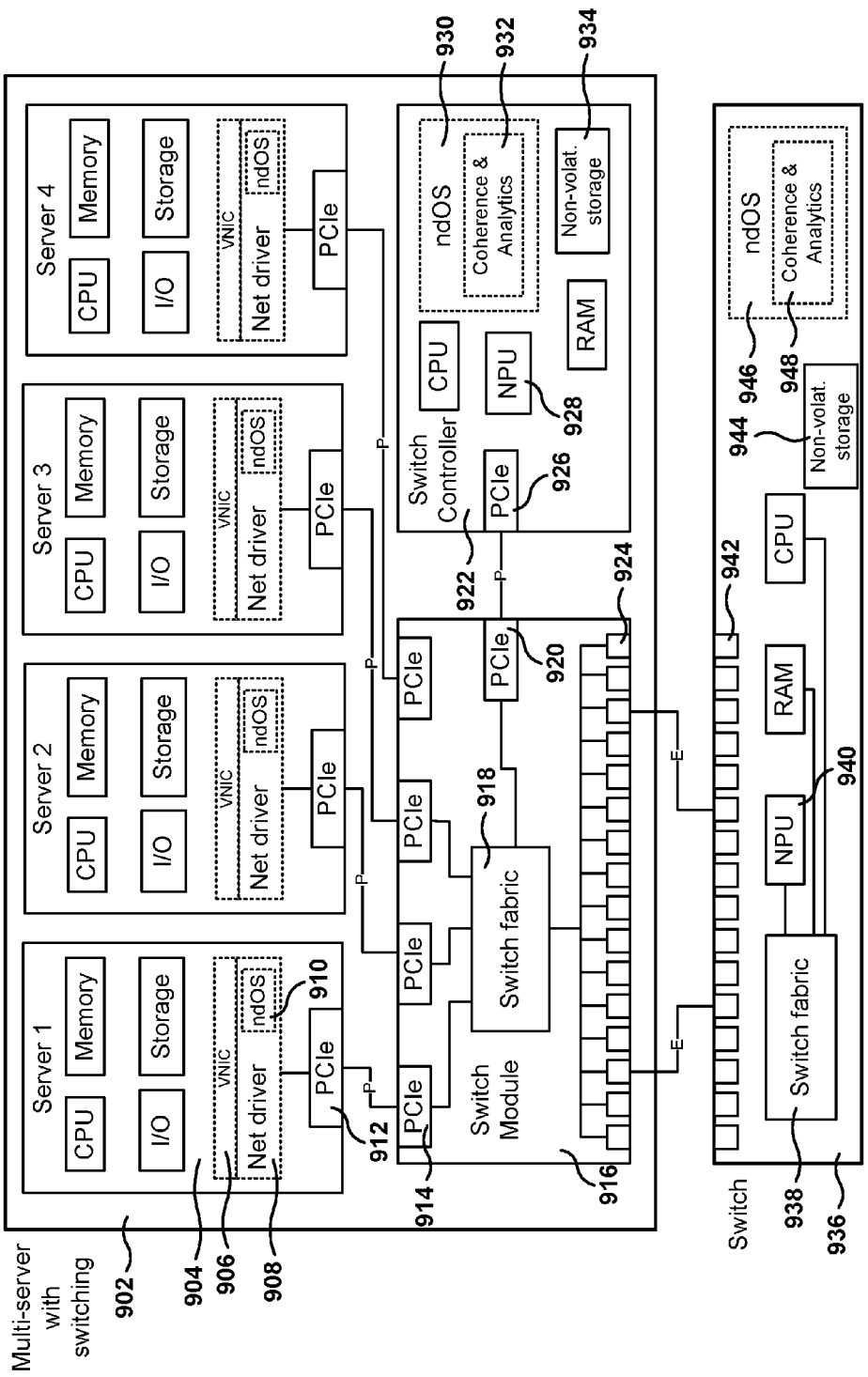

FIG. 9B is a multi-server with switching ndOS device 902 coupled to a TOR switch 936 via Ethernet ports, according to one embodiment. The TOR switch 936 includes a switch fabric 938, Ethernet ports 942, NPU 940, a processor, RAM, non-volatile storage 944, and an ndOS module 946 (e.g., program) that includes a coherence-and-analytics engine 948.

Because ndOS is a distributed network operating system and is present in the server network driver 908, in the switch controller 922 (which manages the switch module 916), and in TOR 936, it is possible to implement a packet switching policy (i.e., a layer 2 fabric policy) that is centrally managed and implemented across the network. The packet switching policy or network policy includes the rules and configurations defined for managing resources on the network, such as:

- managing resources across the switch fabric, managing flows and service levels, managing bandwidth, creation/management of VRGs, creation/management of access control lists (ACL) and VRCLs, performing analytics on flows passing through network devices,
- defining how packets are switched in the ndOS switch (e.g., through the switch fabric, the packet processor, or the processor in the switch controller), maintaining policies for MAC address management at the switch (see more details below with reference to FIGS. 12A-12B and 13), delivering defined SLAs,
- supporting policies and protocols for exchanging information among ndOS devices, exchanging topology information among ndOS devices, creation and modification of configuration parameters on network devices, notification of changes in the layer 2 fabric, discovery of ndOS switches,
- creation and management of virtual networks, isolation of traffic from virtual networks, tagging of packets, support for SLAs in each virtual network,
- creation of virtual machines (VM) on the switch, creating of VMs on hosts, migrating VMs from one host to another host, interfacing with hypervisors on hosts, providing boot images for hosts (see more details below with reference to FIGS. 11A-11B), etc.

As previously discussed with reference to FIGS. 1A-1B, the ndOS modules distributed across the layer 2 fabric are able to exchange information to implement a layer 2 fabric that appears, from the management perspective, as one big switch that includes all the switching devices having ndOS. Therefore, the ndOS modules 910, 930, and 946 exchange information to implement the global switching policy.

In one embodiment, the ndOS module 910 inside each server is managed by the ndOS module 930 in the switch controller. This way, the implementation of the ndOS module 910 in the servers can be simplified, leaving some of the ndOS features to be supported by the ndOS module 930 in the switch controller.

Figure 9C:
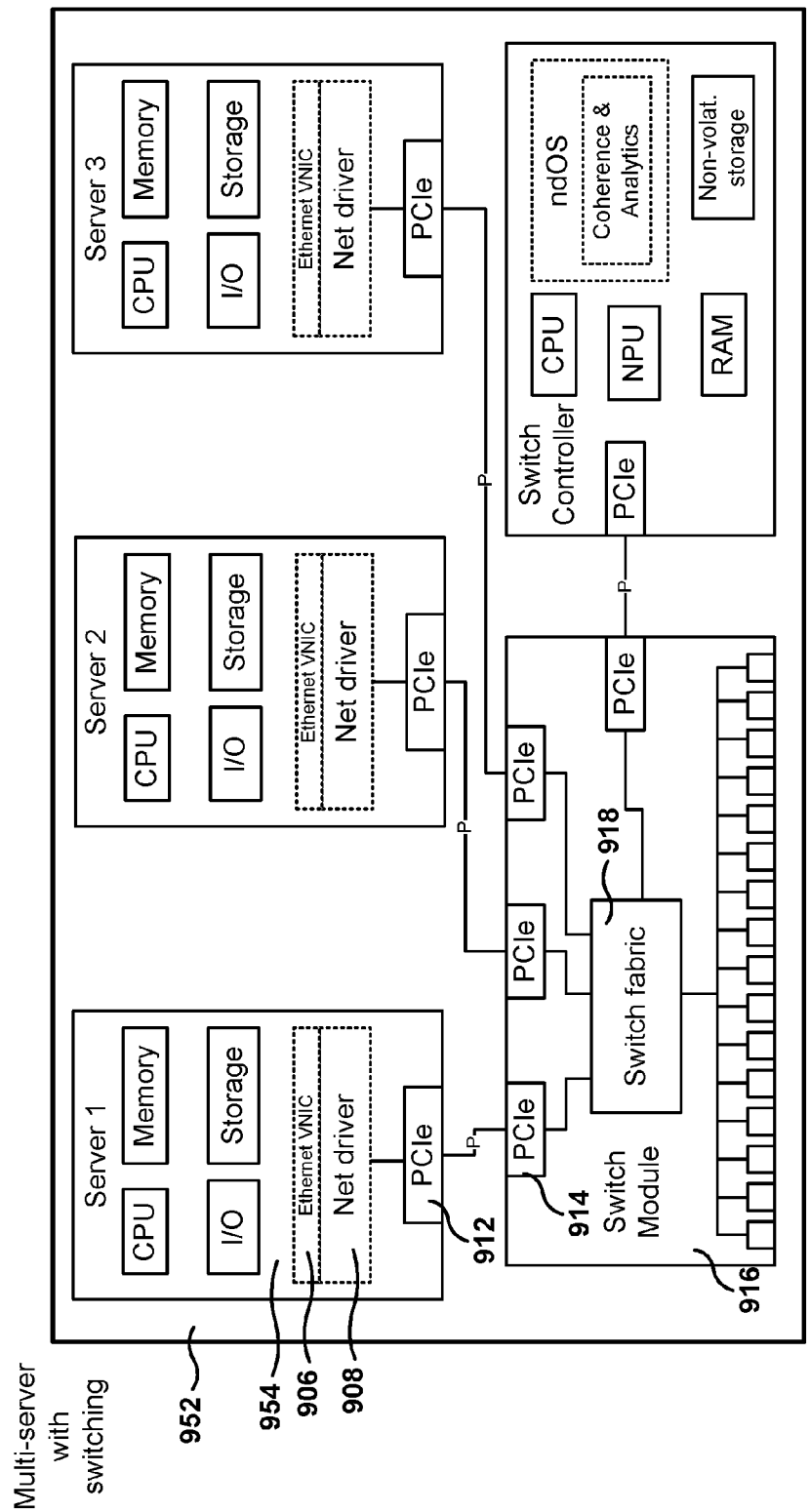

FIG. 9C is a multi-server with switching ndOS device 952 with three servers and virtual Ethernet VNICs 906 inside each server, according to one embodiment. In the embodiment of FIG. 9C the network driver 908 does not include an ndOS module. In this case, the network driver 908 provides a virtual Ethernet NIC for Server 1. From the point of view of the operating system executed in server 1, the Ethernet driver 906 behaves exactly as a hardware NIC. The VNIC 906 receives Ethernet packets from the operating system or the applications in server 954, and transmits those packets to the switch module 914 via the PCIe connection between server and switch module 916. Respected VNIC Ethernet drivers in the other servers also provide the Ethernet VNIC functionality.

In one embodiment, the network driver 908 may create a plurality of VNICs (not shown), each VNIC appearing to the operating system as one physical hardware NIC. For example, in one embodiment, network driver 908 can create up to 255 VNICs. Of course, each of the VNICs will route its Ethernet traffic through the PCIe port to the switch module 914.

Since the network driver 908 receives Ethernet packets and sends them through the PCIe connection, the network driver 908 performs a conversion or an encapsulation of the packets to transmit them through the PCIe port. In one embodiment, the Ethernet packets are encapsulated and transmitted through the PCIe connection, and the switch module 914 de-encapsulates the Ethernet packets before sending them through its Ethernet ports.

The network driver includes buffer and DMA management to provide the required lossless behavior on the PCIe port and channel with the required polling or interrupt based notification, and the buffer and Ethernet format header and CRC on the Ethernet ports and the ability to convert as needed. In additional fragmented packets are reconstructed as needed before transmission on PCIe, and larger PCIe packets are fragmented as required by the Ethernet port max packet size.

It is noted that the embodiments illustrated in FIG. 9C are exemplary. Other embodiments may utilize different number of servers, support other communication interfaces, etc. The embodiments illustrated in FIG. 9C should therefore not be interpreted to be exclusive or limiting, but rather exemplary or illustrative.

Figure 9D:
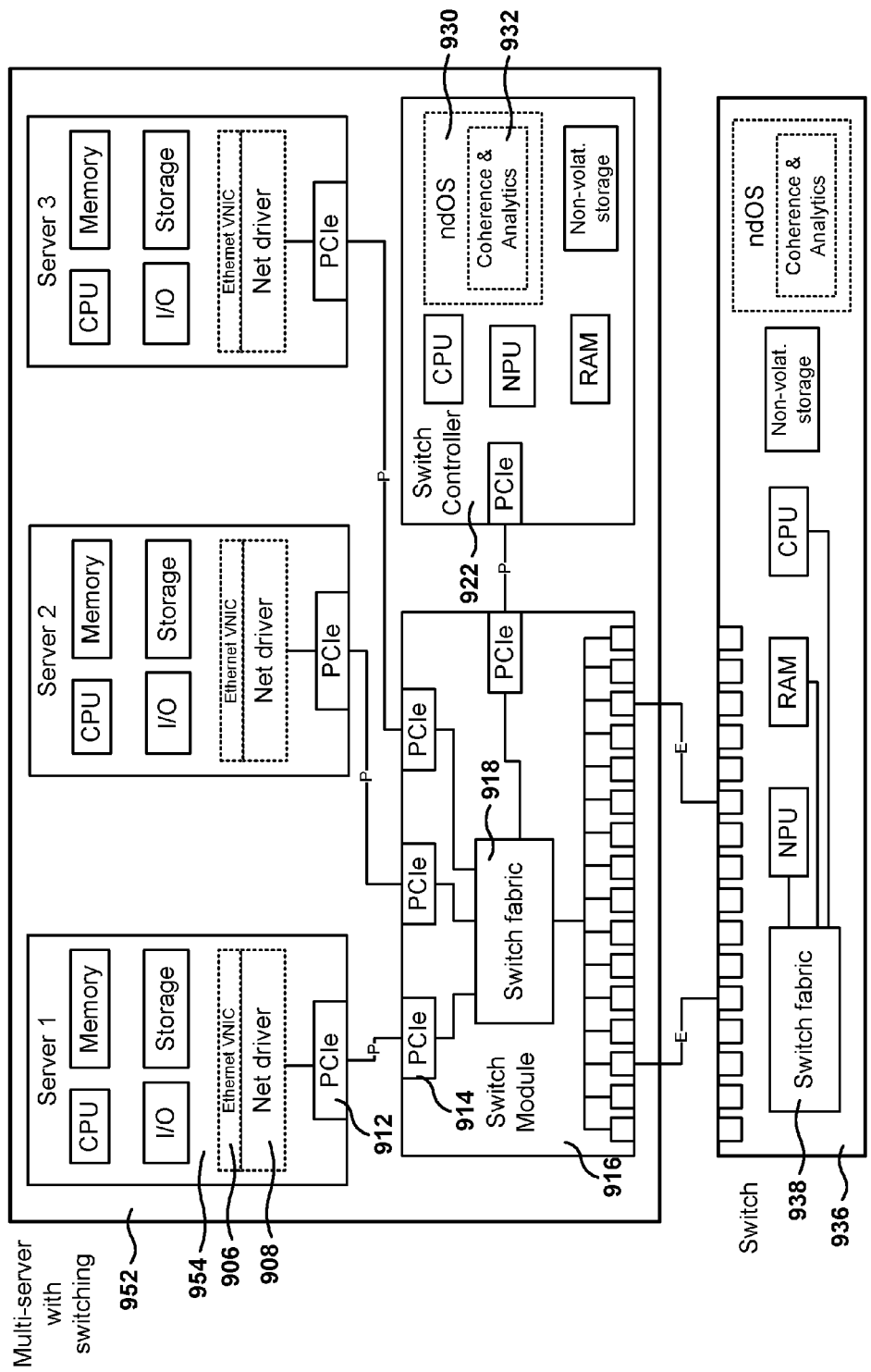

FIG. 9D shows the multi-server with switching 952 of FIG. 9C coupled to a TOR switch 936, according to one embodiment. In this embodiment, the ndOS is present in the switch controller and in the TOR switch 936. The ndOS functionality is therefore present in the multi-server 952 and in the external switch.

In one embodiment, although the network driver 908 does not have ndOS capabilities, the ndOS module 930 in switch controller 922 interacts with the network driver 908 to manage the network traffic flowing through network driver 908. For example, the ndOS module 130 may command the network driver 908 to reduce the flow of traffic flowing into the network in the presence of network congestion. This means that, although network driver 908 does not implement ndOS, network driver 908 can still assist ndOS module 930 in the switch controller to implement ndOS policies.

In another embodiment, the ndOS module 930 is able to act as an arbitrator between the traffic generated by all the servers in multi-server unit 952. The ndOS module 930 may implement network policies (e.g., bandwidth control) at the server level, instead of having to manage the policies at the multi-server level. For example, if the ndOS 930 detects that one of the servers is producing a large amount of traffic, causing network congestion on the other servers, ndOS 930 is able to exchange control messages with the network driver 908 to decrease the flow of packages (e.g., reduce the bandwidth allocated to the VNIC) coming from the server monopolizing network traffic on the multi-server unit.

Once the congestion disappears, the ndOS 930 may command the Ethernet driver in the corresponding server to restore the original bandwidth allocated to the VNIC.

In another embodiment, the ndOS 930 may also establish use policies among the different servers, even if the absence of network congestion. For example, if the network administrator allocates 30 Gb of traffic to the multi-server 952, the ndOS may configure each of the network drivers 908 to a maximum of 10 Gb. However, the assignment on bandwidth does not have to be symmetrical. For example, if one of the servers is a web server expecting to generate a large amount of traffic from users, the ndOS 930 may allocate 20 Gb to this server, and 5 Gb to the other two servers.

Figure 9E:
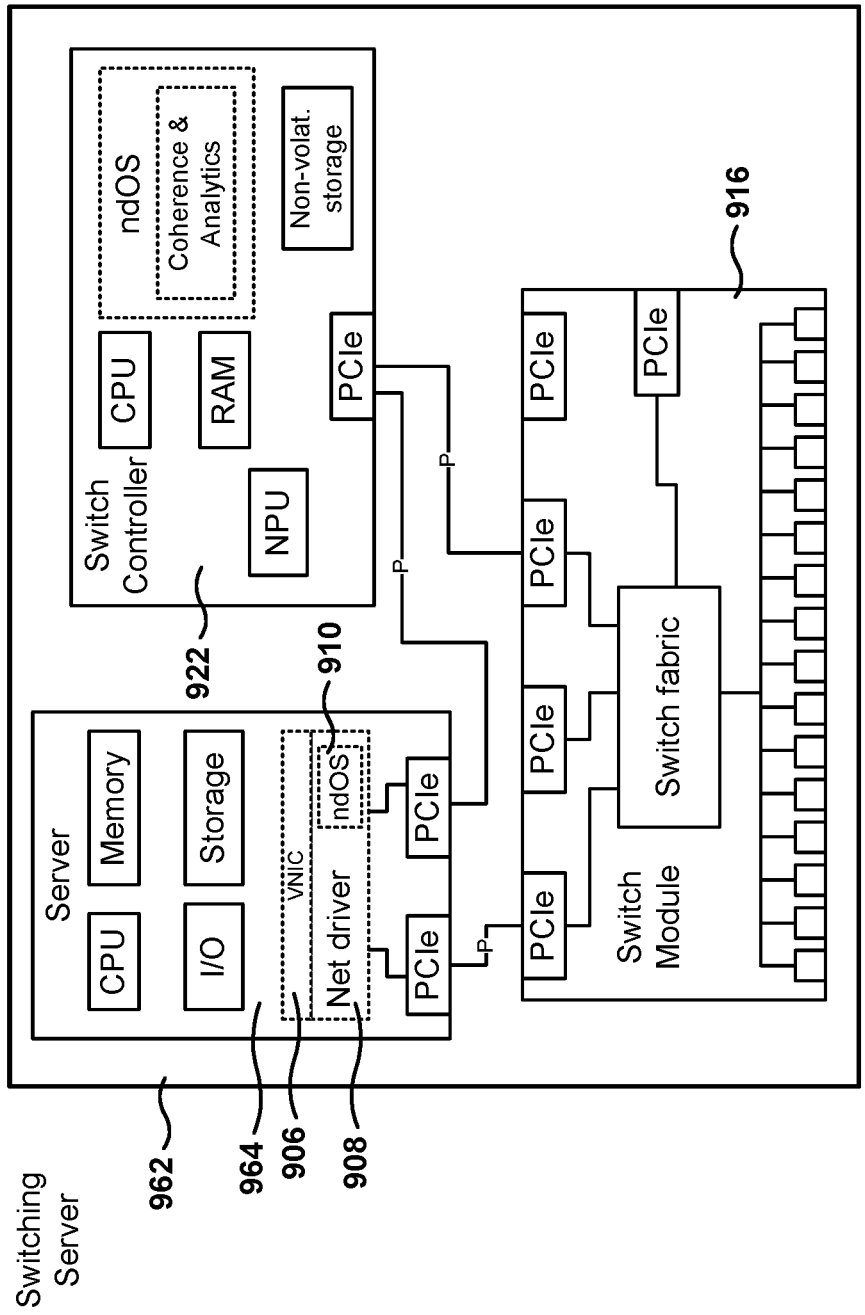

FIG. 9E is a single-server with switching 962, according to one embodiment. In the embodiment of FIG. 9B, the switching server 962 includes server 964, switch module 916, and switch controller 922. In this exemplary embodiment, the switch controller is also coupled to the server via a PCIe connection. (It is noted that the direct communication between switch controller and server is also present in some embodiments for the devices of FIGS. 9A-9D). Therefore, the switch controller 922 may communicate directly with ndOS 910 to implement network policies. In other embodiments, the switching server does not include a direct connection between server 964 and switch controller 922.

In one embodiment, NdOS 910 has all the features of an ndOS device. Therefore, ndOS 910 is able to implement network policies regarding traffic and service levels at the server level. For example, if server 964 includes a plurality of virtual machines, ndOS 910 may implement resource allocation (e.g., bandwidth assignments) among the different virtual machines. In addition, ndOS 910 is able to implement virtual LAN functionality and keep separate the traffic for VMs in different VLANs (e.g., the VMs in the different virtual networks described in FIG. 3).

In one embodiment, the switch module 916 includes a classifier (not shown) and ndOS 930 configures the classifier in switch module 916 to determine how packets are switched. In one embodiment, the network packets may be switched through the switch fabric, through the NPU in switch controller 922, or through the processor in the switch controller 922. The classifier determines how each packet is routed according to the rules programmed into the classifier.

In one embodiment, a networking device system includes a switch module, a server, and the switch controller. The switch module has one or more ports with a communications interface of a first type (CI1) and one or more ports with a communications interface of a second type (CI2). Further, the server is in communication with the switch module via a first CI2 coupling, the server including a virtual CI1 driver that provides a CI1 interface to applications in the server. The virtual CI1 driver is defined to exchange CI1 packets with the switch module via the first CI2 coupling, and the virtual CI1 driver further includes a first network device operating system (ndOS) program.

The switch controller is in communication with the switch module via a second CI2 coupling, and the switch controller includes a second ndOS program that, when executed by a processor, controls packet switching policy in the switch module. The packet switching policy includes a definition for switching incoming packets through the switch module or through the switch controller, where the first ndOS program and the second ndOS program, when executed by respective processors, exchange control messages to maintain a network policy for a layer 2 switch fabric.

In one embodiment, the switch module further includes a classifier, the classifier implementing the packet switching policy for incoming packets, where the second ndOS is defined to configure the classifier to implement the packet switching policy. Further, in another embodiment, the first ndOS and the second ndOS are defined to exchange control messages with other ndOS programs in the layer 2 switch fabric to maintain the network policy for the layer 2 switch fabric.

In one embodiment, the packets switched by the switch controller are sent from the switch module to memory in the switch controller. In another embodiment, the switch controller further includes a packet processor.

In yet another embodiment, the overall layer 2 switching strategy further includes managing one or more of migration of virtual machines from one host to another host, access control lists (ACL) for network entities, analytics on flows passing through at least one network device, creation of virtual machines, creation of virtual machines on a host device coupled to the switch, changing configuration parameters on network devices, notification of changes in the layer 2 fabric, bandwidth management, tagging, virtual networks, of quality of service implementation.

In one embodiment, CI1 is Ethernet and CI2 is Peripheral Component Interconnect Express (PCIe). In another embodiment, the switch controller includes non-volatile read/write storage.

Figure 9F:
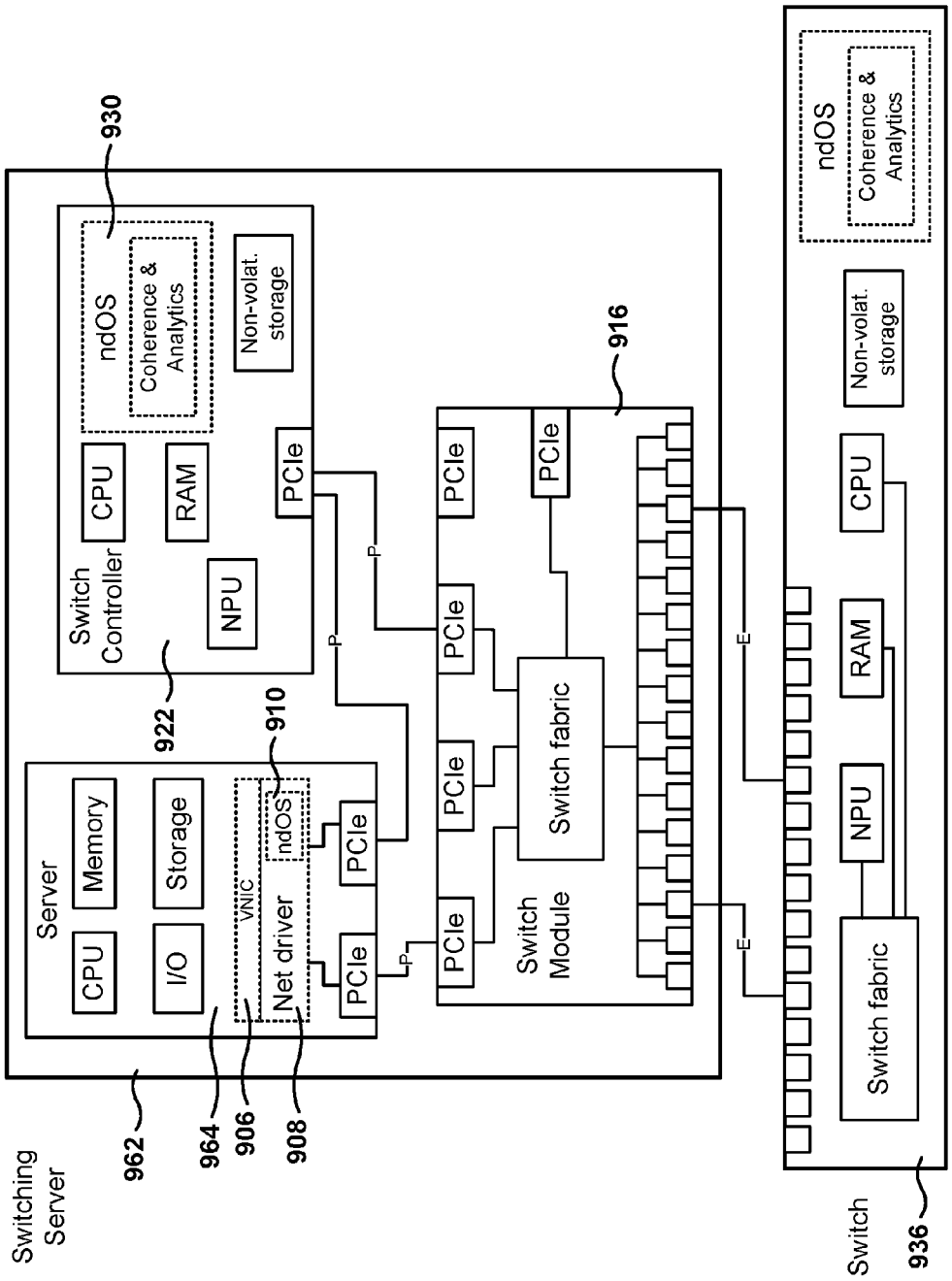

FIG. 9F illustrates the single-server with switching 962 of FIG. 9E coupled to a TOR switch 936, according to one embodiment. As described above, different ndOS modules in the network driver at the server 964, the switch controller, and the TOR switch 936, interact implement the global network policies, such as controlling the flows in bandwidth utilized by different applications (e.g., VMs) in the server.

Figure 9G:
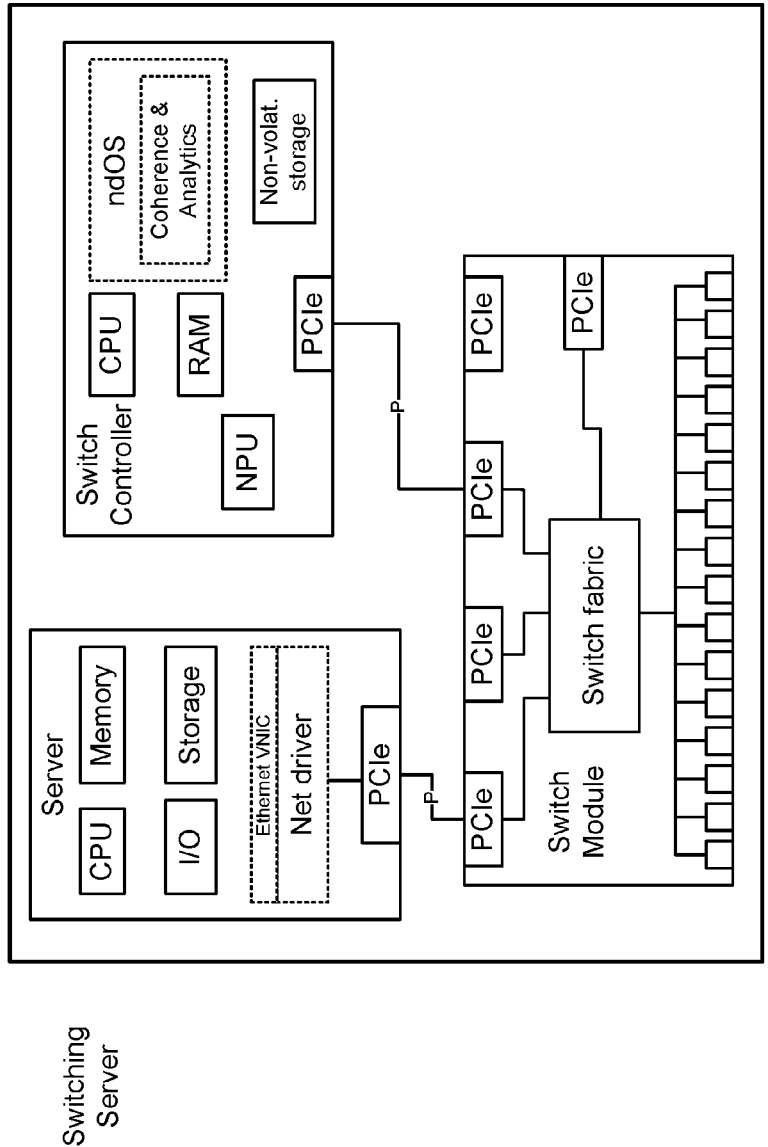

FIG. 9G is a single-server with switching 962 with a virtual Ethernet VNICs, according to one embodiment. In one embodiment, although the network driver 908 does not have ndOS capabilities, the ndOS module 930 in the switch controller interacts with the network driver to manage the network traffic flowing through network driver 908. For example, the ndOS module 130 may command the network driver 908 to reduce the flow of traffic flowing into the network in the presence of network congestion.

In another embodiment, the ndOS module 130 is able to act as an arbitrator between the traffic flows generated within the server. The ndOS module 130 may implement network policies (e.g., bandwidth control) at the server level, instead of having to manage the policies at the switch level. For example, if the ndOS 930 detects that one VM in the server is producing a large amount of traffic, causing network congestion on the network driver, ndOS 930 is able to exchange control messages with the network driver 908 to decrease the flow of packages for that VM (or for the virtual network where the VM is communicating).

Once the congestion disappears, the ndOS 930 may command the Ethernet driver in the corresponding server to restore the original bandwidth allocated to the previously restricted VM.

Figure 9H:
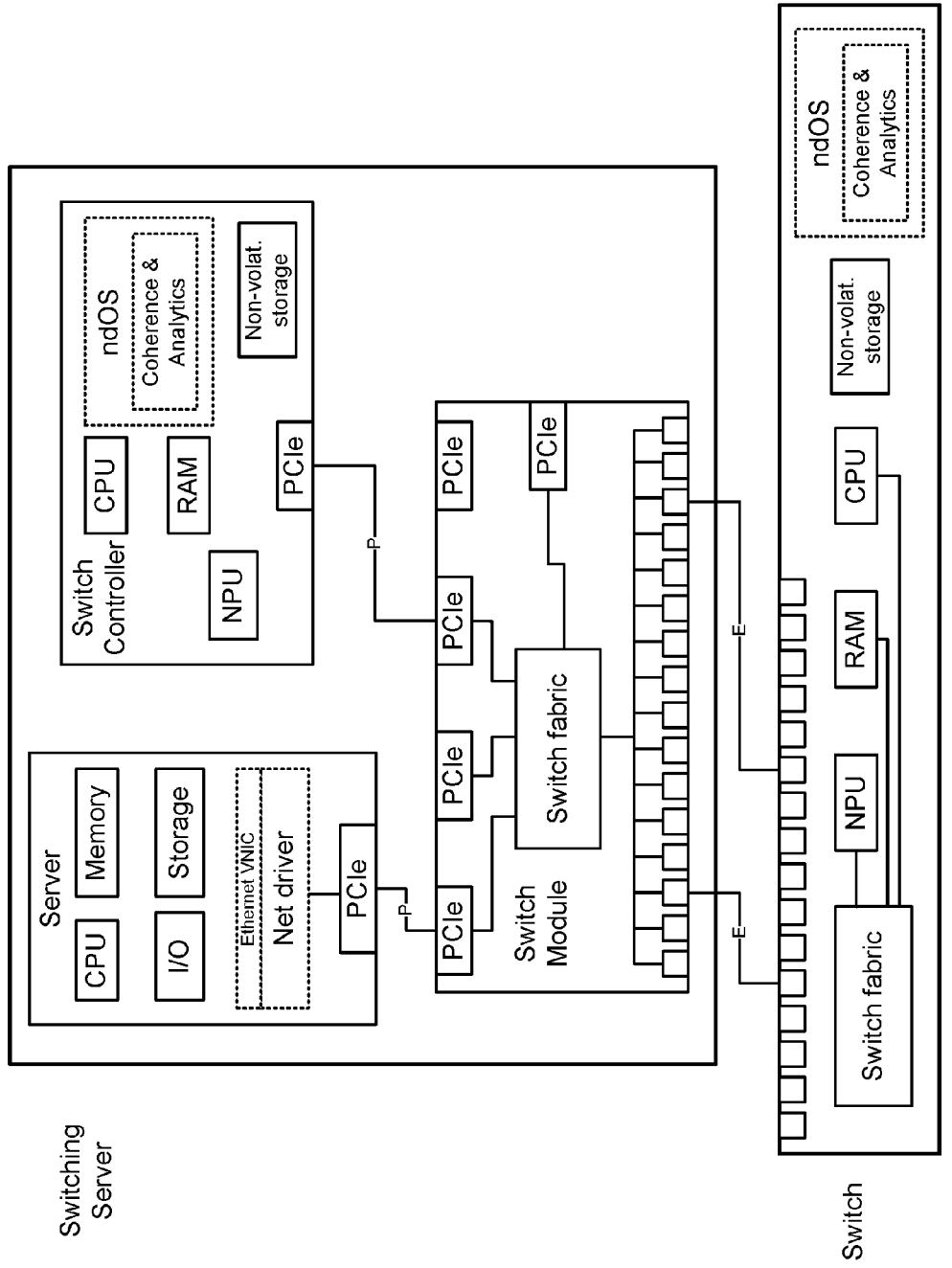

FIG. 9H illustrates the single-server with switching of FIG. 9G coupled to a TOR switch, according to one embodiment. In one embodiment, the implementation of virtual networks may be done at the switch, and the server does not have to perform virtual network related operations. For example, the tagging or encapsulation of VXLAN headers may be done at the switch. In another embodiment, the tagging or encapsulation of VXLAN headers may be done at the network driver. In addition, the network driver at the server can be configured to perform the VXLAN encapsulation for one VNIC or for some of the VNICs created by the network driver.

This flexibility facilitates the implementation of SLAs by ndOS because the server does not need to be aware of the network restrictions, leaving the complexity of managing flows, isolations, resources, etc., to the distributed ndOS.

The management of the ndOS devices may be distributed. For example in one embodiment, the administrator or the network management software, interact with the TOR switch, which in turn interfaces with the ndOS in the switch controller and/or the network driver in the server, or with the ndOS in the network driver.

For example, the network policy may define that the switch in the switching server does not switch packets locally, and to send every packet to the TOR switch. This way, the TOR switch may enforce the network policies defined by the ndOS (e.g., EGS configuration, LLDP configuration, forced frame, tagging, MAC address assignment, link aggregation, etc.).

It is noted that the embodiments illustrated in FIGS. 9A-9H are exemplary. Other embodiments may utilize different configurations of the elements presented, omit some component, add new component, provide redundancy with duplicated components, spread the functionality of one component among a plurality of components, etc. The embodiments illustrated in FIGS. 9A-9H should therefore not be interpreted to be exclusive or limiting, but rather exemplary or illustrative.

Figure 10A:
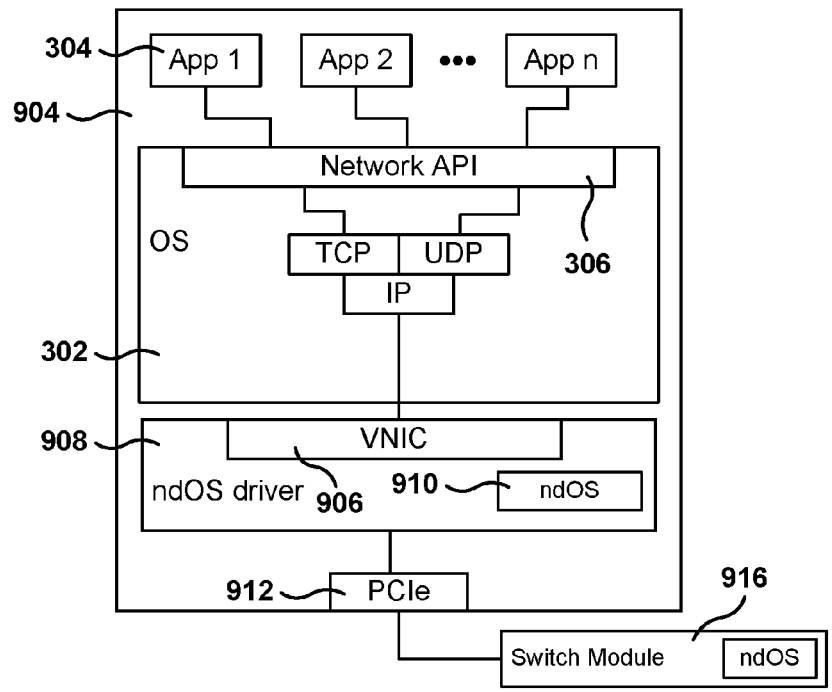
FIGS. 10A-10B illustrate a networking software architecture in a server, according to one or more embodiments.
Figure 10B:
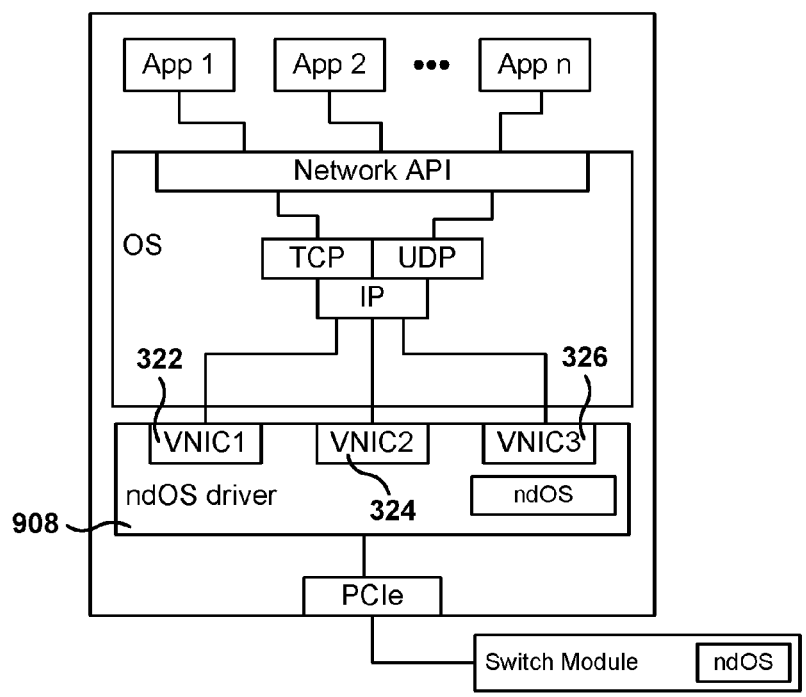

FIGS. 10A-10B illustrate a networking software architecture in a server, according to one or more embodiments. In FIG. 10A, server 904 includes an operating system 302 which provides a network interface 306, also referred to as network API, for the applications 304 running on the operating system 302. The networking provided by the operating system includes a network stack including networking protocols such as TCP, UDP, IP, etc.

The ndOS driver 908 provides a VNIC to the operating system, that from the point of view of the operating system behaves exactly like a hardware NIC. The network packets are transmitted to the switch module 960 via that the PCIe connection, as described above.

FIG. 10B includes a ndOS driver that provides a plurality of VNICs 322, 324, and 326, where each VNIC provides the same functionality of a hardware network card NIC. Each PCIe port in the server is able to act as an Ethernet NIC that can support a plurality of virtual Ethernet NICs.

In one embodiment, the management is done by the ndOS, either by the module in the switch module 916 or in the TOR switch. The ndOS is able to allocate the bandwidth among the different apps, virtual NICs, virtual networks, etc. additionally, the ndOS is able to provide the different services described above regarding networking policy, such as encapsulation, tagging, tunneling, QOS, traffic queues management, packet redirection, etc.

Figure 11A:
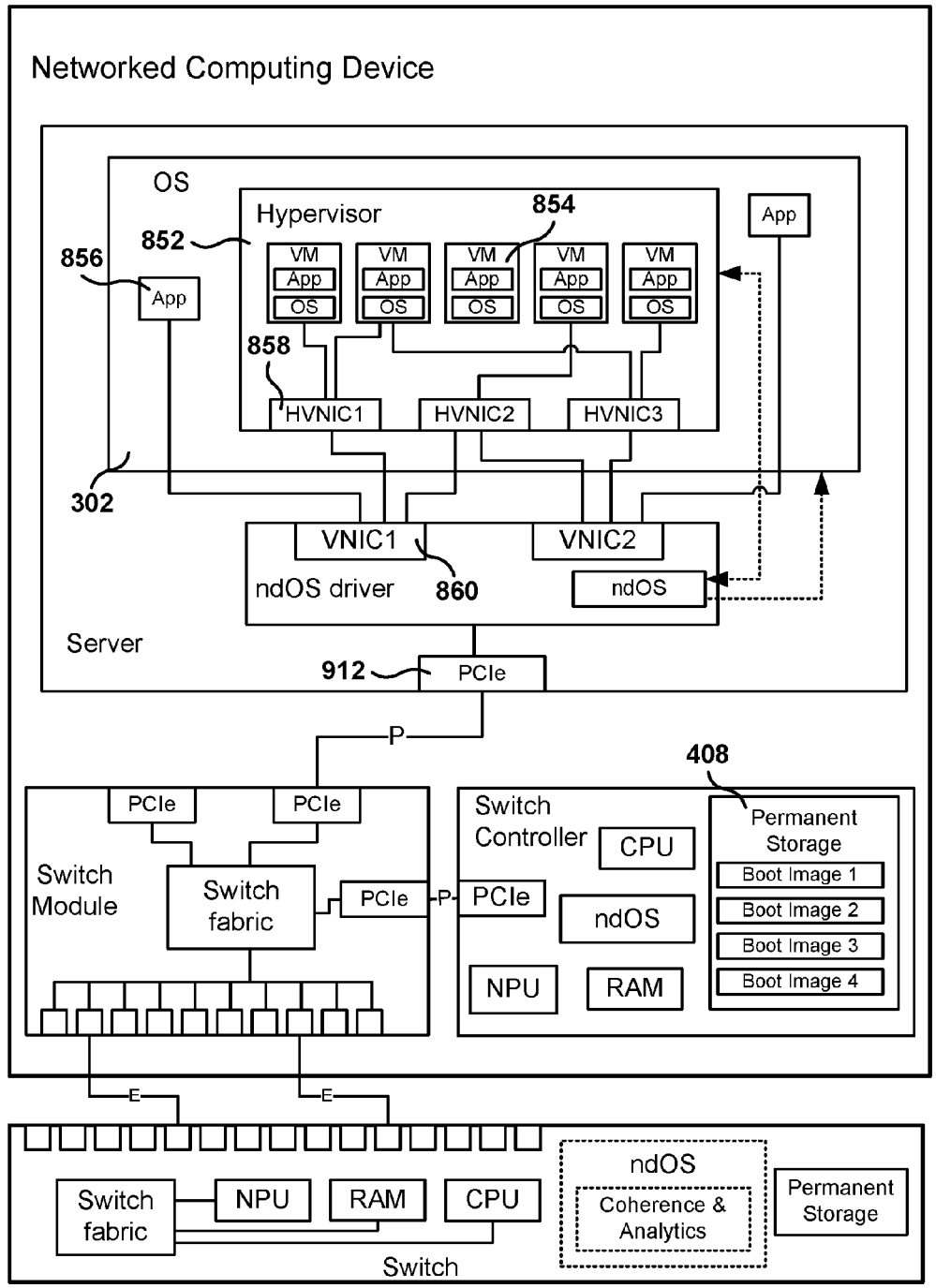
FIGS. 11A-11B illustrate the interactions between the hypervisor and the ndOS, according to one or more embodiments.
Figure 11B:
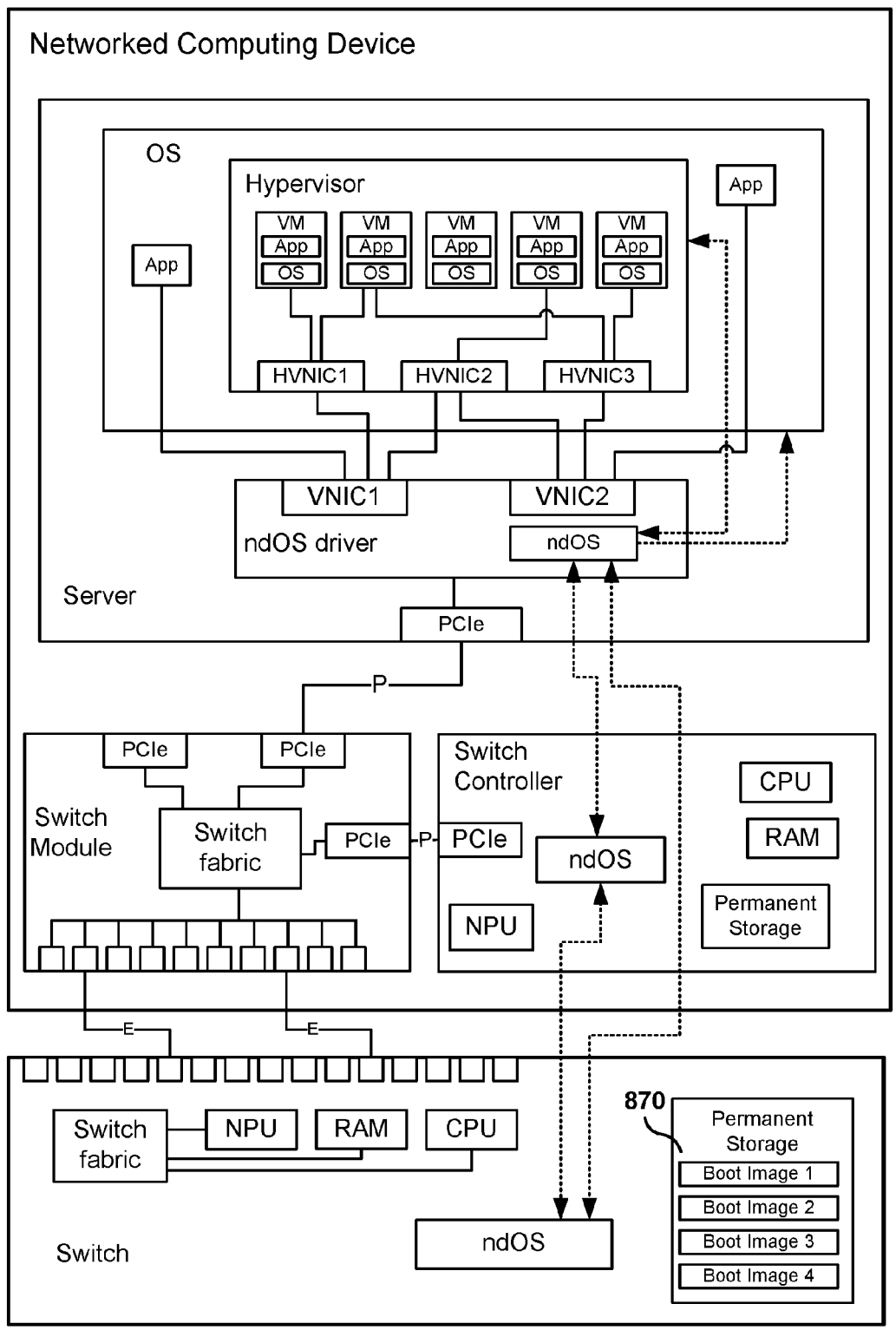

FIGS. 11A-11B illustrate the interactions between a hypervisor and the ndOS, according to one or more embodiments. In one embodiment, the operating system 302 in the switching server executes a hypervisor 852 that provides a virtual environment for a plurality of VMs 854. Because hypervisor 852 provides virtual network environments, the hypervisor 852 is able to create virtual NICs 858 (referred to as HVNICs in FIG. 11A) for the VMs 854.

In the exemplary embodiment of FIG. 11A, hypervisor 852 has created three HVNICs and the ndOS driver has created two VNICs 860. In one embodiment, the hypervisor is not aware that the NICs provided by the operating system 302 are virtual NICS. As a result, the hypervisor routes the traffic for the HVNICs through the VNICs created by the ndOS driver.

In another embodiment (not shown), the ndOS driver is able to interface with hypervisor 852 and the ndOS driver creates the virtual NICs necessary for the hypervisor. This way the hypervisor does not have to deal with the complexity of supporting virtual NICs. Further, since the ndOS driver implements the ndOS across a plurality of devices, the services provided by ndOS are better implemented by the ndOS-aware devices, which results in the use optimization of network resources.

The hypervisor may want to perform an operation that requires network access, such as getting a Dynamic Host Configuration Protocol (DHCP) address, sending an Address Resolution Protocol (ARP) request, getting a boot image, installing a program, installing a driver, installing an upgrade, etc. In one embodiment, the ndOS is able to intercept these network requests and satisfy them directly, without having to go to a different server for the requested information or data.

In one embodiment, the ndOS is aware of the hypervisors in the network, or ndOS is defined to detect hypervisor-related operations. NdOS is able to identify any type of network packet and configure actions to be performed in response to, or based on, those packets.

For example, the ndOS may intercept a Preboot eXecution Environment (PXE) boot request, or some other network request (e.g., a DCHP request, an ARP request, a RARP request, a DNS request, a multicast that contains a VXLAN ARP, etc.) and satisfy the request from the switch controller in the network server or from the TOR switch. In other words, the ndOS may act as a meta-hypervisor for the individual hypervisor's in the server. For example, the ndOS module may start, reboot, or shut down the hypervisor, migrate VMs, etc. In one embodiment, the ndOS switch may also act as a server and respond to a request for a boot image server, or for some other network you request. For example, the ndOS switch may respond to a PXE redirection service request on the network (Proxy DHCP) and give its own address as an available PXE boot server.

Oftentimes, hypervisors attach to discs through logical unit devices (LUNs), and when booting up, the hypervisors will obtain the public image from one of the storage devices. In one embodiment, one or more ndOS modules are defined to store the images in their permanent (i.e., non-volatile) storage 408. When a hypervisor sends a request for a boot image, the ndOS intercepts the request and serves the boot image from storage, instead of having to go to the network to download the boot image.

This scenario is particularly helpful when there is a power failure in the data center. After the power is restored, a plurality of hypervisors or servers may be booting up at the same time (e.g., thousands of servers), creating a large amount of traffic on the network and congestion at the servers that provide the boot images. By having the ndOS modules provide the boot images, the booting time is greatly reduced and network traffic is also significantly reduced.

Additionally, the ndOS may also restart hypervisors at any time by providing the boot image, maybe even reboot a server with a different hypervisor and a different boot image.

FIG. 11B illustrates a sample architecture that includes boot images permanently stores in the TOR switch, according to one embodiment. As described above with reference to FIG. 11A, the boot image for starting a hypervisor is stored in the permanent storage or in the switch controller. In FIG. 11B, the boot images are stored in the permanent storage 870 of the TOR switch. As described above, the TOR switch is able to intercept requests sent over the network, such as a boot image request, and serve those requests from the ndOS in the TOR switch.

In one embodiment, a hierarchical model is used to determine where the master copy of a boot image is kept. For example, the master boot images may be stored on a master server, and the ndOS instances request or download their boot images from the master server. Additionally, an ndOS module may download the boot image from another ndOS module. In one embodiment, the system operates similar to a caching operation in memory, where different level of caches, which would correspond to different levels in the hierarchy for storing boot images in the ndOS modules. This provides flexibility in the implementation of complex data center environments with a plurality of different types of servers (e.g., Linux, Windows, VMWare, Openstack, etc.).

Additionally, FIG. 11B illustrates how the different ndOS modules interact with each other, with the operating system, or with the hypervisor. This flexibility enables an easy-to-manage data center environment.

Figure 12A:
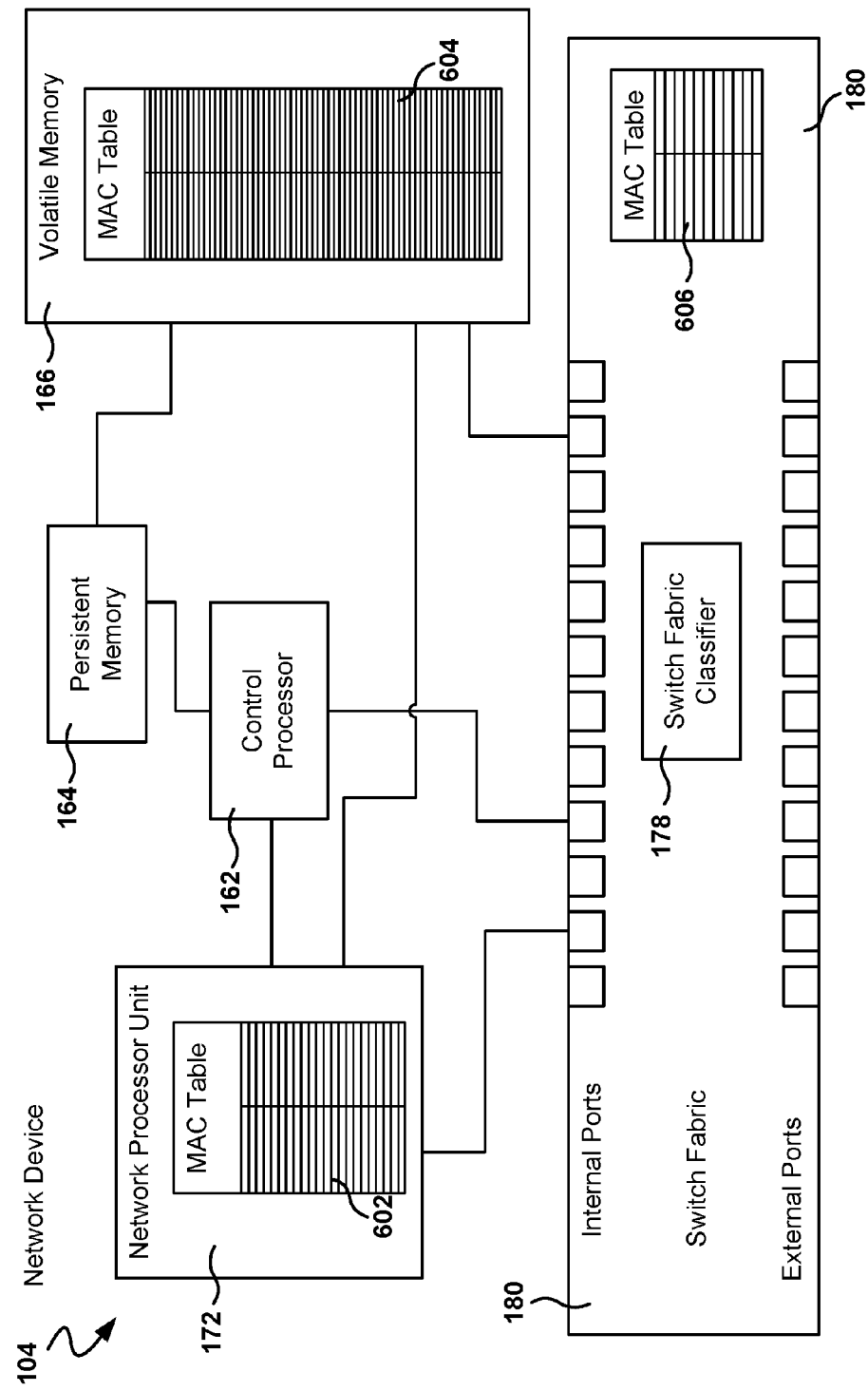
FIGS. 12A-12B illustrate a multilevel distributed MAC table architecture, according to one or more embodiments.
Figure 12B:
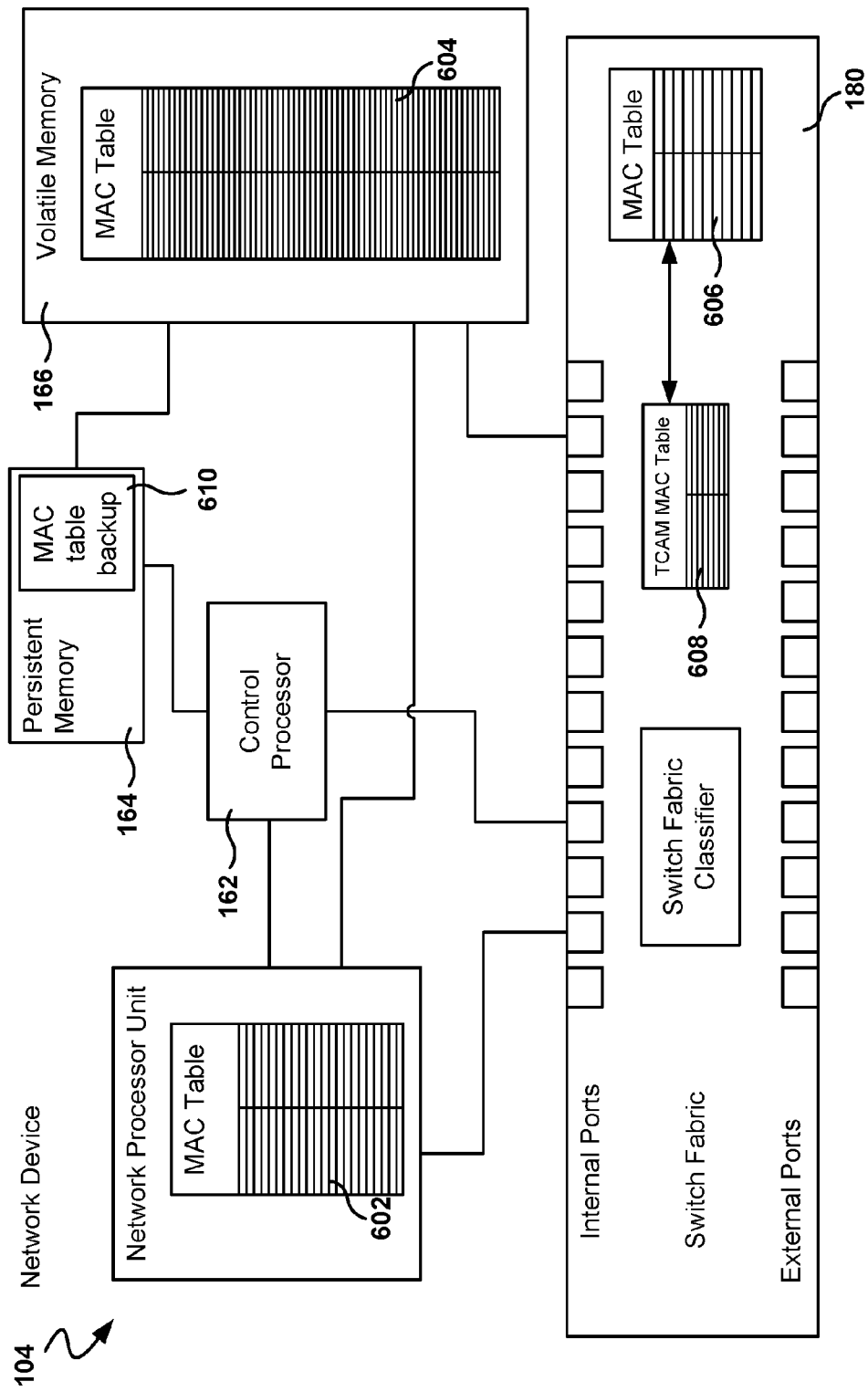

FIGS. 12A-12B illustrate a multilevel distributed MAC table architecture, according to one or more embodiments. As discussed above, incoming packets may be routed through the switch fabric, the packet processor, or the processor. In one embodiment, each of these components keep its own MAC address table, which holds information regarding switching packets based on their MAC address.

However, the sizes of the tables may vary considerably, as the amount of resources available for storage varies. For example, the switch fabric may perform fast switching operations utilizing CAMs or TCAMs 606, but these content addressable memories typically have a limited amount of capacity. The packet processor usually has a larger amount of memory and also keeps a MAC address table 602, and the packet processor keeps, in one embodiment, its MAC address table in RAM memory, which can have a size of gigabytes, allowing for a large number of entries in the processor MAC table 166.

A Content-Addressable Memory (CAM), also known as associative memory, associative storage, or associative array, is a type of computer memory where a computer program supplies a data word and the CAM searches its entire memory to see if that data word is stored anywhere therein. If the data word is found, the CAM returns a list of one or more storage addresses where the word was found, and in some architectures, it also returns the data word, or other data associated with the request. A Ternary CAM (TCAM) is a type of CAM that allows the use of "wildcards," a third matching state of "X" or "Don't Care," for one or more bits in the provided data word, thus adding flexibility to the search by using Boolean logic.

In one embodiment, a switching goal is to have packets switched as fast as possible, and having the hardware (e.g., the switch fabric) switch a majority of the packets. However, the tradeoff for having high speed is to use expensive CAM or TCAM tables having limited sizes. Typically, the TCAMs have a small size (e.g., 128K). However, in environments with virtual machines, there can be millions of MAC addresses on the network. In one embodiment, the ndOS programs the switch fabric so if there is a MAC address miss, the switch fabric lets ndOS determine how to switch the packet.

When a packet comes in with a MAC address absent from the switch-fabric MAC 606, the switch fabric must send the packet to the packet processor (e.g., NPU) or to the processor. In addition, a packet with the MAC address in MAC table 606, may also be forwarded to the packet processor or the processor according to classification rules. In one embodiment, there are three MAC tables in the ndOS switch, with three different sizes and different levels of performance.

In one embodiment, control processor 162 will take an action after a miss in the MAC table 606 (or any other MAC table), such as adding the MAC address of the miss to one of the MAC tables 606, 604, or 602. If a MAC address for a received packet is not in any of the MAC tables, the control processor 162 may initiate a discovery process to find the destination switch, or the egress port in the switch, for that address. In one embodiment, the ndOS system can switch the packet that caused the MAC address miss in one or more of the MAC tables, without making any updates to the MAC tables (e.g., the packet caused a miss in the switch fabric MAC table 606 but it was a hit in MAC table 602 of the NPU).

It is noted that, in one embodiment, the MAC tables are independent and updates to each of the tables may be performed independently. In another embodiment, the control processor utilizes logic to manage the content of the MAC tables, acting as a multilevel memory with different caching options for storing MAC address information.

In addition, control processor 162 may utilize heuristic algorithms to manage the content of the different MAC tables. For example, a new address may be added to MAC table 606 after performing an operation to remove one of the current entries in the table. The control processor may utilize any method to clear entries, such as least recently used (LRU), less frequency of use, FIFO, etc.

In one embodiment, the same principles presented herein with reference to MAC tables, may be applied to other data structures in the switch, such as IP tables, routing tables, VM tables, virtual network tables, etc.

FIG. 12B includes a switch fabric with two levels of MAC tables, according to one embodiment. In the exemplary embodiment of FIG. 12B, the switch fabric includes two levels of MAC tables, a TCAM MAC table 608, and a RAM MAC table 606. In one embodiment, the switch fabric includes logic for keeping addresses in the TCAM table or in regular non-volatile memory. In general, MAC addresses associated with heavy network traffic will be in the TCAM table, while other addresses are kept in the MAC table 606.

Of course, the ndOS is able to manage the two levels of MAC tables at the switch fabric, together with the MAC tables in the NPU and volatile memory associated with the controller, as discussed above with reference to FIG. 12A, except that another level of MAC address storage is added.

Further, the concept of multilevel MAC table management may be expanded to the level 2 fabric, with the ndOS managing the content of the MAC address tables across a plurality of ndOS switches. For example, a global MAC address table encompassing a plurality of devices may be partitioned, replicated, etc., across the plurality of devices.

It is noted that the embodiments illustrated in FIGS. 12A-12B are exemplary. Other embodiments may utilize different levels of MAC tables, omit one of the MAC tables, omit some of the elements (e.g., one embodiment may not include an NPU), etc. The embodiments illustrated in FIGS. 12A-12B should therefore not be interpreted to be exclusive or limiting, but rather exemplary or illustrative.

Figure 13:
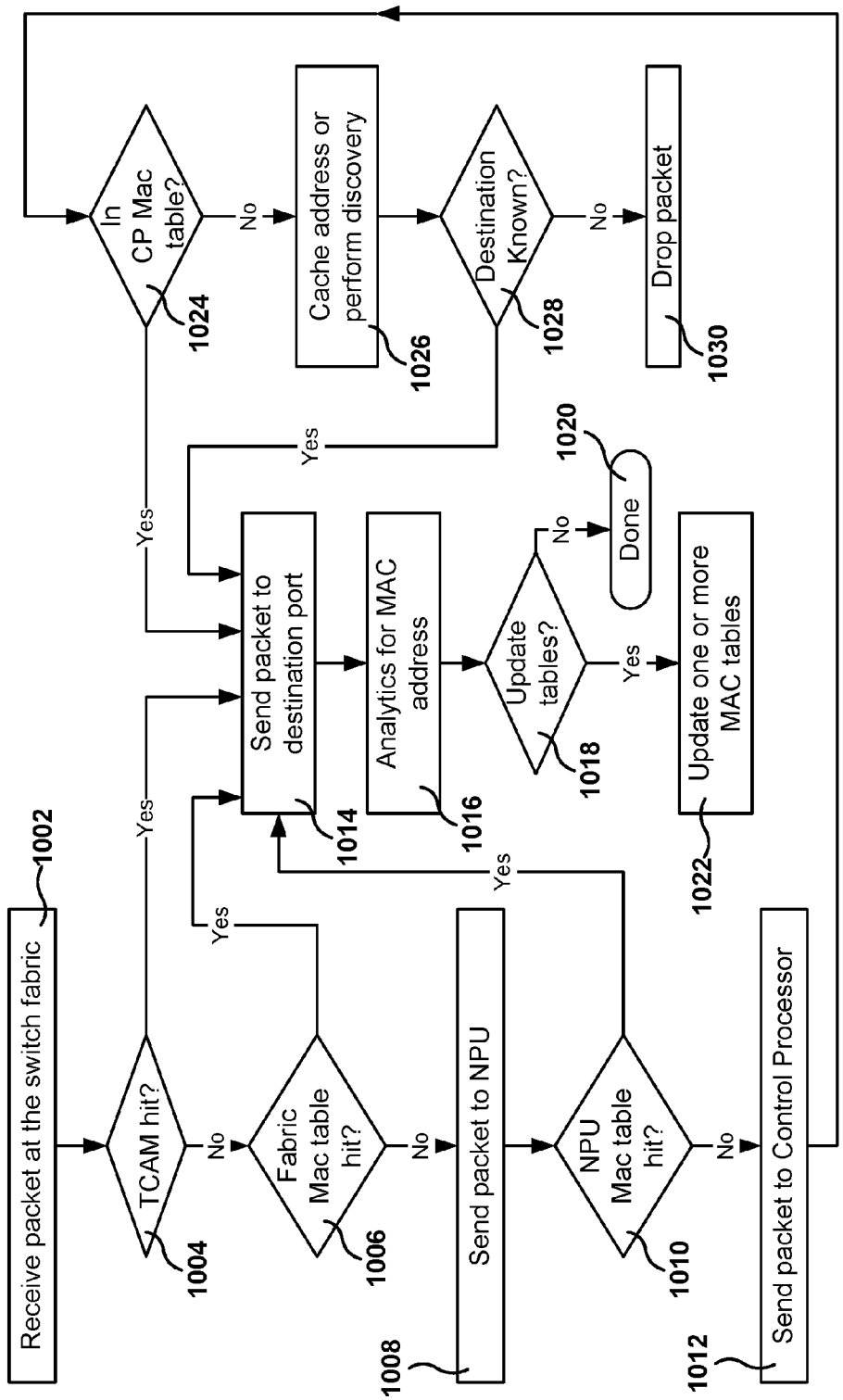
FIG. 13 is a flowchart of a method for managing a distributed MAC table, according to one or more embodiments.

FIG. 13 is a flowchart of a method for managing a distributed MAC table, according to one or more embodiments. While the various operations in this flowchart are presented and described sequentially, one of ordinary skill will appreciate that some or all of the operations may be executed in a different order, be combined or omitted, or be executed in parallel.

In operation 1002, a packet is received in one of the ports of the switch (e.g., the switch fabric). From operation 1002, the method flows to operation 1004 where a check is made to determine if the MAC address of the packet is in the TMAC address table of the switch. If the address is in the switch fabric MAC table, the method flows to operation 1014 and otherwise the method flows to operation 1006.

In operation 1006, a check is made to determine if the MAC address is in the RAM MAC table of the switch fabric. If a match is made (i.e., a hit) the method flows to operation 1014 and to operation 1008 otherwise. In operation 1008, the packet is sent to the NPU. From operation 1008, the method flows to operation 1010, where a check is made to determine if the MAC address of the packet is in the NPU MAC table. If the address is in the NPU MAC table, the method flows to operation 1014 and to operation 1012 otherwise.

In operation 1012, the packet is sent to the control processor and the method continues to operation 1024, where a check is made to determine if the address is in the MAC table kept in memory by the control processor. If the address is in the control processor MAC table, the method flows to operation 1014 and to operation 1026 otherwise.

In operation 1026, the control processes determines what to do with the unknown address. For example, the control processor may take notice of the incoming port for the packet and add the MAC address to one or more of the MAC tables. Additionally, the control processor may initiate a discovery process to determine switching information for this address.

From operation 1026, the method flows to operation 1028, where a check is made to determine if there is enough information to forward the packet through the layer 2 fabric. If there is switching information for the packet, the method flows to operation 1014 and to operation 1030 otherwise. In operation 1030, the packet is dropped. An alternative to dropping for operation 1030 could be to query some externally maintained MAC table or utilize some other MAC address discovery method and use the resulting returned information to add the MAC table information to the Layer 2 Fabric.

As discussed above, there are multiple paths for the flow to reach operation 1014, meaning that the switch has found a way to switch the incoming packet. In operation 1014, the packet is sent to its destination egress port. From operation 1014, the method flows to operation 1016 were analytics for this package are performed by the ndOS (this operation is optional).

In operation 1018, a check is made to determine if any of the MAC tables need to be updated. If no table has to be updated, the method ends 1020. If one or more tables are to be updated, the necessary MAC tables are updated in operation 1022.

FIG. 14 is a data structure for a MAC table, according to one or more embodiments. In one embodiment, the MAC table in the control processor includes one or more of the following fields:

The MAC address,
A VLAN identifier,
A VXLAN tag (which provides another level of virtual LAN encapsulation),
Type of entry (dynamic or static),
Egress Port identifier for this MAC address,
Age of the entry,
Timestamp for the entry creation time,
Frequency of use for this MAC address,
Timestamp when this address was last used,
Flag indicating if an entry associated with this MAC address is present in the TCAM of the switch fabric,
Flag indicating if an entry associated with this MAC address is present in a first NPU in the switch,
Flag indicating if an entry associated with this MAC address is present in a second NPU in the switch,
etc.

In one embodiment, the MAC tables in the switch fabric or the NPU have a similar structure, but some of the fields may be omitted, or additional fields may be added.

It is noted that the embodiment illustrated in FIG. 14 is exemplary. Other embodiments may utilize different fields, organize the fields in a different order, including fewer fields, etc. The embodiments illustrated in FIG. 14 should therefore not be interpreted to be exclusive or limiting, but rather exemplary or illustrative.

Figure 15:
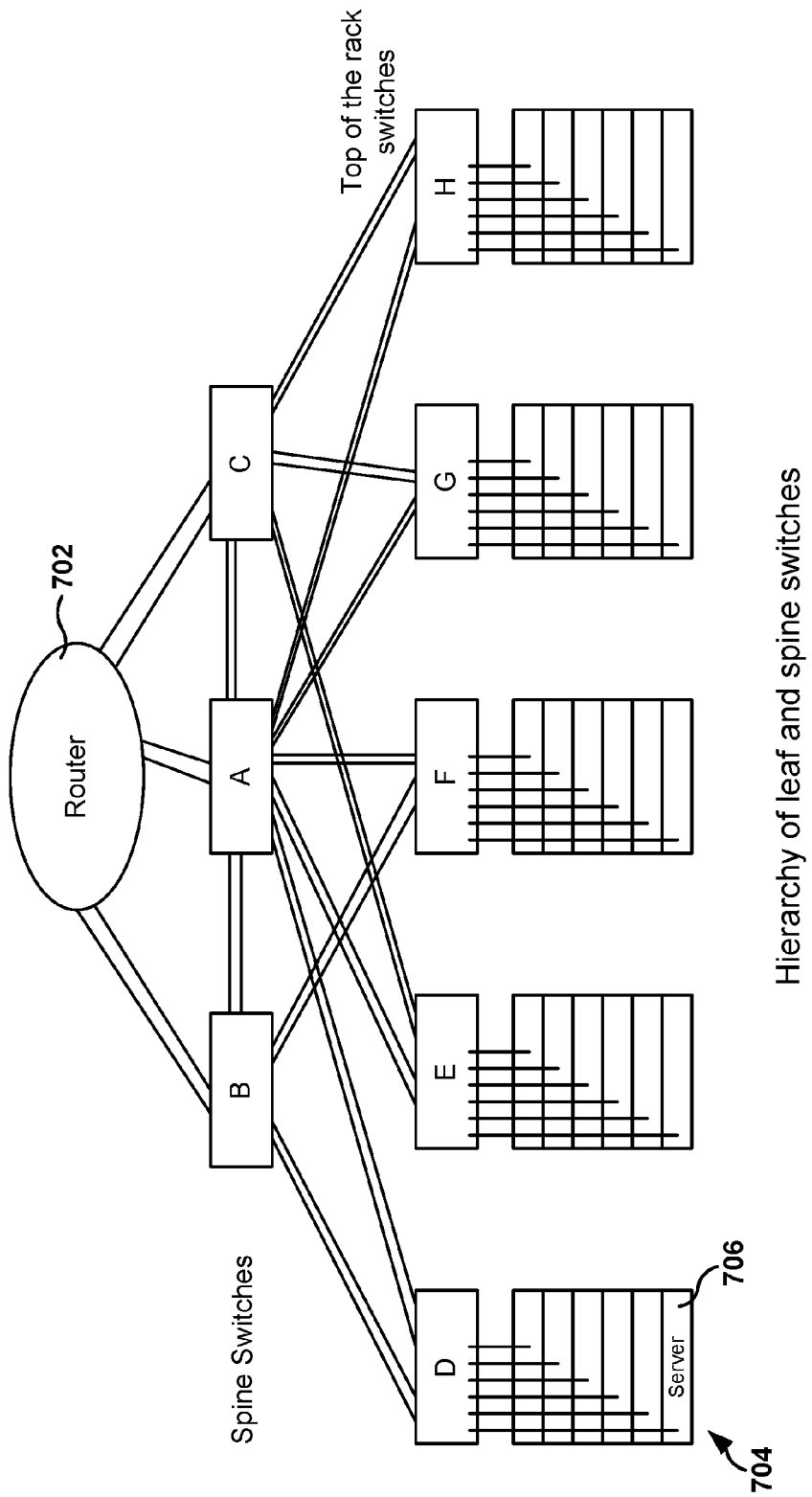
FIG. 15 is a simplified schematic diagram of a computer system for implementing embodiments described herein.

FIG. 15 is a simplified schematic diagram of a computer system for implementing embodiments described herein. FIG. 15 is an exemplary hierarchy of switches, where a plurality of servers 706 are connected via TOR leaf switches D, E, F, G, H in respective data center racks 704. The leaf switches, also referred to as TOR switches, are connected to spine switches A, B, C, which are connected to router 702. It is noted that multiple paths in the connections are included for redundancy and multiple uplinks in one or more of the switches, but redundant connections are not required to implement embodiments presented herein.

FIGS. 16A-16D illustrate exemplary embodiments of a distributed ndOS, according to one or more embodiments. Referring to the switches of FIG. 15, it is possible to create a virtual network with limited bandwidth that is enforced at each local point within the hierarchy of switches.

Figure 16A:
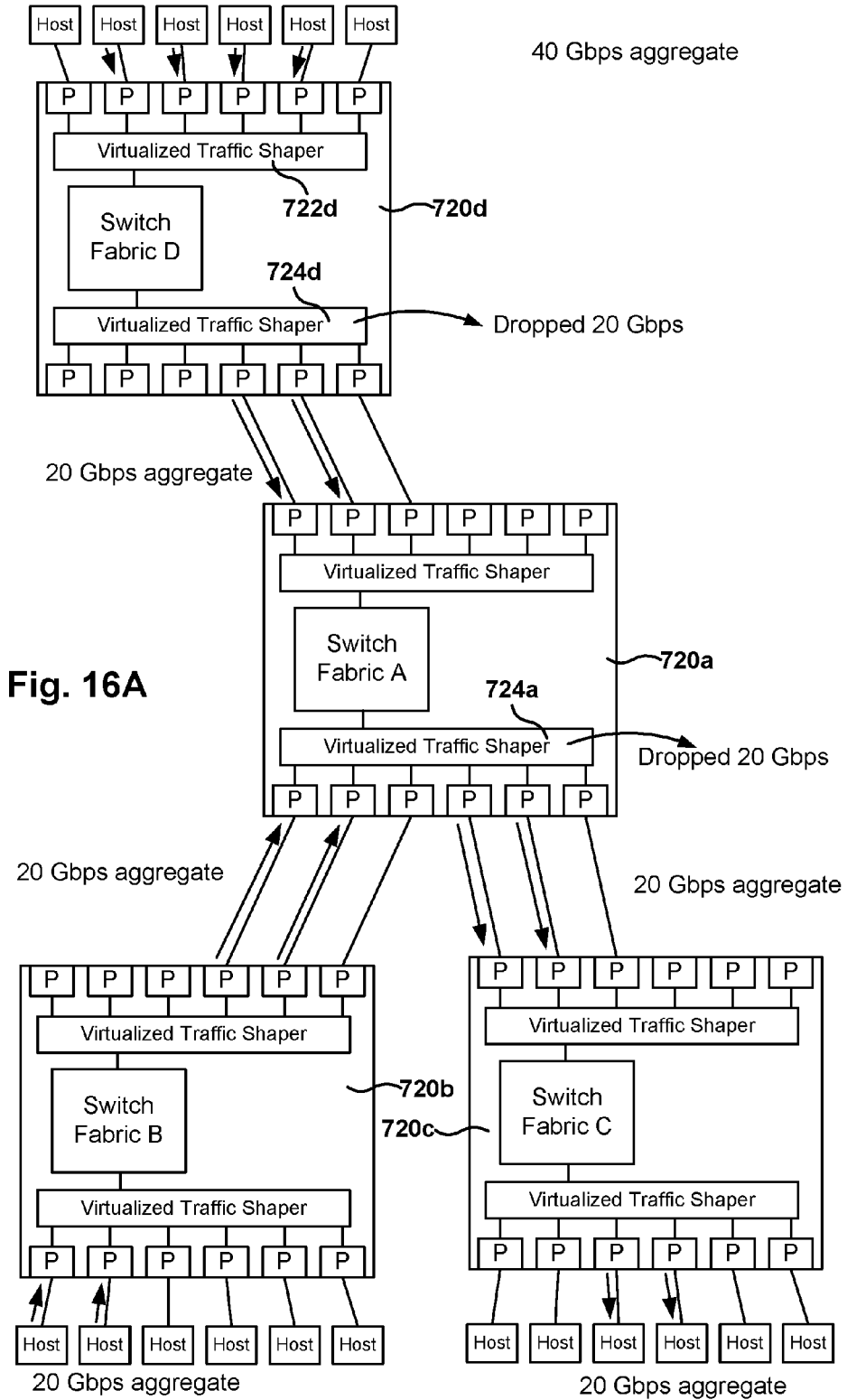

FIG. 16A shows a virtual network spanning multiple leaf and spine switches. For simplicity of description, it is assumed that there is no contention with the leaf switches (B, C, and D), and that virtual machines on switch B 720*b* are trying to send 20 Gbps of sustained bandwidth to virtual machines on a host connected to switch C 720*c*. At the same time, virtual machines on hosts connected to Switch D 720*d* are also trying to send a sustained bandwidth of 40 Gbps to the same hosts connected to switch C 720*c*, and all these virtual machines belong to a virtual network which has been assigned a bandwidth limit of 20 Gbps. Assuming that all links have 10 Gbps bandwidth, the aggregate available bandwidth between leaf Switch C 720*c* and spine switch A 720*a* is 30 Gbps; between leaf switch C 720*c* and spine switch A 720*a* is 30 Gbps; and between leaf switch D 720*d* and spine switch A 720*a* is 30 Gbps.

It is noted that the embodiments described herein may be utilized with other communication speeds, such as 10 Gbps, 40 Gbps, 100 Gbps, and other values, as well as a with a different number of ports (e.g., 10, 40, 100 ports, etc., although other values are also possible), as long as the principles presented are preserved. The embodiments illustrated should therefore not be interpreted to be exclusive or limiting, but rather exemplary or illustrative.

Since the virtual network to has a limit of 20 Gbps, all the host-to-switch bandwidth is within limits. The aggregate bandwidth from switch B to switch A is also within limits, but the aggregate bandwidth from switch D to switch A exceeds the limit causing the egress VTS 724*d* on switch D 720*d* to drop 20 Gbps worth of traffic. Similarly, egress VTS 724*a* on spine switch A 720*a* will drop an additional 20 Gbps of bandwidth, allowing the destination switch C to receive only 20 Gbps of bandwidth.

If the spine switch was a simple switch without the VTS capability, the ingress VTS on destination leaf switch C 720*c* would have dropped the excess packets allowing the bandwidth limits to be maintained. The advantage of having limits within the switches is that all decisions are made on the individual VTS, and as long as the leaf or the TOR switches enforce the bandwidth limits, the spine switches can be traditional best effort switches.

The disadvantage of this scheme is that excess or unused resources at any given time can't be used by traffic needing the resources. Switches D, A, and C could have allowed 30 Gbps of bandwidth to go through since no one was using the bandwidth in this example.

Figure 16B:
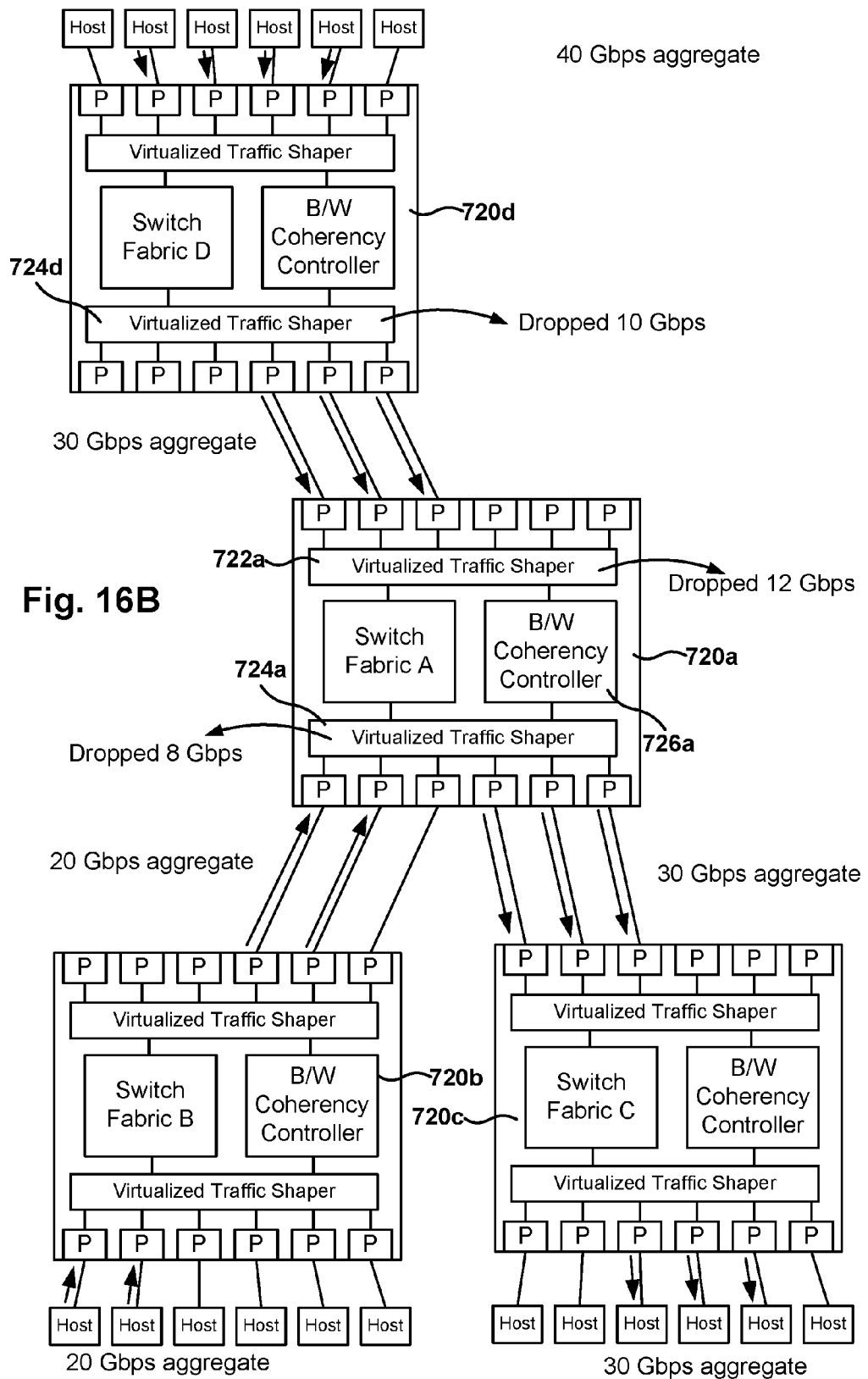

FIG. 16B illustrates virtual networks with local bandwidth guarantees spanning a hierarchy of switches. It is possible to use the switches described in FIG. 15, and allow the virtual network to have a guaranteed bandwidth of 20 Gbps. FIG. 16B shows a virtual network spanning a hierarchy of switches where the individual switches implement bandwidth coherency control giving bandwidth guarantees instead of limits. Using the same assumptions as in FIG. 16A, switch D provides local bandwidth optimizations, allowing 30 Gbps of traffic to flow through since there is enough capacity.

Similarly, spine switch A allows 30 Gbps of traffic to leaf switch C. The point of control has shifted from the egress VTS 724a to the ingress VTS 722A on switch A, which proportionately drops packets coming from switches B and D. This flow control mechanism is better than the control provided in FIG. 16A because the control is pushed closer to the source.

FIG. 16C illustrates a virtual network with global bandwidth guarantees spanning a hierarchy of switches, according to one embodiment. In an ideal scenario, the global bandwidth guarantees to be implemented across the hierarchy of switches. Continuing with the same scenario as in FIG. 16A, FIG. 16C shows that the aggregate throughput achieved is 30 Gbps, but the control points have shifted closer to the source based on bandwidth coherency messages exchanged between the switches. This allows the 20 Gbps bandwidth to be available between switch B and switch A and 10 Gbps to be available between switch D and switch A, which can be used by other virtual networks.

In the case where the host is able to participate in the ndOS bandwidth control, the flow control can be pushed all the way to the host allowing the host to slow the application producing packets and possibly other mechanisms to avoid packet loss on the network.

Figure 16D:
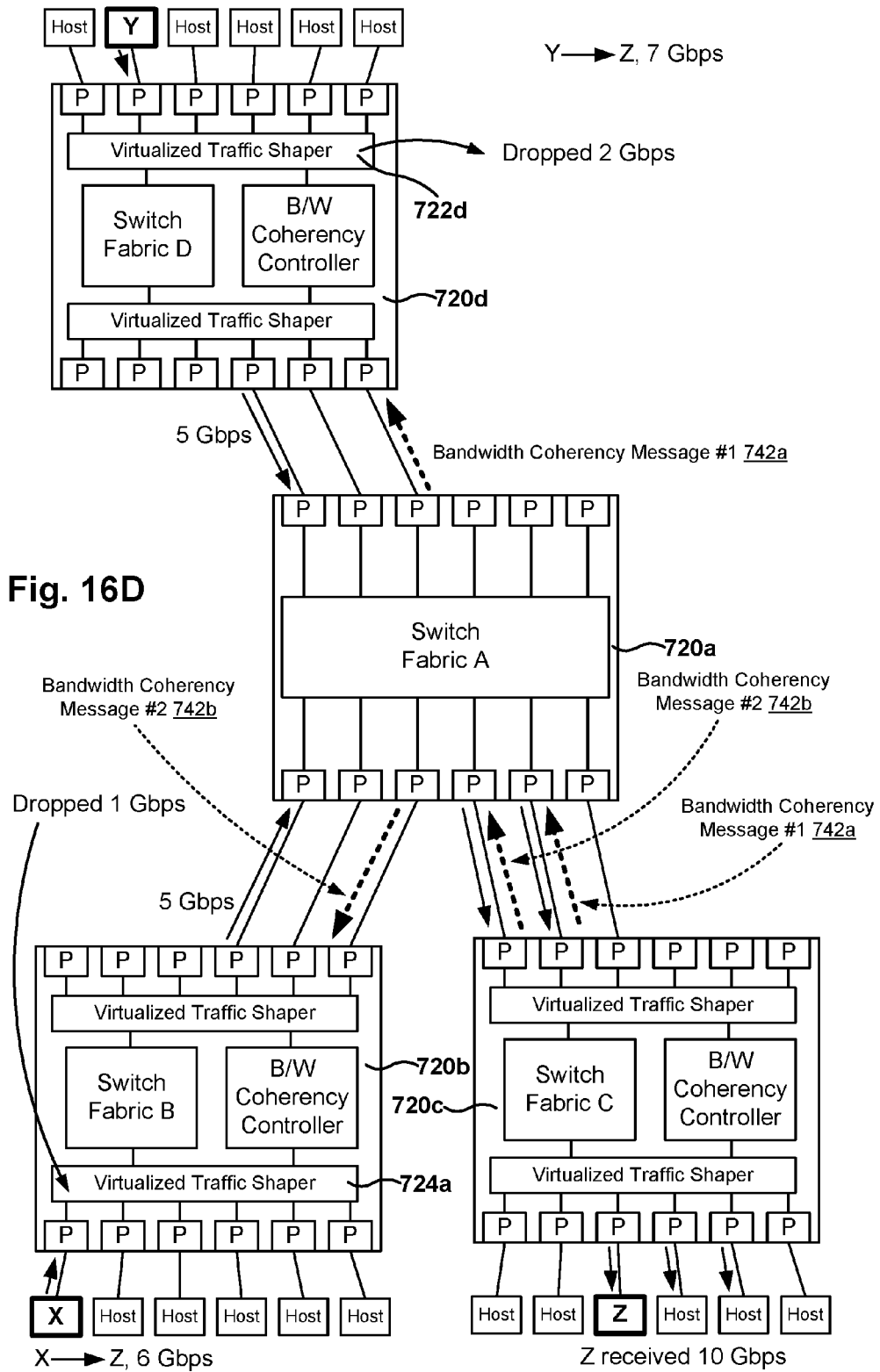

FIG. 16D illustrates global bandwidth guarantees with a VTS leaf switch and a traditional spine switch, according to one embodiment. FIG. 16D illustrates a layer 2 fabric with a mix of ndOS switches and traditional switches.

Spine switch A is a traditional switch without any virtualization or VTS capabilities. Host X wants to send a 6-Gbps packet stream to host Z, and host Y wants to send a 7-Gbps packet stream to host Z. Additionally, it is assumed that all the lines have a physical capacity of 10 Gbps, the virtual network to which virtual machines X, Y, and Z belong to has 5 Gbps bandwidth guarantee, and there is no other activity on the network.

Under normal circumstances, switches B and D can send 6 and 7 Gbps streams to switch A. As long as switch A has enough capacity and is non-blocking, switch A can send the combined 13 Gbps of bandwidth to switch C using two of the links between switches A and C. At this point, switch C can only send 10 Gbps to host Z (because of the physical link capacity of 10 Gbps) and will have to drop the extra 3 Gbps. If instead, the bandwidth coherency controller (BCC) detects the flow constraint, the BCC can slow the ingress virtual queues corresponding to the link between switches A and C. The ingress VOQ of switch C knows that the other side (switch A) is not VTS capable so it can instead generate a new message with a different MAC type to the source MAC address of the packets causing the problem.

Switch A will still switch packets for switches B and D where they get captured due to the unique MAC type reserved for the control messages. This allows the BCC on switches B and D to adjust the drain rates for ingress VOQ corresponding to hosts X and Y, and as such, only 5 Gbps is allowed to flow to switch A.

Further, is possible for the ingress VoQ on switches B and D to push the flow control to hosts X and Y and prevent any packet drops at all. The VoQ on switches B and D can use 802.1qbb based PFC frames or any other protocol understood by hosts X and Y to accomplish this. It is noted that that given the large number of virtual networks visible at the spine switches, it is not possible to use 802.1qbb PFC messages to accomplish this entirely, but using the Bandwidth Coherency Message between the leaf and the spine switches and PFC between the leaf switches and host, a truly lossless network offering global bandwidth guarantees can be created.

In the case of hierarchical switches offering global bandwidth guarantees for virtual networks, all switches need to implement ingress and egress VTS. In addition, the switches exchange messages during boot up, telling other switches or hosts that the switch has ndOS capabilities (e.g., sending a broadcast/multicast message that can be ignored by non-VTS capable switches, but that VTS-capable switches will note).

FIG. 17A shows a flowchart illustrating an algorithm for processing network packets, in accordance with one embodiment. In operation 832, a packet is received at the switch module. The switch module has one or more ports with a communications interface of a first type (CI1) and one or more ports with a communications interface of a second type (CI2), where a server is in communication with the switch module via a first CI2 coupling and a switch controller is in communication with the switch module via a second CI2 coupling. The server includes a virtual CI1 driver that provides a CI1 interface to applications in the server, the virtual CI1 driver defined to exchange CI1 packets with the switch module via the first CI2 coupling. The virtual CI1 driver further includes a first network device operating system (ndOS) program, and the switch controller includes a second ndOS program that, when executed by a processor, controls packet switching policy in the switch module. The packet switching policy includes a definition for switching incoming packets through the switch module or through the switch controller. The first ndOS program and the second ndOS program, when executed by respective processors, exchange control messages to maintain a network policy for a layer 2 switch fabric.

From operation 832, the method flows to operation 834 for determining, by a classifier in the switch module, to switch the packet through the switch module or through the switch controller based on the packet switching policy.

From operation 834, the method flows to operation 836 where the packet is switched based on the determination made in operation 834.

Figure 17B:
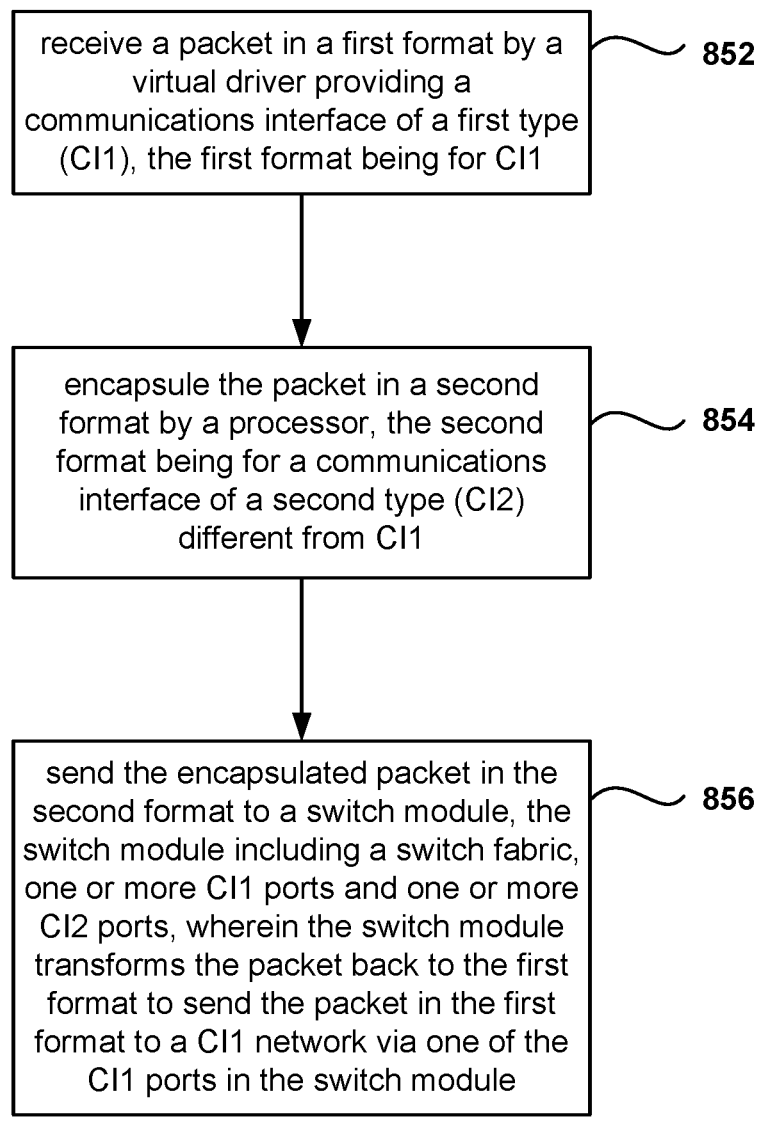
FIG. 17B shows a flowchart illustrating an algorithm for networking communications, in accordance with one embodiment.

FIG. 17B shows a flowchart illustrating an algorithm for networking communications, in accordance with one embodiment. In operation 852, a packet is received in a first format by a virtual driver providing a communications interface of a first type (CI1), the first format being for CI1.

From operation 852, the method flows to operation 854 where the packet is encapsulated in a second format by a processor. The second format is for a communications interface of a second type (CI2) different from CI1.

From operation 854, the method flows to operation 856 where the encapsulated packet in the second format is sent to a switch module. The switch module includes a switch fabric, one or more CI1 ports and one or more CI2 ports, and the switch module transforms the packet back to the first format to send the packet in the first format to a CI1 network via one of the CI1 ports in the switch module.

In one embodiment, the virtual driver is defined to support more than one virtual network interface card (VNIC). In another embodiment, the virtual driver is defined to create a VNIC for a hypervisor.

In another embodiment, sending the encapsulated packet further includes selecting one of the CI1 ports based on a media access control (MAC) address of the packet.

In yet another embodiment, the switch module further includes a network device operating system (ndOS) program for exchanging switching information with other switches in a switch layer fabric.

In one embodiment, sending the encapsulated packet further includes adding virtual network (VLAN) information to the packet before sending the packet.

In one embodiment, CI1 is Ethernet and CI2 is Peripheral Component Interconnect Express (PCI). In one embodiment, CI2 can be a specific type of PCI, such as PCIe (Peripheral Component Interconnect Express), or other versions. In some embodiments, other combinations of communications interfaces are also possible, as long as the principles presented herein are utilized. For example, each of the communications interface may be one of Ethernet, Peripheral Component Interconnect (PCI) (which may be any Peripheral Component Interconnect, such as PCI, Peripheral Component Interconnect Express (PCIe), Peripheral Component Interconnect eXtended (PCI-X)), Accelerated Graphics Port (AGP), Serial ATA (SATA), AT Attachment (ATA), Serial Attached SCSI (SAS), Small Computer System Interface (SCSI), High-Definition Multimedia Interface (HDMI), etc. Any combination can be used, so long as the translation between the types of communications interfaces result in providing the functionality to the ndOS and switch circuitry, hardware, etc., firmware, combinations of hardware and software, cloud based services that interact with the hardware or software to enable virtual load balance and discovery of other ndOS switches, etc.

Figure 17C:
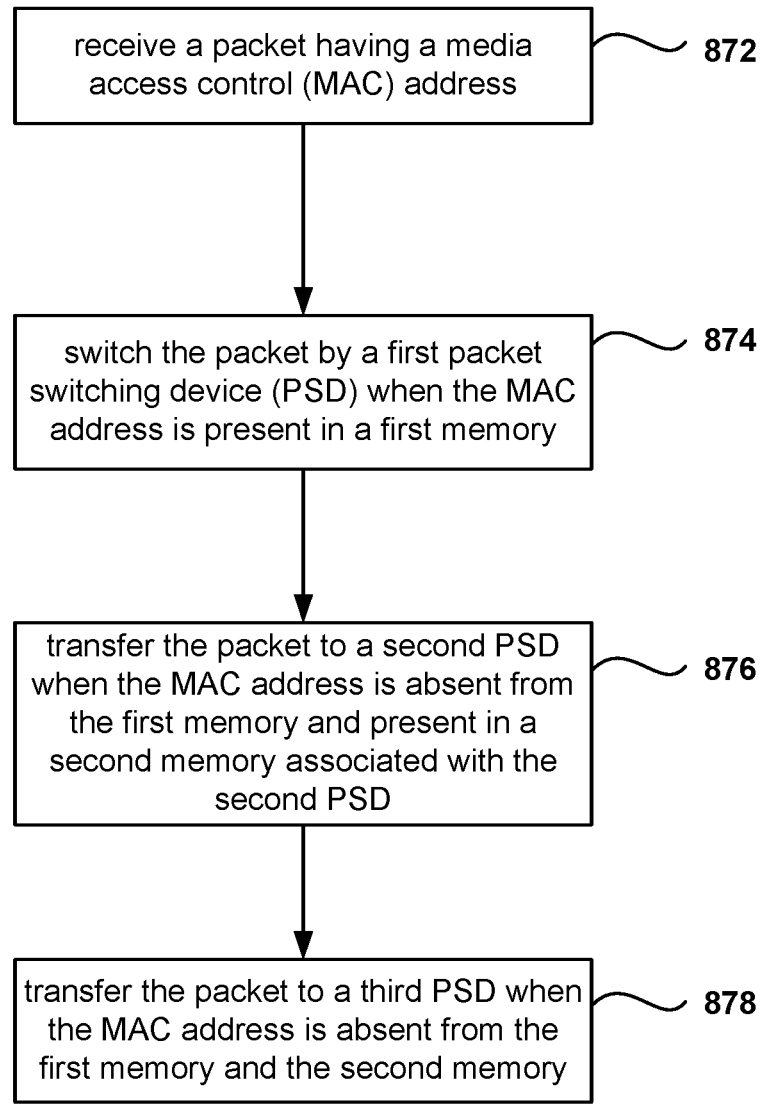
FIG. 17C shows a flowchart illustrating an algorithm for switching a network packet, in accordance with one embodiment.

FIG. 17C shows a flowchart illustrating an algorithm for switching a network packet, in accordance with one embodiment. In operation 872, a packet, having a media access control (MAC) address, is received.

From operation 872, the method flows to operation 874 where the packet is switched by a first packet switching device (PSD) when the MAC address is present in a first memory. From operation 874, the method flows to operation 876 where the packet is transferred to a second PSD when the MAC address is absent from the first memory and present in a second memory associated with the second PSD.

From operation 876, the method flows to operation 878 where the packet is transferred to a third PSD when the MAC address is absent from the first memory and the second memory.

The method as recited in claim 1, wherein the first memory has a smaller size than the second memory and the second memory has a smaller size than a third memory coupled to the third PSD.

In one embodiment, a first access time of the first memory is less than a third access time of the third memory, and a second access time of the second memory is less than the third access time.

In another embodiment, the first memory is a ternary content addressable memory (TCAM). In one embodiment, the first PSD is a switch fabric.

In one embodiment, the second PSD is a packet processor and the third PSD is a processor.

In another embodiment, information about the MAC address is added if the MAC address was absent from the first memory.

In one embodiment, an address discovery is performed when the MAC address is absent from the first, second, and third memories.

Figure 17D:
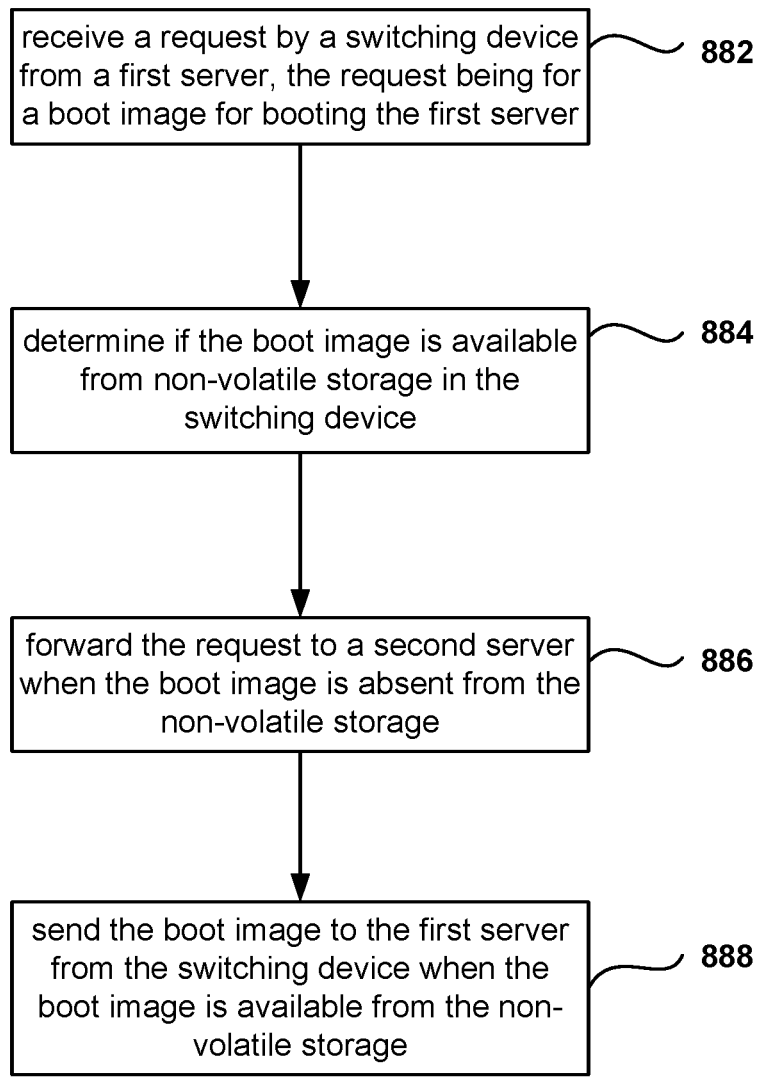
FIG. 17D shows a flowchart illustrating an algorithm for providing a program to a server, in accordance with one embodiment.

FIG. 17D shows a flowchart illustrating an algorithm for providing a program to a server, in accordance with one embodiment. In operation 882, a request is received by a switching device from a first server, the request being for a boot image for booting the first server. From operation 882, the method flows to operation 884 where a determination is made whether the boot image is available from non-volatile storage in the switching device.

From operation 884, the method flows to operation 886 where the request is forwarded to a second server when the boot image is absent from the non-volatile storage. From operation 886, the method flows to operation 888 where the boot image is sent to the first server from the switching device when the boot image is available from the non-volatile storage.

In one embodiment, the request is a Preboot eXecution Environment (PXE) boot request.

In another embodiment, the request is addressed to a second server in the switching device intercepts the request to serve the boot image without sending the request to the second server.

Inject another embodiment, a PXE redirection service request (Proxy DHCP) is received for a boot image server, and a response to the PXE redirection service request is sent with an address of the switching device.

In one embodiment, the switching device is defined to intercept boot image requests from systems directly coupled to the switching device.

In another embodiment, the switching device is defined to intercept boot image requests when the switching device is in a network path between the first server and a second server providing boot images.

In yet another embodiment, a dynamic host configuration protocol (DHCP) request is detected, and a response is sent to the DHCP request by the switching device when the switching device has information to satisfy the DHCP request.

In one more embodiment, an address resolution protocol (ARP) request is received, and a response to the ARP request is sent by the switching device.

In one embodiment, a request for a software driver is detected, and a response is sent for the software driver by the switching device when the software driver is available in the non-volatile storage.

In yet another embodiment, a request for an application programming code is detected, and a response to the request is sent for the application program code by the switching device when the application program code is available in the non-volatile storage.

In one more embodiment, a request is detected for an application upgrade program code, and a response to the request is sent for the application upgrade program code by the switching device when the application upgrade program code is available in the non-volatile storage.

Figure 17E:
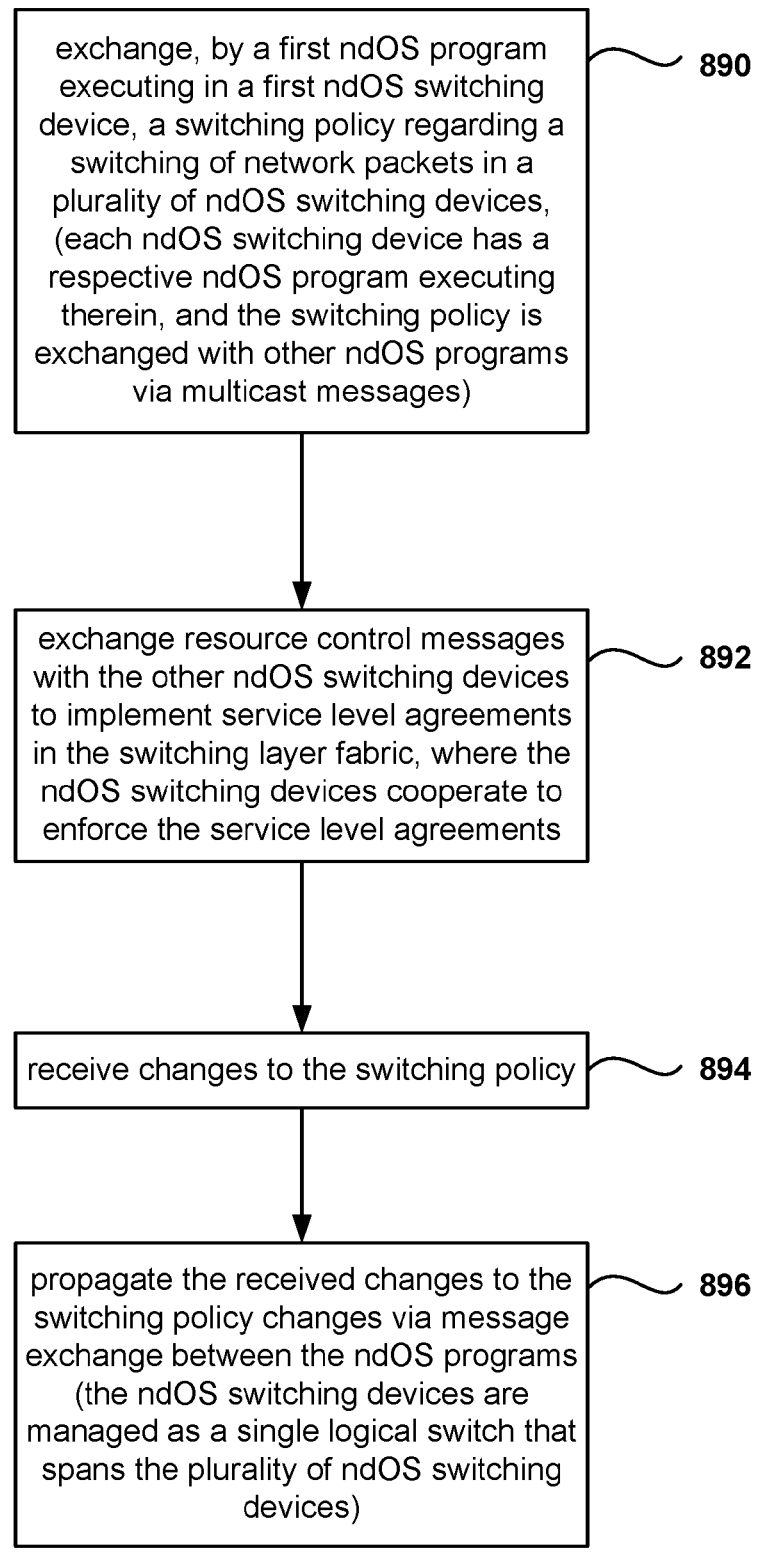
FIG. 17E shows a flowchart illustrating an algorithm for managing a switching layer fabric, in accordance with one embodiment.

FIG. 17E shows a flowchart illustrating an algorithm for managing a switching layer fabric, in accordance with one embodiment. In operation 890, a first ndOS program executing in a first ndOS switching device exchanges a switching policy regarding the switching of network packets in a plurality of ndOS switching devices, each ndOS switching device having a respective ndOS program executing therein, and the switching policy is exchanged with other ndOS programs via multicast messages.

From operation 890, the method flows to operation 892 where resource control messages are exchanged with the other ndOS switching devices to implement service level agreements in the switching layer fabric, where the ndOS switching devices cooperate to enforce the service level agreements.

From operation 892, the method flows to operation 894 where changes are received to the switching policy. From operation 894, the method flows to operation 896 when the received changes to the switching policy are propagated via message exchange between the ndOS programs, where the ndOS switching devices are managed as a single logical switch that spans the plurality of ndOS switching devices.

Embodiments of the present disclosure may be practiced with various computer system configurations including hand-held devices, microprocessor systems, microprocessor-based or programmable consumer electronics, minicomputers, mainframe computers and the like. The embodiments can also be practiced in distributed computing environments where tasks are performed by remote processing devices that are linked through a network.

With the above embodiments in mind, it should be understood that the embodiments can employ various computer-implemented operations involving data stored in computer systems. These operations are those requiring physical manipulation of physical quantities. Any of the operations described herein are useful machine operations. The e also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data may be processed by other computers on the network, e.g., a cloud of computing resources.

One or more embodiments can also be fabricated as computer readable code on a non-transitory computer readable storage medium. The non-transitory computer readable storage medium is any non-transitory data storage device that can store data, which can be thereafter be read by a computer system. Examples of the non-transitory computer readable storage medium include hard drives, network attached storage (NAS), read-only memory, random-access memory, CD-ROMs, CD-Rs, CD-RWs, magnetic tapes and other optical and non-optical data storage devices. The non-transitory computer readable storage medium can include computer readable storage medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A switching server, comprising:
 a server including a processor executing an operating system that includes a network driver, the network driver providing a network interface for the server, the network driver including a first network device operating system (ndOS) program;
 a switch module coupled to the server, the switch module including a switch fabric and a plurality of input/output ports; and
 a switch controller coupled to the server and the switch module, the switch controller including a processor and non-volatile storage, wherein the processor is configured to execute a second ndOS program;
 wherein the first ndOS program and the second ndOS implement a global networking policy for a plurality of devices executing ndOS programs, the global networking policy including a definition for switching incoming packets through the plurality of devices executing ndOS programs.

2. The switching server as recited in claim 1, wherein the first ndOS program and the second ndOS program, when executed by respective processors, exchange control messages to maintain the global networking policy.

3. The switching server as recited in claim 1, wherein the plurality of devices executing ndOS programs exchange messages to propagate the global networking policy.

4. The switching server as recited in claim 1, wherein the server and the switch module are coupled via peripheral component interconnect (PCI) ports.

5. The switching server as recited in claim 1, wherein the switch module further includes a classifier, the classifier implementing the global networking policy for switching incoming packets, wherein the second ndOS is defined to configure the classifier to implement the global networking policy.

6. The switching server as recited in claim 1, wherein packets switched by the switch controller are sent from the switch module to memory in the switch controller.

7. The switching server as recited in claim 1, wherein the switch fabric is configure to switch packets between the plurality of input/output ports and ports connected to the server and the switch controller.

8. The switching server as recited in claim 1, wherein the server and the switch module are coupled via Ethernet ports.

9. The switching server as recited in claim 1, wherein the server is configured to execute virtual machines, wherein the first ndOS program is configured to implement network resource allocation among the virtual machines.

10. The switching server as recited in claim 9, wherein the first ndOS program and the second ndOS program are configured to implement virtual LAN functionality and to keep separate traffic of the virtual machines in different VLANs.

11. The switching server as recited in claim 1, wherein packets arriving to the switching server may be switched by any one of the server, the switch module, and the switch controller.

12. A method for processing packets, the method comprising:
   receiving a packet at a port of a plurality of ports in a switch module of a switching server, the switching server further including a server coupled to the switch module and a switch controller coupled to the switch module and to the server, the switch module further including a classifier a switch fabric, wherein the server includes a processor executing an operating system that includes a network driver, the network driver including a first network device operating system (ndOS) program, the switch controller including a processor and non-volatile storage, wherein the processor is configured to execute a second ndOS program;
   determining by the classifier to switch the packet through the switch module or through the switch controller based on a global networking policy, wherein the first ndOS program and the second ndOS implement the global networking policy for a plurality of devices executing ndOS programs, the global networking policy including a definition for switching incoming packets through the plurality of devices executing ndOS programs; and
   switching the packet based on the determining.

13. The method as recited in claim 12, further including:
   switching a packet originating at the server and with a destination at the server at the network driver.

14. The method as recited in claim 12, further including:
   exchanging control messages between the first ndOS program and the second ndOS program to maintain the global networking policy.

15. The method as recited in claim 12, further including:
   exchanging control messages among the plurality of devices executing ndOS programs to propagate the global networking policy.

16. The method as recited in claim 12, further including:
   configuring, by the second ndOS program, the classifier to implement the global networking policy.

17. The method as recited in claim 12, wherein the server and the switch module are coupled via peripheral component interconnect (PCI) ports.

18. The method as recited in claim 12, wherein the server and the switch module are coupled via Ethernet ports.

19. A non-transitory computer-readable storage medium storing a computer program for managing network traffic, the computer-readable storage medium comprising:
   program instructions for receiving a packet at a port of a plurality of ports in a switch module of a switching server, the switching server further including a server coupled to the switch module and a switch controller coupled to the switch module and to the server, the switch module further including a classifier a switch fabric, wherein the server includes a processor executing an operating system that includes a network driver, the network driver including a first network device operating system (ndOS) program, the switch controller including a processor and non-volatile storage, wherein the processor is configured to execute a second ndOS program;
   program instructions for determining by the classifier to switch the packet through the switch module or through the switch controller based on a global networking policy, wherein the first ndOS program and the second ndOS implement the global networking policy for a plurality of devices executing ndOS programs, the global networking policy including a definition for switching incoming packets through the plurality of devices executing ndOS programs; and
   program instructions for switching the packet based on the determining.

20. The storage medium as recited in claim 19, further including:
   program instructions for exchanging control messages between the first ndOS program and the second ndOS program to maintain the global networking policy.

* * * * *